(12) United States Patent
Tsai et al.

(10) Patent No.: US 11,693,205 B2
(45) Date of Patent: Jul. 4, 2023

(54) PLASTIC LENS BARREL, CAMERA MODULE AND ELECTRONIC DEVICE

(71) Applicant: LARGAN PRECISION CO., LTD., Taichung (TW)

(72) Inventors: Chun-Hua Tsai, Taichung (TW); Ming-Ta Chou, Taichung (TW); Lin-An Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 72 days.

(21) Appl. No.: 17/498,883

(22) Filed: Oct. 12, 2021

(65) Prior Publication Data
US 2022/0026662 A1 Jan. 27, 2022

Related U.S. Application Data

(63) Continuation of application No. 16/867,604, filed on May 6, 2020, now Pat. No. 11,169,352.

(60) Provisional application No. 62/848,068, filed on May 15, 2019.

(30) Foreign Application Priority Data

Nov. 11, 2019 (TW) .................................. 108140864

(51) Int. Cl.
G02B 7/02 (2021.01)
(52) U.S. Cl.
CPC .................................... G02B 7/02 (2013.01)

(58) Field of Classification Search
CPC .................................... G02B 7/02; G02B 7/00
USPC ......................................................... 359/819
See application file for complete search history.

(56) References Cited

U.S. PATENT DOCUMENTS

| 6,441,976 | B1 * | 8/2002 | Okorocha .............. G02B 13/16 |
| | | | 359/819 |
| 7,850,319 | B2 | 12/2010 | Yoshikawa et al. |
| 8,529,075 | B2 | 9/2013 | Kamada et al. |
| 8,876,304 | B2 | 11/2014 | Findlay et al. |

(Continued)

FOREIGN PATENT DOCUMENTS

| CN | 203658652 U | 6/2014 |
| CN | 203786314 U | 8/2014 |

(Continued)

Primary Examiner — William R Alexander
(74) Attorney, Agent, or Firm — McClure, Qualey & Rodack, LLP

(57) ABSTRACT

A plastic lens barrel includes an object-side portion, an image-side portion and a tube-shaped portion. The object-side portion is located close to an object side of the plastic lens barrel. The object-side portion includes an object-side opening and an object-side annular surface. The object-side annular surface surrounds the object-side opening and faces toward the object side. The image-side portion is located close to an image side of the plastic lens barrel and includes an image-side opening. The tube-shaped portion surrounds an optical axis. The tube-shaped portion is connected between the object-side portion and the image-side portion, and configured to define an inner space. The object-side annular surface includes a groove structure area. The groove structure area includes a plurality of groove structures. The groove structures are disposed in at least one of an arranging manner and an extending manner along a sagittal direction away from the optical axis.

23 Claims, 37 Drawing Sheets

(56) References Cited

U.S. PATENT DOCUMENTS

| | | | |
|---|---|---|---|
| 9,158,086 B2 | 10/2015 | Shindo et al. | |
| 9,354,444 B2 | 5/2016 | Lin | |
| 9,413,937 B2 | 8/2016 | Lin | |
| 9,753,243 B2 | 9/2017 | Chou | |
| 9,904,050 B2 | 2/2018 | Lin et al. | |
| 10,001,624 B2 | 6/2018 | Tsai et al. | |
| 10,151,900 B2 | 12/2018 | Lin et al. | |
| 10,281,676 B2 | 5/2019 | Lin et al. | |
| 2007/0247718 A1 | 10/2007 | Yoshikawa et al. | |
| 2010/0128350 A1 | 5/2010 | Findlay et al. | |
| 2010/0165468 A1 | 7/2010 | Yamada et al. | |
| 2014/0168797 A1 | 6/2014 | Shindo et al. | |
| 2017/0131513 A1 | 5/2017 | Lin et al. | |
| 2018/0295266 A1 | 10/2018 | Tsai et al. | |
| 2018/0372983 A1 | 12/2018 | Shimizu et al. | |
| 2019/0018171 A1* | 1/2019 | Chang | G02B 7/025 |
| 2020/0096680 A1* | 3/2020 | Chang | G02B 7/021 |

FOREIGN PATENT DOCUMENTS

| | | |
|---|---|---|
| CN | 204758902 U | 11/2015 |
| CN | 205103485 U | 3/2016 |
| CN | 205899059 U | 1/2017 |
| CN | 205899116 U | 1/2017 |
| CN | 206523684 U | 9/2017 |
| TW | M519751 U | 4/2016 |

* cited by examiner

PLASTIC LENS BARREL, CAMERA MODULE AND ELECTRONIC DEVICE

RELATED APPLICATIONS

The present application is a Continuation of U.S. application Ser. No. 16/867,604, filed on May 6, 2020, which claims priority to U.S. Provisional Application Ser. No. 62/848,068, filed May 15, 2019, and Taiwan Application Serial Number 108140864, filed Nov. 11, 2019, which are incorporated by reference herein in its entirety.

BACKGROUND

Technical Field

The present disclosure relates to a plastic lens barrel and a camera module. More particularly, the present disclosure relates to a compact camera module and a plastic lens barrel thereof that are applicable to electronic devices.

Description of Related Art

With the advanced semiconductor manufacturing technologies, the performances of image sensors are enhanced, and the pixel size is minified. Therefore, camera modules with high image quality become indispensable.

Moreover, with the rapid scientific and technological progress, the application scope of electronic devices equipped with camera modules becomes wider, and the requirements for camera modules are more diverse. However, it is hard for balancing the requirements, such as image quality, sensitivity, aperture size, volume and field of view, in conventional camera modules. Therefore, a camera module and a plastic lens barrel thereof are provided by the present disclosure to satisfy the desired requirement.

SUMMARY

According to one aspect of the present disclosure, a plastic lens barrel has an inner space for accommodating an imaging lens assembly, which has an optical axis. The plastic lens barrel includes an object-side portion, an image-side portion and a tube-shaped portion. The object-side portion is located close to an object side of the plastic lens barrel. The object-side portion includes an object-side opening and an object-side annular surface. The object-side annular surface surrounds the object-side opening and faces toward the object side. The image-side portion is located close to an image side of the plastic lens barrel and includes an image-side opening. The tube-shaped portion surrounds the optical axis. The tube-shaped portion is connected between the object-side portion and the image-side portion, and configured to define the inner space. The object-side annular surface includes a groove structure area. The groove structure area includes a plurality of groove structures. The groove structures are disposed in at least one of an arranging manner and an extending manner along a sagittal direction away from the optical axis. When a length along a direction vertical to the optical axis of the groove structure area is T, and a length along a direction parallel to the optical axis of the groove structure area is L, the following condition is satisfied: $0.05 < L/T \leq 2.0$.

According to another aspect of the present disclosure, a camera module includes the plastic lens barrel according to the foregoing aspect, the imaging lens assembly and an image sensor. The image sensor is disposed on an image surface of the imaging lens assembly.

According to further another aspect of the present disclosure, an electronic device includes the camera module according to the foregoing aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

1st Embodiment

Figure 1A:
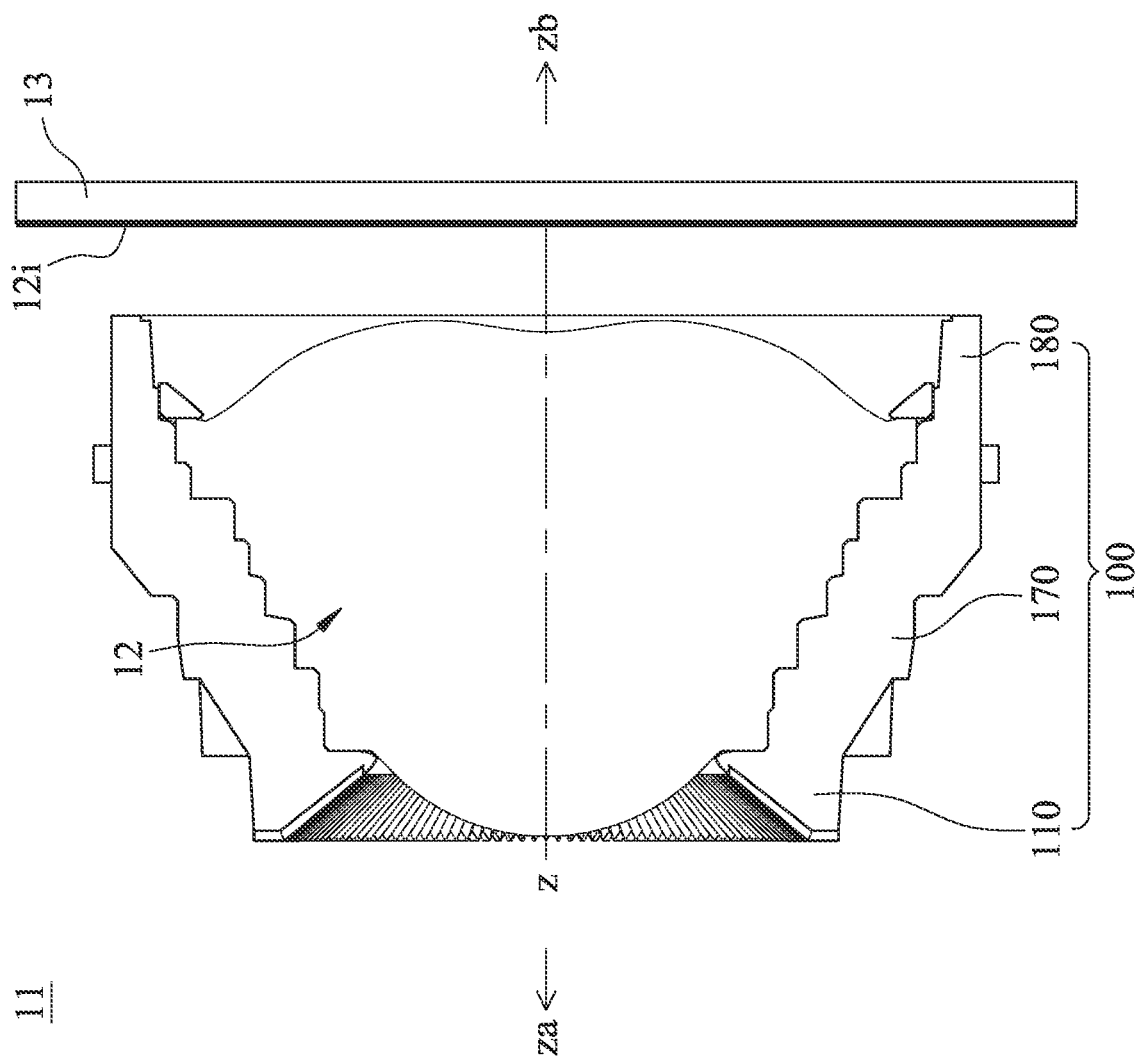
FIG. 1A is a schematic view of a plastic lens barrel according to the 1st embodiment of the present disclosure applied to a camera module.
Figure 1B:
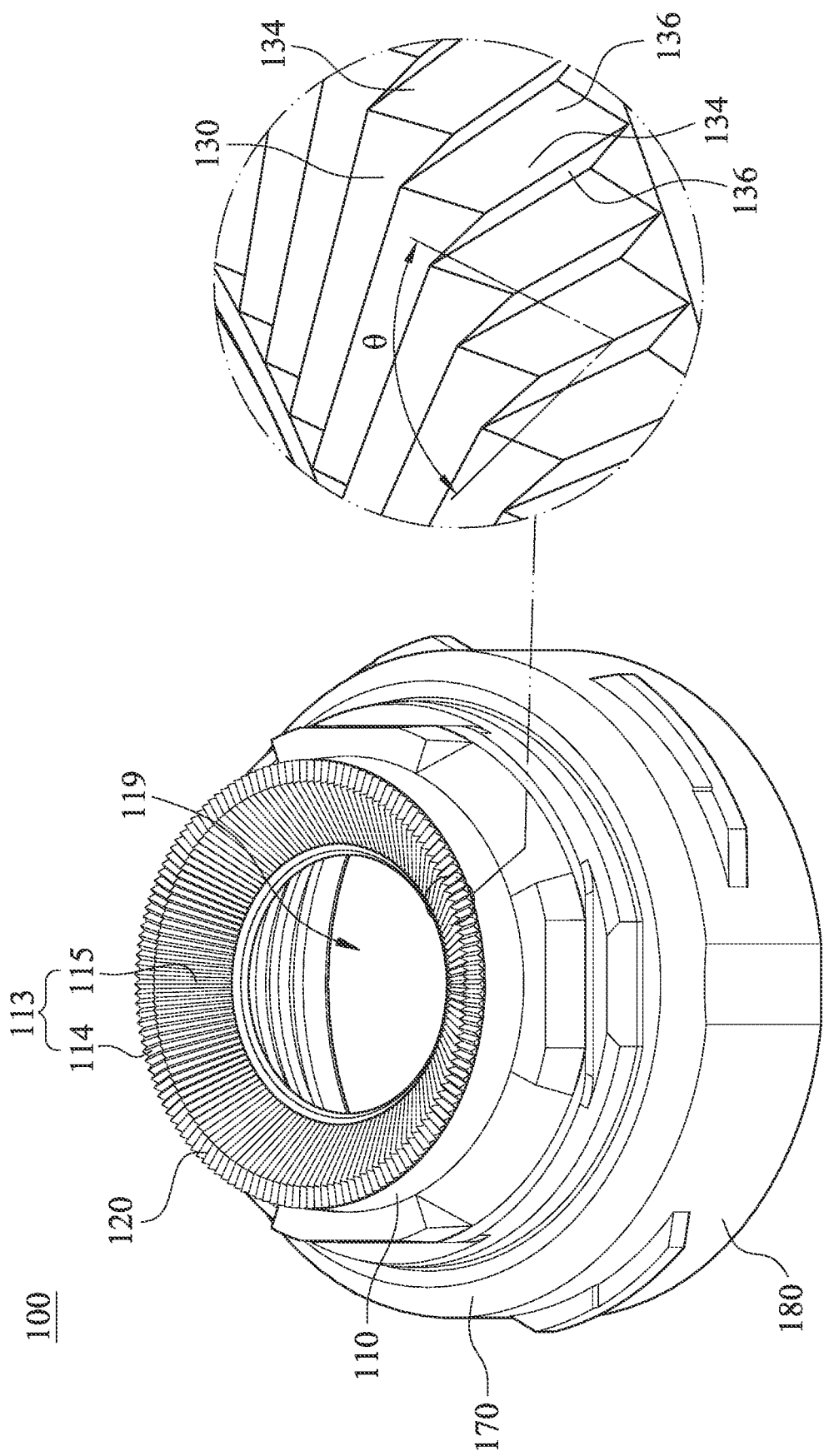
FIG. 1B is a three-dimensional view of the plastic lens barrel according to the 1st embodiment.
Figure 1C:
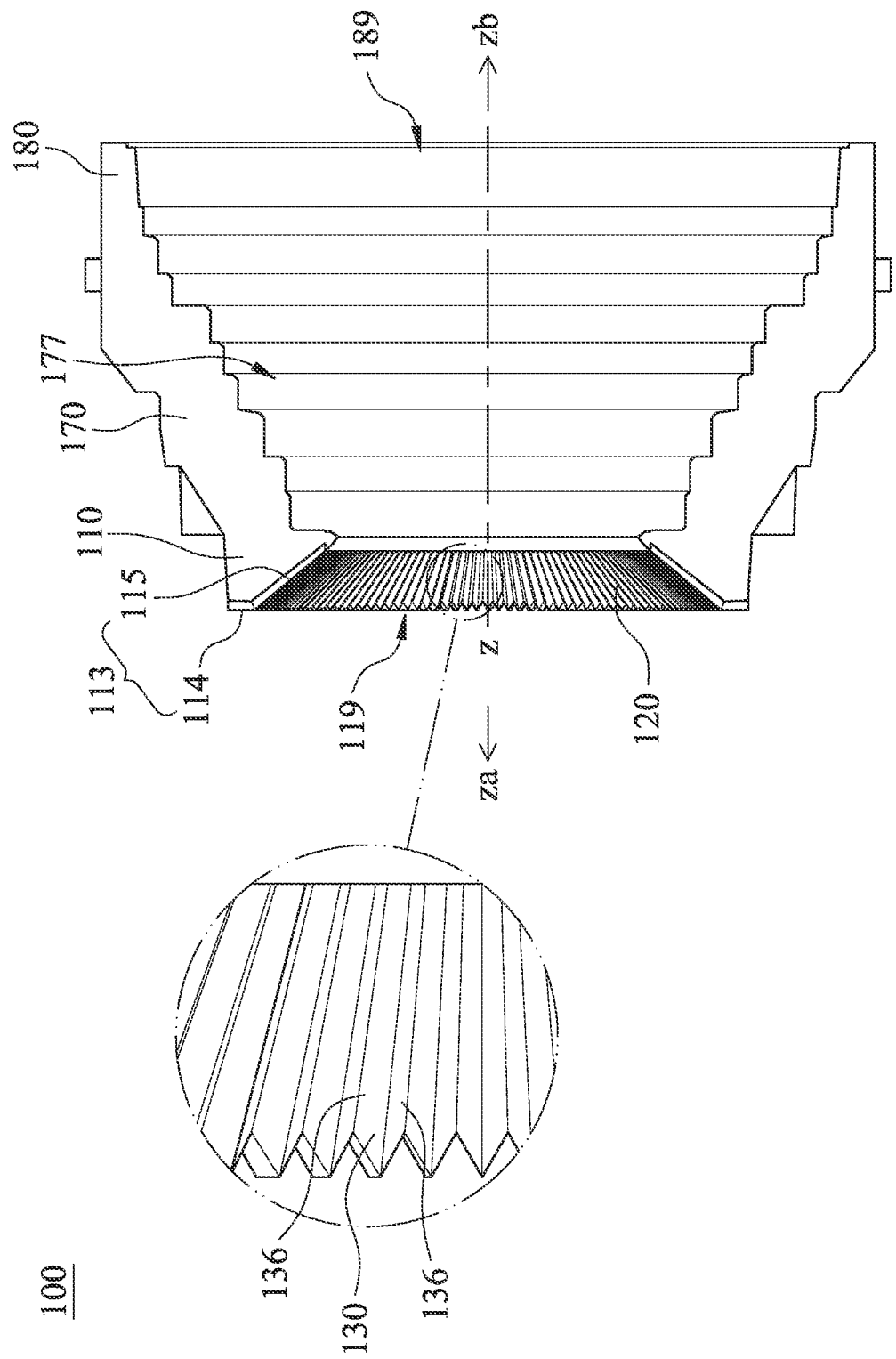
FIG. 1C is a schematic view of the plastic lens barrel according to the 1st embodiment.
Figure 1D:
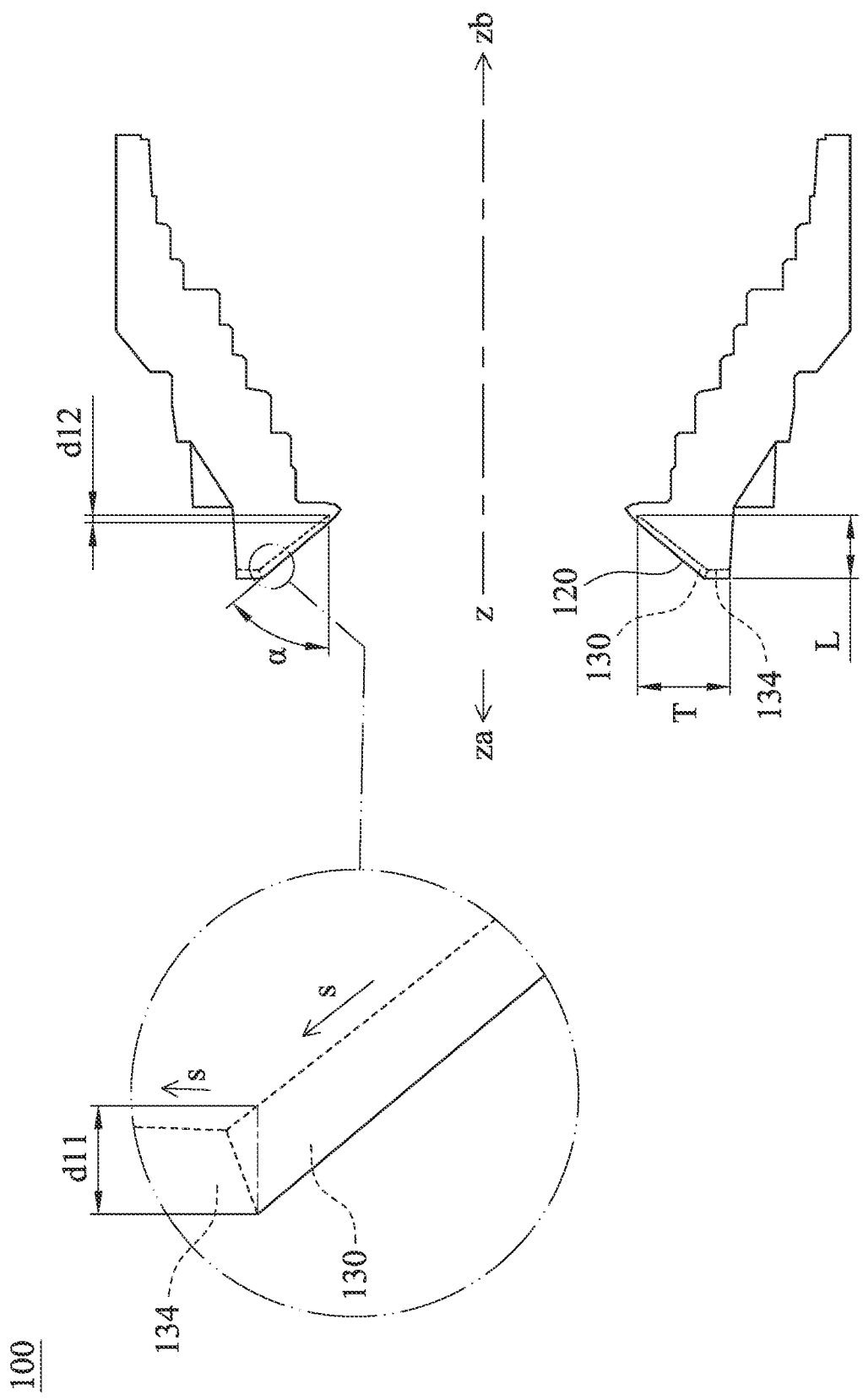
FIG. 1D is a schematic view showing parameters of the plastic lens barrel according to the 1st embodiment.

FIG. 1A is a schematic view of a plastic lens barrel 100 according to the 1st embodiment of the present disclosure applied to a camera module 11. FIG. 1B is a three-dimensional view of the plastic lens barrel 100 according to the 1st embodiment. FIG. 1C is a schematic view of the plastic lens barrel 100 according to the 1st embodiment and also a cross-sectional view along a plane, which has a normal direction vertical to an optical axis z, of the plastic lens barrel 100. FIG. 1D is a schematic view showing parameters of the plastic lens barrel 100 according to the 1st embodiment and also a cross-sectional view along another plane, which has a normal direction vertical to the optical axis z, of the plastic lens barrel 100. In FIG. 1A to FIG. 1D, the plastic lens barrel 100 has an inner space 177 for accommodating an imaging lens assembly 12, which has the optical axis z. The plastic lens barrel 100 includes an object-side portion 110, an image-side portion 180 and a tube-shaped portion 170. Furthermore, the imaging lens assembly 12 includes a plurality of optical elements (not shown in drawings). One of the optical elements may be a lens element, a light blocking sheet, a spacer, or a retainer, but not limited thereto.

In FIG. 1A to FIG. 1D, an object side za is a side (or a direction) toward an imaged object (not shown in drawings) of the camera module 11 and the imaging lens assembly 12 thereof, and an image side zb is a side (or a direction) toward an image surface 12i of the camera module 11 and the imaging lens assembly 12 thereof. The plastic lens barrel 100 includes the object-side portion 110, the tube-shaped portion 170 and the image-side portion 180, in order from the object side za to the image side zb. The object-side portion 110 is located close to the object side za of (or with respect to) the plastic lens barrel 100, and it is noted that the object side za is not a part of the plastic lens barrel 100. The object-side portion 110 includes an object-side opening 119 and an object-side annular surface 113. The object-side annular surface 113 surrounds the object-side opening 119 and faces toward the object side za. The image-side portion 180 is located close to the image side zb of (or with respect to) the plastic lens barrel 100 and includes an image-side opening 189, and it is noted that the image side zb is not a part of the plastic lens barrel 100. The tube-shaped portion 170 surrounds the optical axis z. The tube-shaped portion 170 is connected between the object-side portion 110 and the image-side portion 180, and configured to define the inner space 177.

Figure 1E:
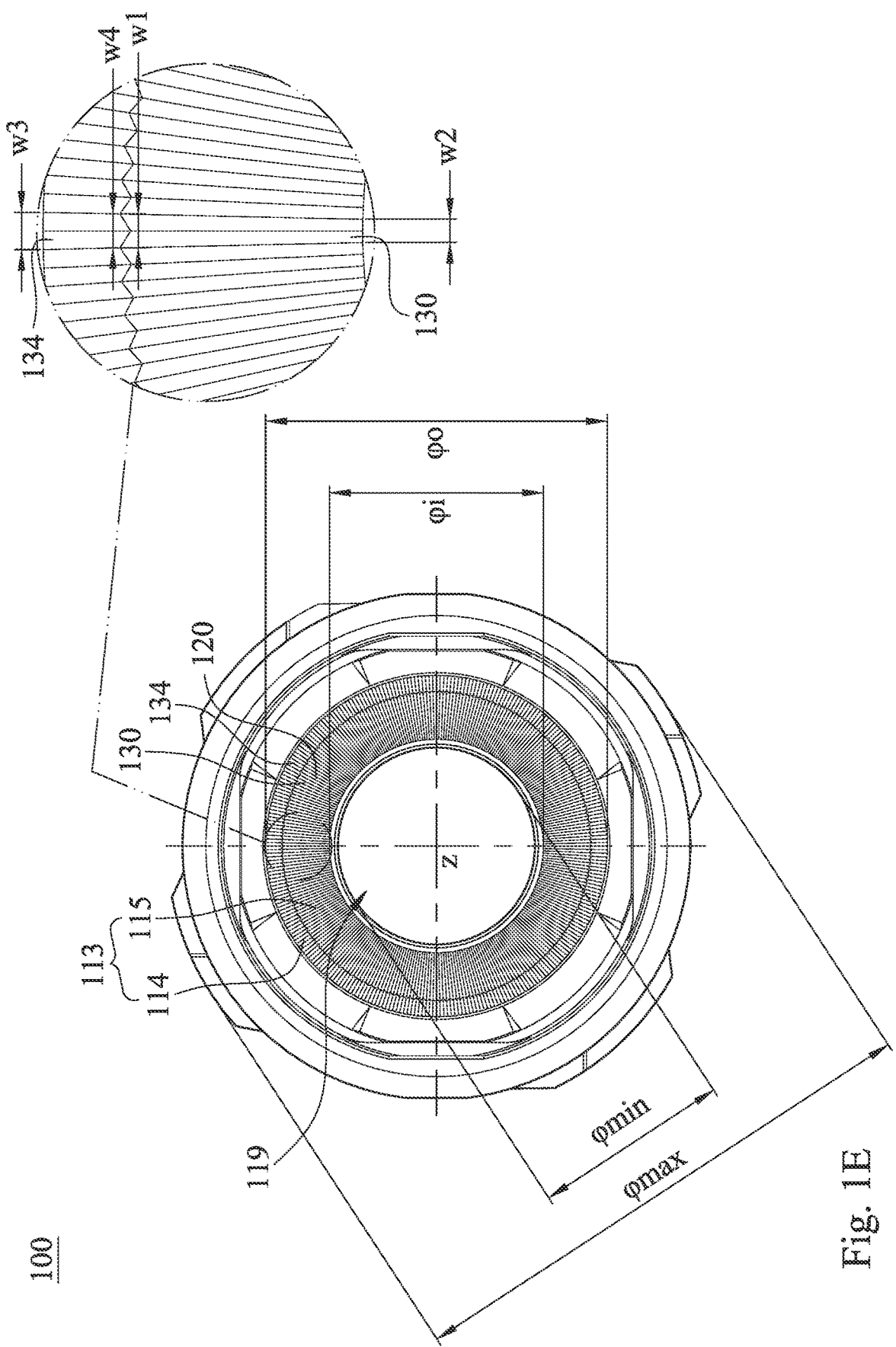
FIG. 1E is a side view from an object side of the plastic lens barrel according to the 1st embodiment.

FIG. 1E is a side view from the object side za of the plastic lens barrel 100 according to the 1st embodiment. In FIG. 1B to FIG. 1E, the object-side annular surface 113 includes a groove structure area 120. The groove structure area 120 includes a plurality of groove structures, and each of the groove structures is a recessed structure. The groove structures are disposed in at least one of an arranging manner and an extending manner along a sagittal direction s away from the optical axis z. Further, the mentioned arranging manner is at least two the groove structures discontinuously or discretely arranging along the sagittal direction s away from the optical axis z, and the mentioned extending manner is one of the groove structures continuously extending along the sagittal direction s away from the optical axis z. The mentioned sagittal direction s is vertical or orthogonal to a circumferential direction (its reference numeral is omitted) of the optical axis z, and the circumferential direction of the optical axis z is a tangential direction surrounding the optical axis z. The sagittal direction s can be said as the sagittal direction s away from the optical axis z, the sagittal direction s toward the optical axis z, a direction from being close to the optical axis z to being away from the optical axis z, a direction from being away from the optical axis z to being close to the optical axis z, or a radiation direction of the optical axis z. In the 1st embodiment, the groove structure area 120 includes the groove structures, the groove structures are specifically a plurality of linearly strip-shaped groove structures 130 and a plurality of linearly strip-shaped groove structures 134. Each (i.e., each linearly strip-shaped groove structure) of the linearly strip-shaped groove structures 130, 134 is disposed in the extending manner along the sagittal direction s away from the optical axis z. Therefore, the groove structures (the linearly strip-shaped groove structures 130, 134 specifically in the 1st embodiment) disposed on the surface of the plastic lens barrel 100 are advantageous in effectively suppressing the non-imaging light reflected from the surface of the plastic lens barrel 100, reducing the occurrence probability of the non-imaging light into the imaging lens assembly 12, and thereby enhancing the image quality.

In FIG. 1D, when a length along the direction vertical to the optical axis z of the groove structure area 120 is T, and a length along a direction parallel to the optical axis z of the groove structure area 120 is L, the following condition is satisfied: $0.05 < L/T \le 2.0$. Therefore, the groove structures of a wider range can provide better effects for eliminating the stray light. Further, the following condition may be satisfied: $0.3 < L/T \le 1.5$; or $0.05 < L/T \le 1.0$. Furthermore, the following condition may be satisfied: $0.3 < L/T \le 1.0$. Moreover, the parameter T satisfies the condition "$T = (\varphi o - \varphi i)/2$". In the mentioned condition, $\varphi o$ is a maximum outer diameter of the groove structure area 120, and $\varphi i$ is a minimum inner diameter of the groove structure area 120.

In detail, in FIG. 1B to FIG. 1E, the object-side annular surface 113 may further include an object-side outer annular surface 114 and an object-side inner annular surface 115. The object-side inner annular surface 115 is located closer to the optical axis z than the object-side outer annular surface 114 to the optical axis z. At least one part of the groove structure area 120 is disposed on the object-side inner annular surface 115. Therefore, the groove structure area 120 disposed closer to the optical axis z is advantageous in reducing the stray light around or close to the optical axis z. In the 1st embodiment, one part of the groove structure area 120 (i.e., the linearly strip-shaped groove structures 130 included in the groove structure area 120) is disposed on the object-side inner annular surface 115.

The groove structure area 120 may be disposed on the object-side inner annular surface 115 and the object-side outer annular surface 114. Therefore, it is favorable for providing the feasibility of two surfaces (i.e., the object-side inner annular surface 115 and the object-side outer annular surface 114 specifically in the 1st embodiment) with different angles both disposing the groove structures. In the 1st embodiment, the linearly strip-shaped groove structures 130 included in the groove structure area 120 are disposed on the object-side inner annular surface 115, and the linearly strip-shaped groove structures 134 included in the groove structure area 120 are disposed on the object-side outer annular surface 114. Each of the linearly strip-shaped groove structures 130 is disposed correspondingly and connected to one of the linearly strip-shaped groove structures 134, and each of the linearly strip-shaped groove structures 134 is disposed correspondingly and connected to one of the linearly strip-shaped groove structures 130.

In FIG. 1D, when an angle between the object-side inner annular surface 115 and the direction parallel to the optical axis z is a, the following condition may be satisfied: 35 degrees<α<70 degrees. Therefore, it is favorable for providing a better range to dispose the groove structures on a surface with a specific inclined degree. Further, the object-side outer annular surface 114 may be located vertical to the optical axis z, i.e., a normal direction of the object-side outer annular surface 114 may be parallel to the optical axis z.

In FIG. 1E, when the maximum outer diameter of the groove structure area 120 is φo, and a maximum outer diameter of the plastic lens barrel 100 is φmax, the following condition may be satisfied: 0.2<φo/φmax<0.9. Therefore, it is favorable for providing a better area range for eliminating the stray light. In the embodiments according to the present disclosure, the parameter φo is the greatest one among outer diameters that pass through the optical axis z of the groove structure area 120, in particular, for an outer circumference of the groove structure area 120 being not circular or not perfect circular. The parameter φmax is the greatest one among outer diameters that pass through the optical axis z of the plastic lens barrel 100, in particular, for an outer circumference of the plastic lens barrel 100 being not circular or not perfect circular.

When the minimum inner diameter of the groove structure area 120 is φi, and a diameter of the object-side opening 119 of the plastic lens barrel 100 is φmin, the following condition may be satisfied: 0.75<φmin/φ≤1.0. Therefore, the groove structure area 120 close to an aperture stop (i.e., the object-side opening 119) of the camera module 11 is advantageous in reducing the occurrence probability of the non-imaging light into the imaging lens assembly 12. In the embodiments according to the present disclosure, the parameter φi is the smallest one among inner diameters that pass through the optical axis z of the groove structure area 120, in particular, for an inner circumference of the groove structure area 120 being not circular or not perfect circular.

In one embodiment according to the present disclosure, each of the groove structures may have a smooth surface. That is, at least part surface of each of the groove structures may be the smooth surface. Therefore, it is favorable for performing the machining procedures of the mold of the plastic lens barrel 100. In the 1st embodiment, each of the linearly strip-shaped groove structures 130, 134 has the smooth surface, and an entirety of each of the linearly strip-shaped groove structures 130, 134 has the smooth surface.

In FIG. 1B to FIG. 1E, each of the linearly strip-shaped groove structures 130, 134 is strip-shaped. Therefore, it is favorable for the manufacturing feasibility of the mold of the plastic lens barrel 100. In one embodiment according to the present disclosure, each of the groove structures may be strip-shaped. Specifically, a shape along an extending direction (i.e., a length direction) of each of the groove structures that is strip-shaped may be linearly strip-shaped (e.g., each of the linearly strip-shaped groove structures 130, 134), annularly strip-shaped, arc strip-shaped, curved strip-shaped, but not limited thereto.

Each of the linearly strip-shaped groove structures 130, 134 may be V-shapedly strip-shaped. Specifically, each of the linearly strip-shaped groove structures 130, 134 is linearly strip-shaped being V-shaped in a transverse cross-section thereof. Each of the linearly strip-shaped groove structures 130, 134 includes two inclined surfaces 136. Each of the two inclined surfaces 136 faces toward the object side za. The two inclined surfaces 136 of each of the linearly strip-shaped groove structures 130, 134 extend toward the image side zb and are connected to each other. That is, two inclined surfaces 136 of each of the linearly strip-shaped groove structures 130, 134 are connected at an intersection point of the V shape. Therefore, the shape of the groove structures is advantageous in manufacturing and providing better effects of eliminating the stray light.

In FIG. 1B, when an angle between the two inclined surfaces 136 of each of the linearly strip-shaped groove structures 130 is θ, and an angle between the two inclined surfaces 136 of each of the linearly strip-shaped groove structures 134 is θ, the following condition may be satisfied: 15 degrees<θ<85 degrees. Therefore, it is favorable for providing a releasing angle for an injection molding manufacturing process and maintaining the effects of eliminating the stray light.

In FIG. 1B to FIG. 1E of the 1st embodiment, each of the groove structures is one linearly strip-shaped groove structure of the linearly strip-shaped groove structures 130, 134, and extends along the sagittal direction s away from the optical axis z, i.e., is disposed in the extending manner along the sagittal direction s away from the optical axis z. The linearly strip-shaped groove structures 130 are regularly arranged along the circumferential direction of the optical axis z. That is, the linearly strip-shaped groove structures 130 have the same structures, and every adjacent two of the linearly strip-shaped groove structures 130 have the same spacing. The linearly strip-shaped groove structures 134 are regularly arranged along the circumferential direction of the optical axis z. That is, the linearly strip-shaped groove structures 134 have the same structures, and every adjacent two of the linearly strip-shaped groove structures 134 have the same spacing. Therefore, it is favorable for simplifying the manufacturing process of the plastic lens barrel 100, and thereby increasing the production efficiency.

When a number (i.e., a sum in the 1st embodiment) of the linearly strip-shaped groove structures 130, 134 is Ns, the following condition may be satisfied: 60≤Ns≤540. Therefore, it is favorable for providing the structural denseness and manufacturability of the linearly strip-shaped groove structures 130, 134. Specifically, each of the linearly strip-shaped groove structures 130 is disposed correspondingly and connected to one of the linearly strip-shaped groove structures 134. A number of the linearly strip-shaped groove structures 130 is 144, and a number of the linearly strip-shaped groove structures 134 is 144. Thus, the number (i.e., the sum) Ns of the linearly strip-shaped groove structures 130, 134 is 288.

In FIG. 1E, a width w1 along the circumferential direction of a position away from the optical axis z of each of the linearly strip-shaped groove structures 130 is different from a width w2 along the circumferential direction of a position close to the optical axis z thereof. A width w3 along the circumferential direction of a position away from the optical axis z of each of the linearly strip-shaped groove structures 134 is different from a width w4 along the circumferential direction of a position close to the optical axis z thereof. Therefore, it is favorable for providing the complexity and maintaining the completeness of the groove structures.

The width w1 along the circumferential direction of the position away from the optical axis z of each of the linearly strip-shaped groove structures 130 is greater than the width w2 along the circumferential direction of the position close to the optical axis z thereof. The width w3 along the circumferential direction of the position away from the optical axis z of each of the linearly strip-shaped groove structures 134 is greater than the width w4 along the circumferential direction of the position close to the optical axis z thereof. Therefore, it is favorable for providing the complexity and maintaining the completeness of the groove structures.

In FIG. 1D, a depth (e.g., a parameter d11 shown in FIG. 1D) along the direction parallel to the optical axis z of the position away from the optical axis z of each of the linearly strip-shaped groove structures 130 is greater than a depth (e.g., a parameter d12 shown in FIG. 1D) along the direction parallel to the optical axis z of the position close to the optical axis z thereof. A depth along the direction parallel to the optical axis z of the position away from the optical axis z of each of the linearly strip-shaped groove structures 134 is greater than a depth along the direction parallel to the optical axis z of the position close to the optical axis z thereof. Therefore, it is favorable for providing the complexity and maintaining the effects of reducing the stray light. Specifically, the depth along the direction parallel to the optical axis z of each of the linearly strip-shaped groove structures 130, 134 gradually becomes smaller from the position away from the optical axis z thereof to the position close to the optical axis z thereof.

When the depth along the direction parallel to the optical axis z of each of the linearly strip-shaped groove structures 130, 134 is d, the following condition may be satisfied: 0.04 mm<d<0.30 mm. Therefore, it is favorable for providing the depth range for higher efficiency of reducing the stray light. In the 1st embodiment, the parameter d of each of the linearly strip-shaped groove structures 130, 134 varies in accordance with a position of the sagittal direction s (i.e., the parameter d being position dependent). For example, a value of the parameter d (e.g., a parameter d11 shown in FIG. 1D) of the position away from the optical axis z of each of the linearly strip-shaped groove structures 130 is different from a value of the parameter d (e.g., a parameter d12 shown in FIG. 1D) of the position close to the optical axis z thereof. However, the value of the parameter d of each position of each of the linearly strip-shaped groove structures 130, 134 satisfies the condition range of the parameter d described in this paragraph.

The data of the aforementioned parameters of the plastic lens barrel 100 according to the 1st embodiment of the present disclosure are listed in the following Table 1, and the parameters are also shown in FIG. 1B, FIG. 1D and FIG. 1E.

TABLE 1

| 1st Embodiment | | | |
|---|---|---|---|
| L (mm) | 0.708 | φmin (mm) | 3.180 |
| T (mm) | 1.033 | φi (mm) | 3.450 |
| L/T | 0.69 | φmin/φi | 0.92 |
| α (deg.) | 50 | θ (deg.) | 60 |
| φo (mm) | 5.514 | Ns | 288 |
| φmax (mm) | 8.700 | d11 (mm) | 0.121 |
| φo/φmax | 0.63 | d12 (mm) | 0.085 |

2nd Embodiment

Figure 2A:
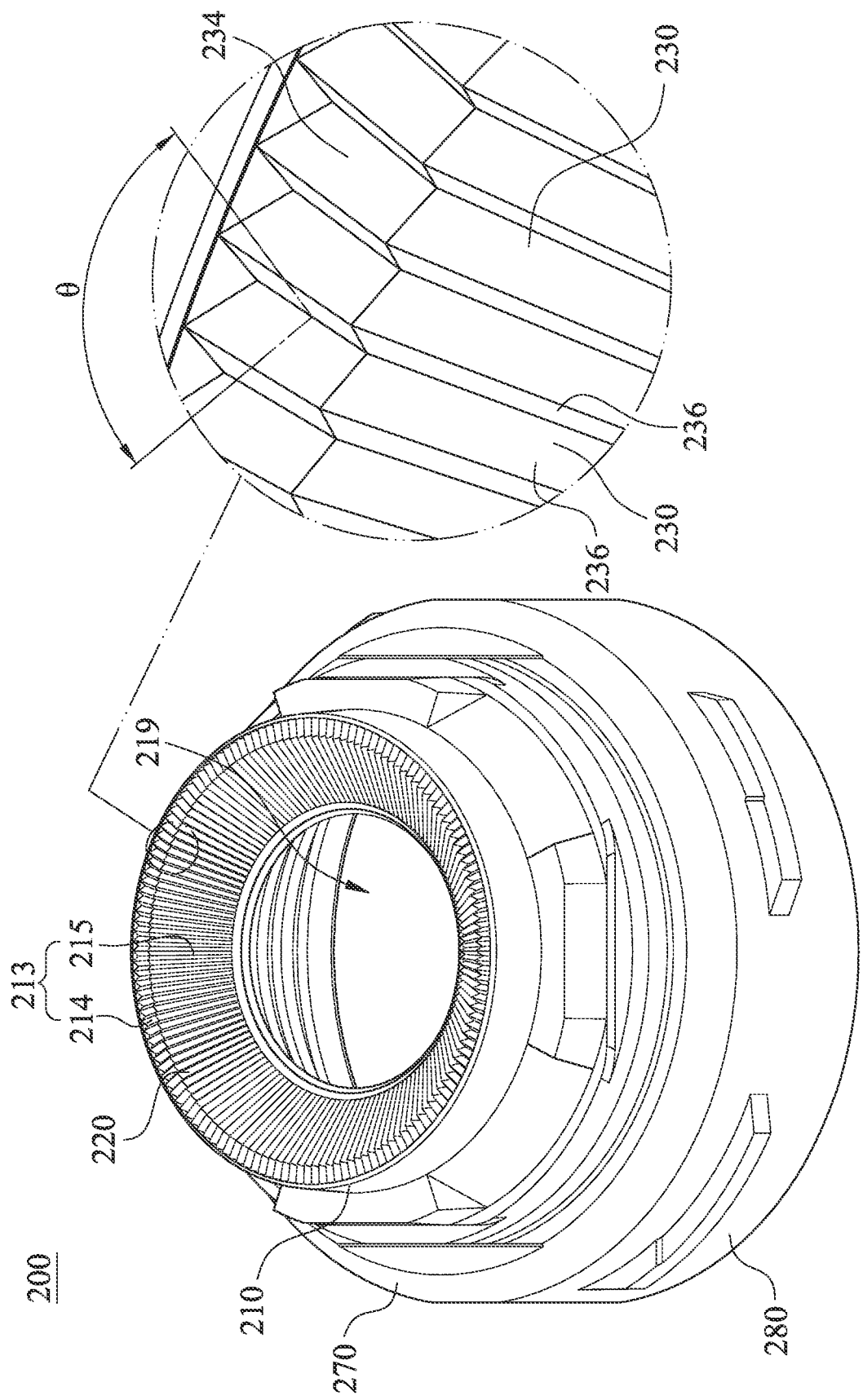
FIG. 2A is a three-dimensional view of a plastic lens barrel according to the 2nd embodiment of the present disclosure.
Figure 2B:
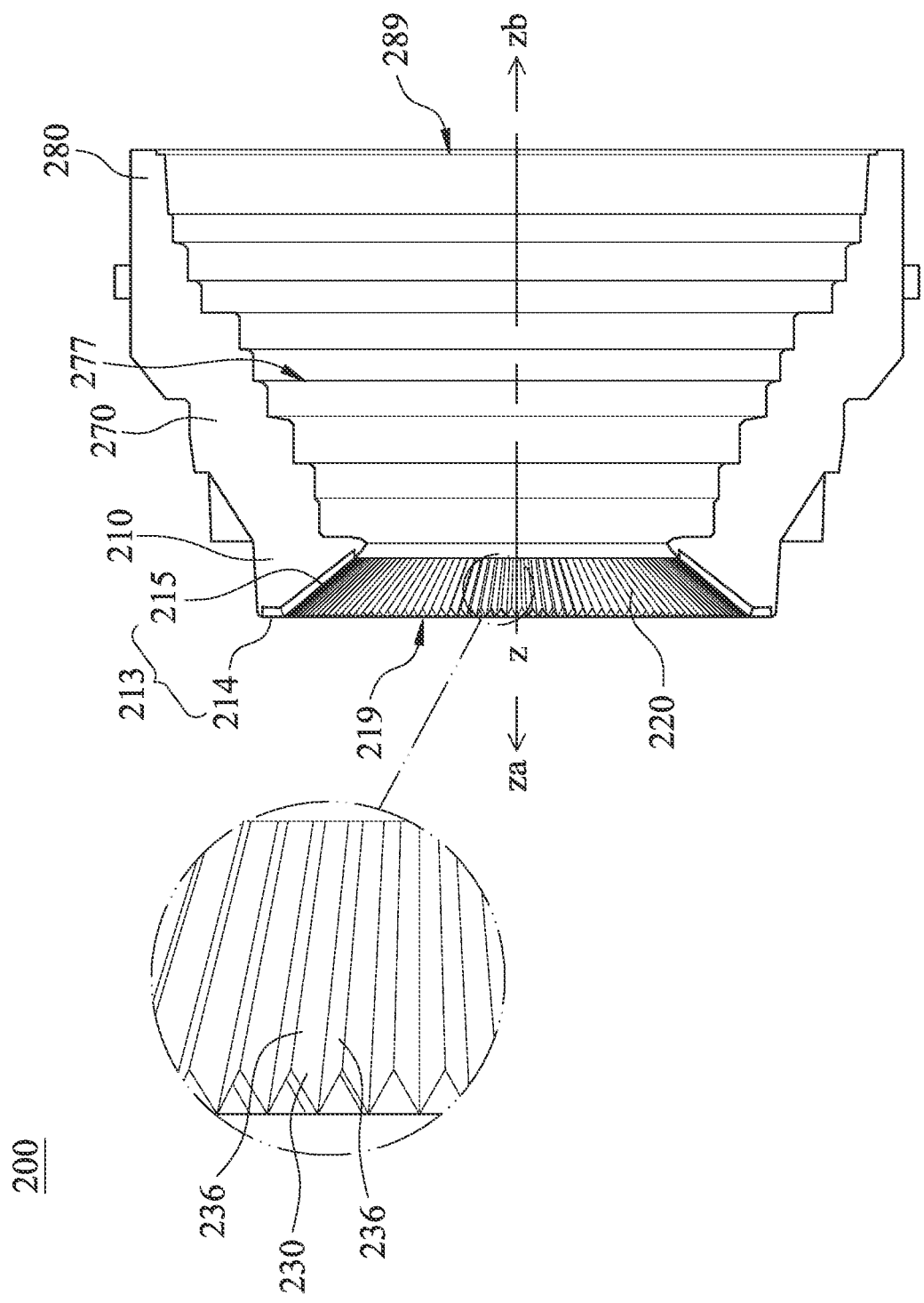
FIG. 2B is a schematic view of the plastic lens barrel according to the 2nd embodiment.
Figure 2C:
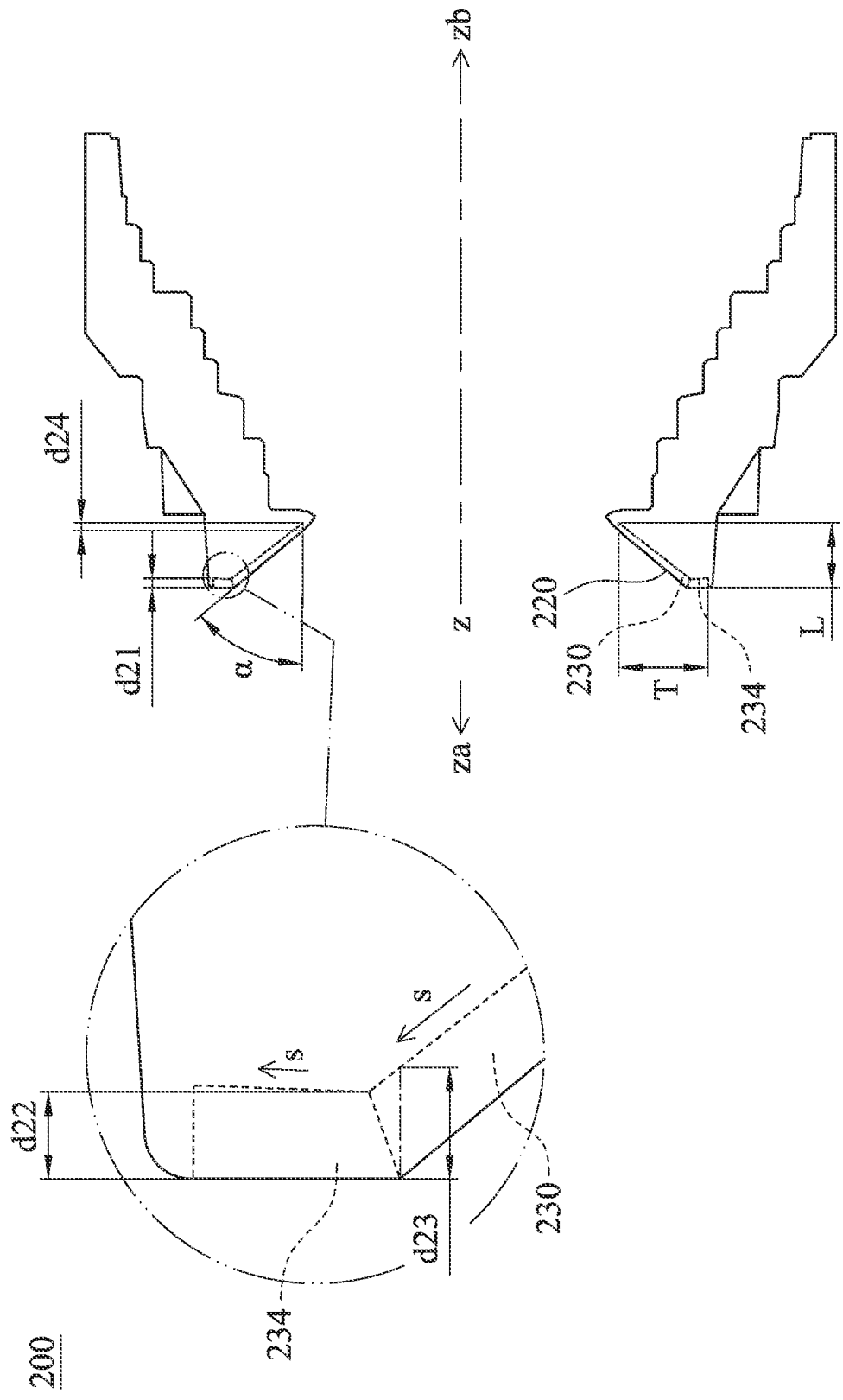
FIG. 2C is a schematic view showing parameters of the plastic lens barrel according to the 2nd embodiment.

FIG. 2A is a three-dimensional view of a plastic lens barrel 200 according to the 2nd embodiment of the present disclosure. FIG. 2B is a schematic view of the plastic lens barrel 200 according to the 2nd embodiment and also a cross-sectional view along a plane, which has a normal direction vertical to an optical axis z, of the plastic lens barrel 200. FIG. 2C is a schematic view showing parameters of the plastic lens barrel 200 according to the 2nd embodiment and also a cross-sectional view along another plane, which has a normal direction vertical to the optical axis z, of the plastic lens barrel 200. In FIG. 2A to FIG. 2C, the plastic lens barrel 200 has an inner space 277 for accommodating an imaging lens assembly (not shown in drawings), which has the optical axis z. The plastic lens barrel 200 includes an object-side portion 210, an image-side portion 280 and a tube-shaped portion 270.

In FIG. 2A to FIG. 2C, the plastic lens barrel 200 includes the object-side portion 210, the tube-shaped portion 270 and the image-side portion 280, in order from an object side za to an image side zb. The object-side portion 210 is located close to the object side za of the plastic lens barrel 200. The object-side portion 210 includes an object-side opening 219 and an object-side annular surface 213. The object-side annular surface 213 surrounds the object-side opening 219 and faces toward the object side za. The image-side portion 280 is located close to the image side zb of the plastic lens barrel 200 and includes an image-side opening 289. The tube-shaped portion 270 surrounds the optical axis z. The tube-shaped portion 270 is connected between the object-side portion 210 and the image-side portion 280, and configured to define the inner space 277.

Figure 2D:
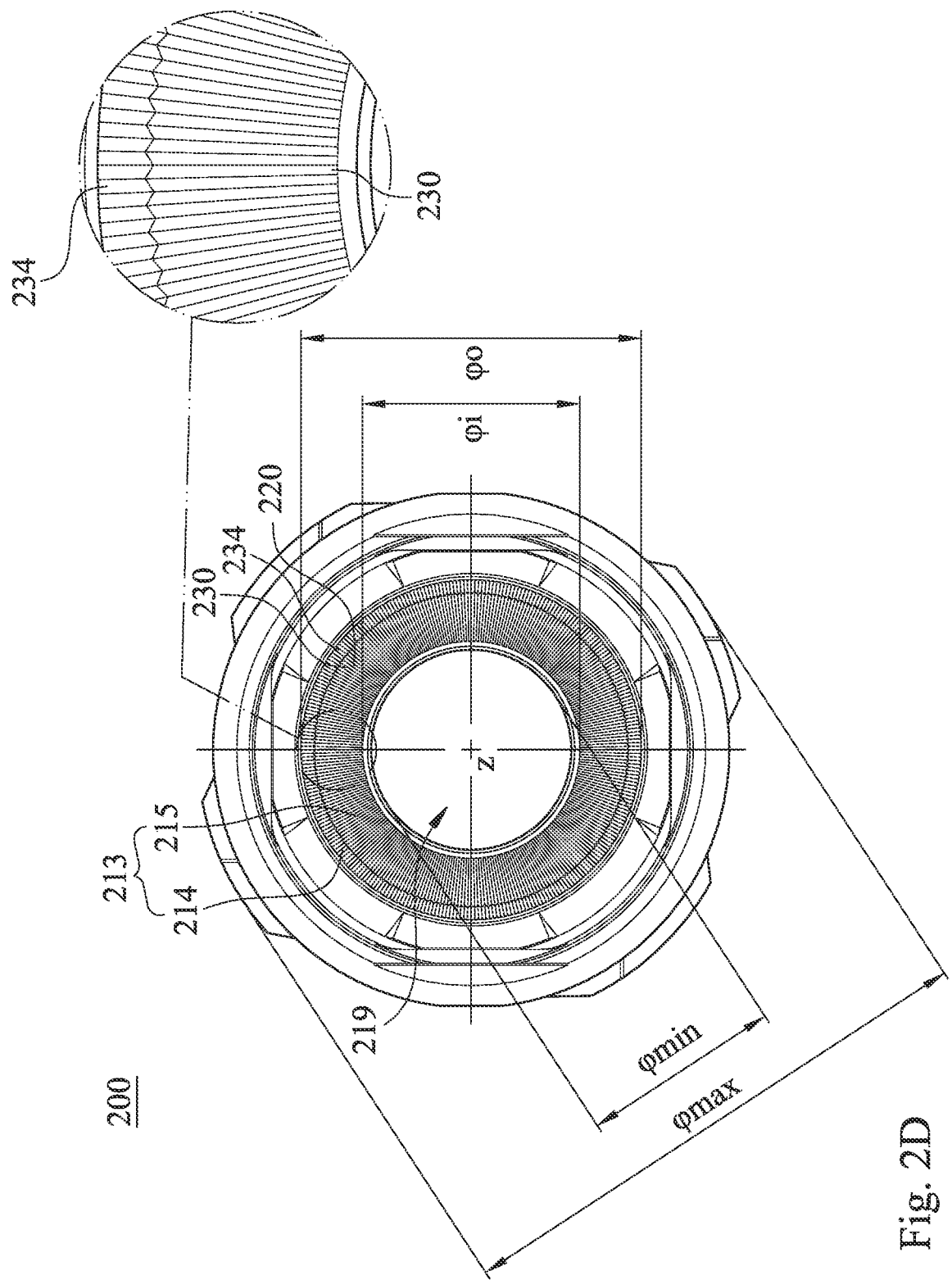
FIG. 2D is a side view from an object side of the plastic lens barrel according to the 2nd embodiment.

FIG. 2D is a side view from the object side za of the plastic lens barrel 200 according to the 2nd embodiment. In FIG. 2A to FIG. 2D, the object-side annular surface 213 includes a groove structure area 220. The groove structure area 220 includes a plurality of groove structures. The groove structures are specifically a plurality of linearly strip-shaped groove structures 230 and a plurality of linearly strip-shaped groove structures 234. Each (i.e., each linearly strip-shaped groove structure) of the linearly strip-shaped groove structures 230, 234 is disposed in an extending manner along a sagittal direction s away from the optical axis z.

In FIG. 2A to FIG. 2D, the object-side annular surface 213 further includes an object-side outer annular surface 214 and an object-side inner annular surface 215. The object-side inner annular surface 215 is located closer to the optical axis z than the object-side outer annular surface 214 to the optical axis z. One part of the groove structure area 220 (i.e., the linearly strip-shaped groove structures 230 included in the groove structure area 220) is disposed on the object-side inner annular surface 215. Specifically, the linearly strip-shaped groove structures 230 included in the groove structure area 220 are disposed on the object-side inner annular surface 215, and the linearly strip-shaped groove structures 234 included in the groove structure area 220 are disposed on the object-side outer annular surface 214. Each of the linearly strip-shaped groove structures 230 is disposed correspondingly and connected to one of the linearly strip-shaped groove structures 234. Each of the linearly strip-shaped groove structures 230, 234 has a smooth surface.

Each of the linearly strip-shaped groove structures 230, 234 is strip-shaped. Further, each of the linearly strip-shaped groove structures 230, 234 is V-shapedly strip-shaped. Each of the linearly strip-shaped groove structures 230, 234 includes two inclined surfaces 236. Each of the two inclined surfaces 236 faces toward the object side za. The two inclined surfaces 236 of each of the linearly strip-shaped groove structures 230, 234 extend toward the image side zb and are connected to each other.

In the 2nd embodiment, each of the groove structures is one linearly strip-shaped groove structure of the linearly strip-shaped groove structures 230, 234, and extends along the sagittal direction s away from the optical axis z, i.e., is disposed in the extending manner along the sagittal direction s away from the optical axis z. The linearly strip-shaped groove structures 230 are regularly arranged along a circumferential direction of the optical axis z. The linearly strip-shaped groove structures 234 are regularly arranged along the circumferential direction of the optical axis z.

Specifically, each of the linearly strip-shaped groove structures 230 is disposed correspondingly and connected to one of the linearly strip-shaped groove structures 234. A number of the linearly strip-shaped groove structures 230 is 144, and a number of the linearly strip-shaped groove structures 234 is 144. Thus, a number (i.e., a sum) Ns of the linearly strip-shaped groove structures 230, 234 is 288.

In FIG. 2D, a width along the circumferential direction of a position away from the optical axis z of each of the linearly strip-shaped groove structures 230 is different from a width along the circumferential direction of a position close to the optical axis z thereof. A width along the circumferential direction of a position away from the optical axis z of each of the linearly strip-shaped groove structures 234 is different from a width along the circumferential direction of a position close to the optical axis z thereof. Further, the width along the circumferential direction of the position away from the optical axis z of each of the linearly strip-shaped groove structures 230 is greater than the width along the circumferential direction of the position close to the optical axis z thereof. The width along the circumferential direction of the position away from the optical axis z of each of the linearly strip-shaped groove structures 234 is greater than the width along the circumferential direction of the position close to the optical axis z thereof.

In FIG. 2C, a depth (e.g., a parameter d23 shown in FIG. 2C) along the direction parallel to the optical axis z of the position away from the optical axis z of each of the linearly strip-shaped groove structures 230 is greater than a depth (e.g., a parameter d24 shown in FIG. 2C) along the direction parallel to the optical axis z of the position close to the optical axis z thereof. A depth (e.g., a parameter d21 shown in FIG. 2C) along the direction parallel to the optical axis z of the position away from the optical axis z of each of the linearly strip-shaped groove structures 234 is greater than a depth (e.g., a parameter d22 shown in FIG. 2C) along the direction parallel to the optical axis z of the position close to the optical axis z thereof. In the 2nd embodiment, the depth along the direction parallel to the optical axis z of each of the linearly strip-shaped groove structures 230, 234 gradually becomes smaller from the position away from the optical axis z thereof to the position close to the optical axis z thereof.

The data of the parameters of the plastic lens barrel 200 according to the 2nd embodiment of the present disclosure are listed in the following Table 2, and the parameters are also shown as FIG. 2A, FIG. 2C and FIG. 2D. The definitions of these parameters shown in Table 2 are the same as those stated in the plastic lens barrel 100 according to the 1st embodiment.

TABLE 2

| 2nd Embodiment | | | |
|---|---|---|---|
| L (mm) | 0.709 | φi (mm) | 3.450 |
| T (mm) | 0.975 | φmin/φi | 0.92 |
| L/T | 0.73 | θ (deg.) | 60 |
| α (deg.) | 50 | Ns | 288 |
| φo (mm) | 5.400 | d21 (mm) | 0.102 |
| φmax (mm) | 8.700 | d22 (mm) | 0.095 |
| φo/φmax | 0.62 | d23 (mm) | 0.121 |
| φmin (mm) | 3.180 | d24 (mm) | 0.085 |

3rd Embodiment

Figure 3A:
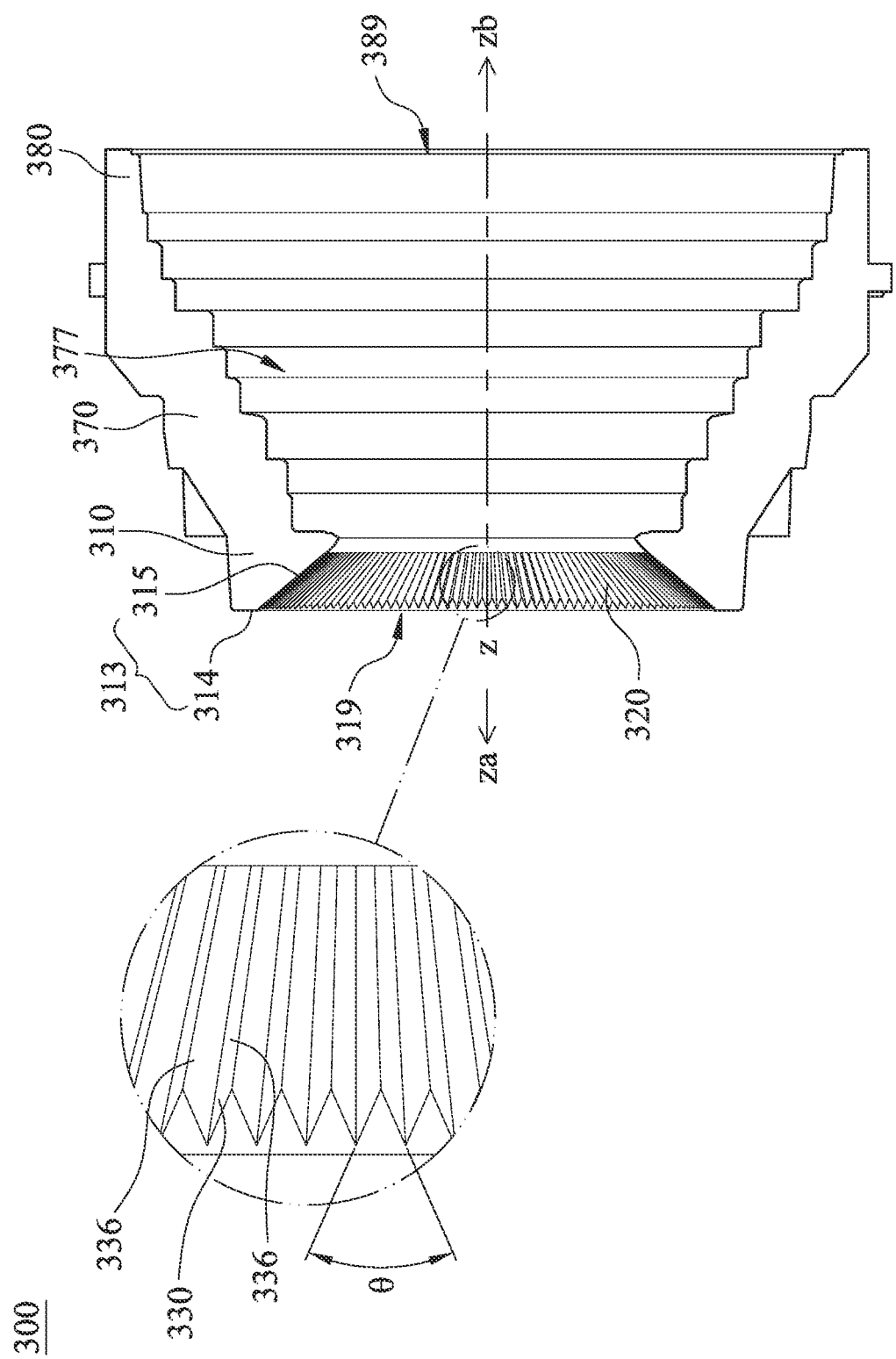
FIG. 3A is a schematic view of a plastic lens barrel according to the 3rd embodiment of the present disclosure.
Figure 3B:
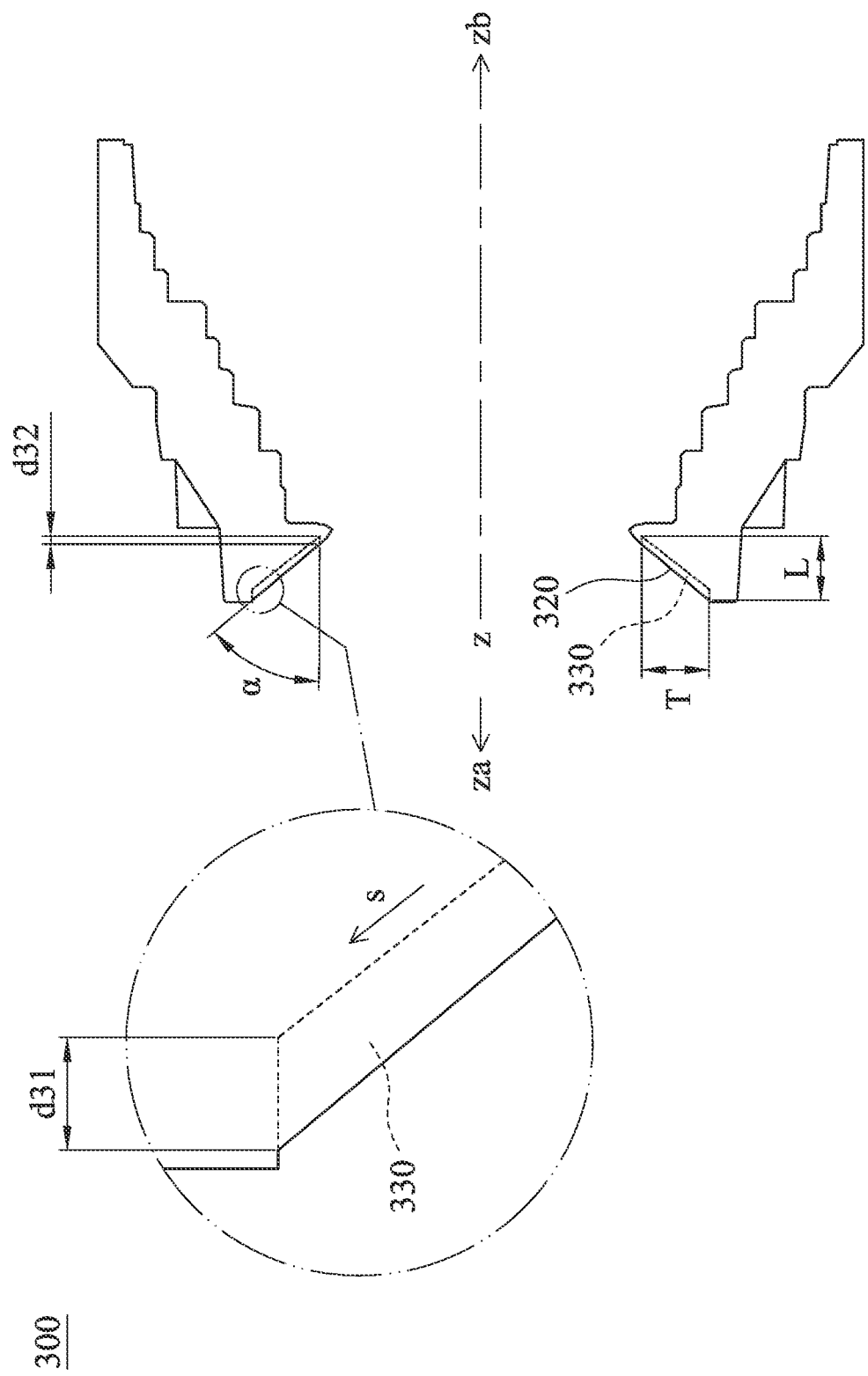
FIG. 3B is a schematic view showing parameters of the plastic lens barrel according to the 3rd embodiment.

FIG. 3A is a schematic view of the plastic lens barrel 300 according to the 3rd embodiment and also a cross-sectional view along a plane, which has a normal direction vertical to an optical axis z, of the plastic lens barrel 300. FIG. 3B is a schematic view showing parameters of the plastic lens barrel 300 according to the 3rd embodiment and also a cross-sectional view along another plane, which has a normal direction vertical to the optical axis z, of the plastic lens barrel 300. In FIG. 3A and FIG. 3B, the plastic lens barrel 300 has an inner space 377 for accommodating an imaging lens assembly (not shown in drawings), which has the optical axis z. The plastic lens barrel 300 includes an object-side portion 310, an image-side portion 380 and a tube-shaped portion 370.

In FIG. 3A and FIG. 3B, the plastic lens barrel 300 includes the object-side portion 310, the tube-shaped portion 370 and the image-side portion 380, in order from an object side za to an image side zb. The object-side portion 310 is located close to the object side za of the plastic lens barrel 300. The object-side portion 310 includes an object-side opening 319 and an object-side annular surface 313. The object-side annular surface 313 surrounds the object-side opening 319 and faces toward the object side za. The image-side portion 380 is located close to the image side zb of the plastic lens barrel 300 and includes an image-side opening 389. The tube-shaped portion 370 surrounds the optical axis z. The tube-shaped portion 370 is connected between the object-side portion 310 and the image-side portion 380, and configured to define the inner space 377.

Figure 3C:
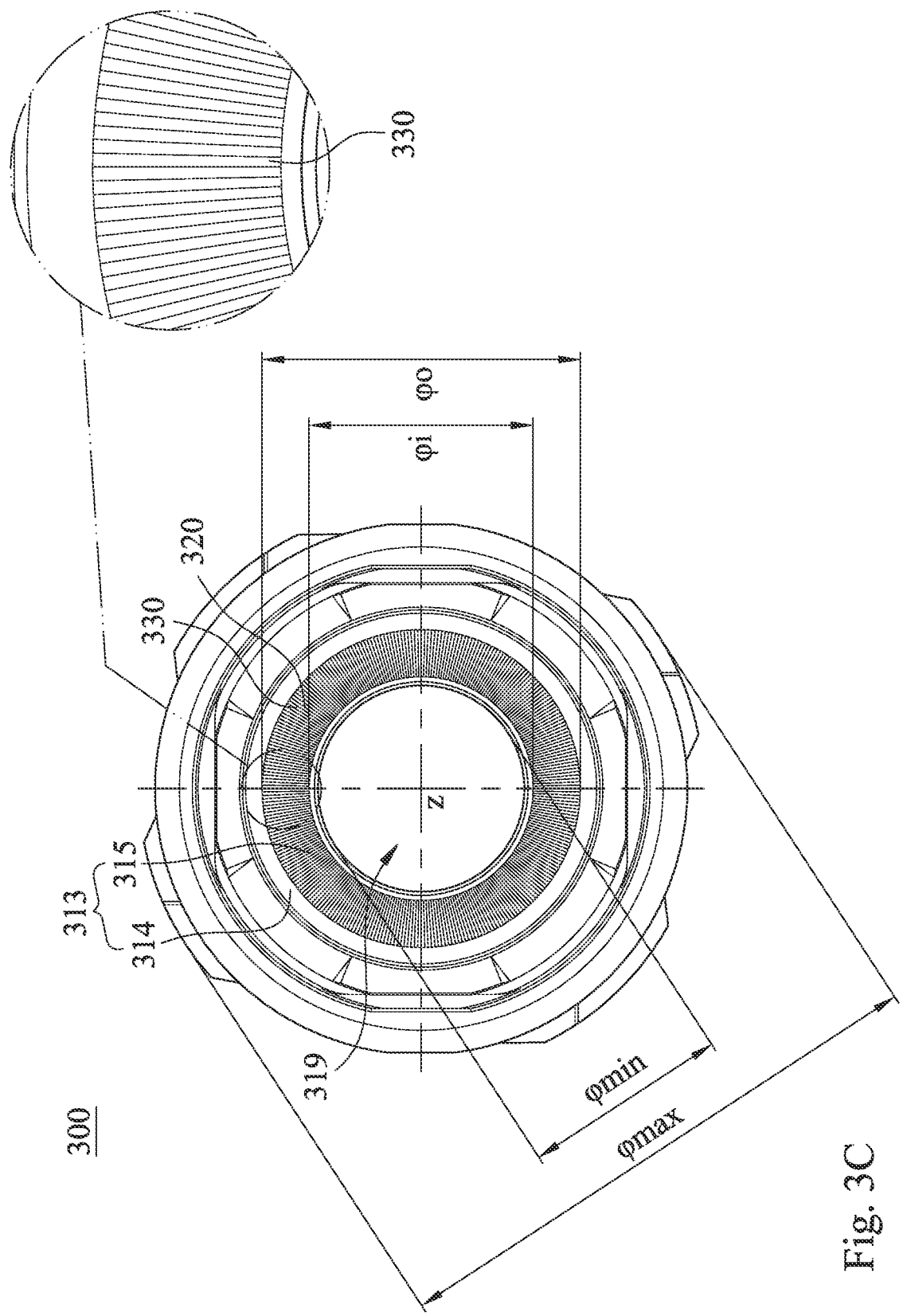
FIG. 3C is a side view from an object side of the plastic lens barrel according to the 3rd embodiment.

FIG. 3C is a side view from the object side za of the plastic lens barrel 300 according to the 3rd embodiment. In FIG. 3A to FIG. 3C, the object-side annular surface 313 includes a groove structure area 320. The groove structure area 320 includes a plurality of groove structures. The groove structures are specifically a plurality of linearly strip-shaped groove structures 330. Each of the linearly strip-shaped groove structures 330 is disposed in an extending manner along a sagittal direction s away from the optical axis z.

In FIG. 3A to FIG. 3C, the object-side annular surface 313 further includes an object-side outer annular surface 314 and an object-side inner annular surface 315. The object-side inner annular surface 315 is located closer to the optical axis z than the object-side outer annular surface 314 to the optical axis z. An entirety of the groove structure area 320 (i.e., all the linearly strip-shaped groove structures 330) is disposed on the object-side inner annular surface 315. Each of the linearly strip-shaped groove structures 330 has a smooth surface.

Each of the linearly strip-shaped groove structures 330 is strip-shaped. Further, each of the linearly strip-shaped groove structures 330 is V-shapedly strip-shaped. Each of the linearly strip-shaped groove structures 330 includes two inclined surfaces 336. Each of the two inclined surfaces 336 faces toward the object side za. The two inclined surfaces 336 of each of the linearly strip-shaped groove structures 330 extend toward the image side zb and are connected to each other.

In the 3rd embodiment, each of the groove structures is one of the linearly strip-shaped groove structures 330, and extends along the sagittal direction s away from the optical axis z, i.e., is disposed in the extending manner along the sagittal direction s away from the optical axis z. The linearly strip-shaped groove structures 330 are regularly arranged along a circumferential direction of the optical axis z. Specifically, a number Ns of the linearly strip-shaped groove structures 330 is 144.

In FIG. 3C, a width along the circumferential direction of a position away from the optical axis z of each of the linearly strip-shaped groove structures 330 is different from a width along the circumferential direction of a position close to the optical axis z thereof. Further, the width along the circumferential direction of the position away from the optical axis z of each of the linearly strip-shaped groove structures 330 is greater than the width along the circumferential direction of the position close to the optical axis z thereof.

In FIG. 3B, a depth (e.g., a parameter d31 shown in FIG. 3B) along the direction parallel to the optical axis z of the position away from the optical axis z of each of the linearly strip-shaped groove structures 330 is greater than a depth (e.g., a parameter d32 shown in FIG. 3B) along the direction parallel to the optical axis z of the position close to the optical axis z thereof.

When the depth along the direction parallel to the optical axis z of each of the linearly strip-shaped groove structures 330 is d, the following condition is satisfied: 0.04 mm<d<0.30 mm. In the 3rd embodiment, the parameter d of each of the linearly strip-shaped groove structures 330 varies in accordance with a position of the sagittal direction s. For example, a value of the parameter d (e.g., a parameter d31 shown in FIG. 3B) of the position away from the optical axis z of each of the linearly strip-shaped groove structures 330 is different from a value of the parameter d (e.g., a parameter d32 shown in FIG. 3B) of the position close to the optical axis z thereof. However, the value of the parameter d of each position of each of the linearly strip-shaped groove structures 330 satisfies the condition range of the parameter d described in this paragraph.

The data of the parameters of the plastic lens barrel 300 according to the 3rd embodiment of the present disclosure are listed in the following Table 3, and the parameters are also shown as FIG. 3A to FIG. 3C. The definitions of these parameters shown in Table 3 are the same as those stated in the plastic lens barrel 100 according to the 1st embodiment.

TABLE 3

| 3rd Embodiment | | | |
|---|---|---|---|
| L (mm) | 0.689 | φmin (mm) | 3.180 |
| T (mm) | 0.725 | φi (mm) | 3.450 |
| L/T | 0.95 | φmin/φi | 0.92 |
| α (deg.) | 50 | θ (deg.) | 48 |
| φo (mm) | 4.900 | Ns | 144 |
| φmax (mm) | 8.700 | d31 (mm) | 0.121 |
| φo/φmax | 0.56 | d32 (mm) | 0.085 |

4th Embodiment

Figure 4A:
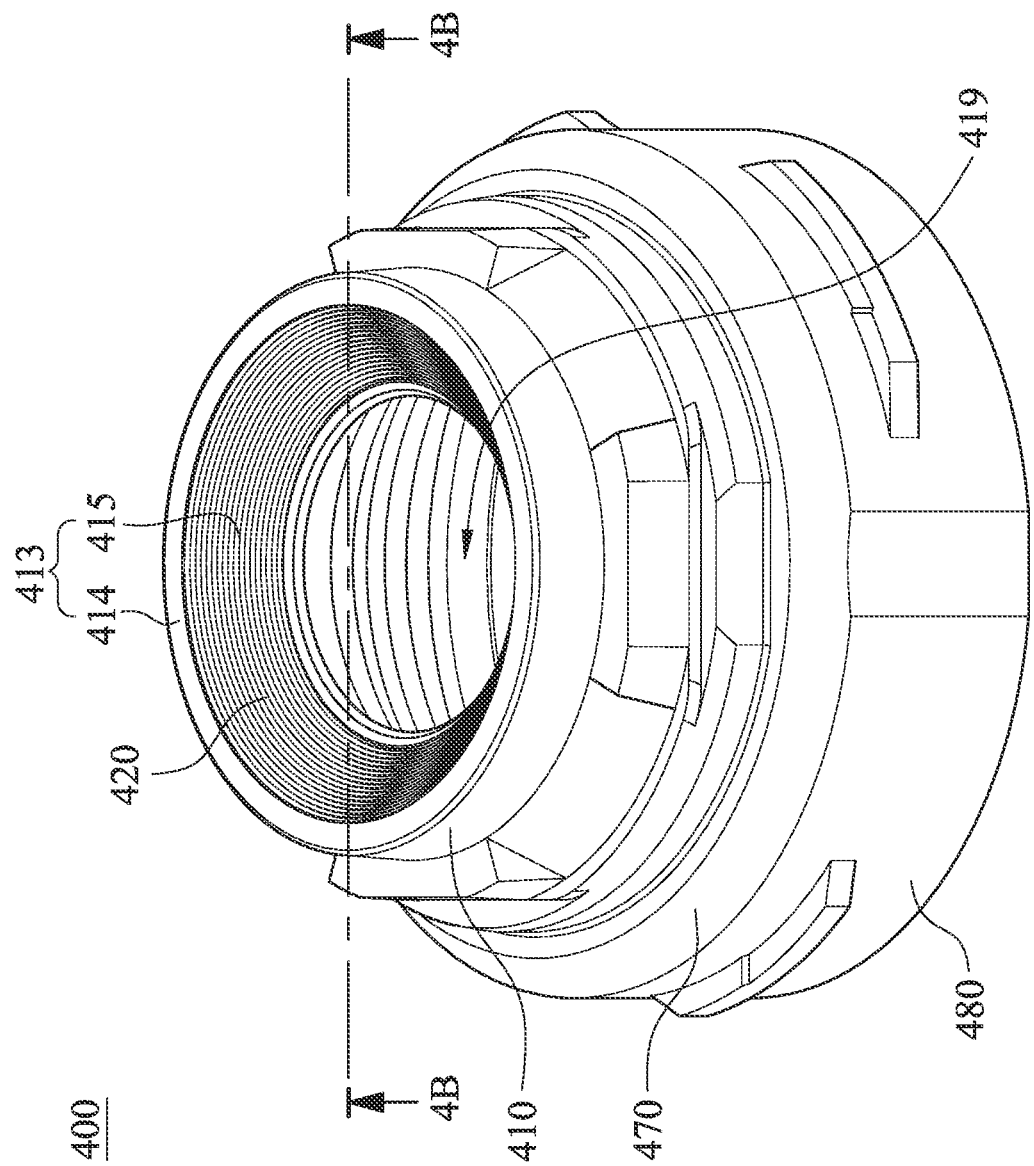
FIG. 4A is a three-dimensional view of a plastic lens barrel according to the 4th embodiment of the present disclosure.
Figure 4B:
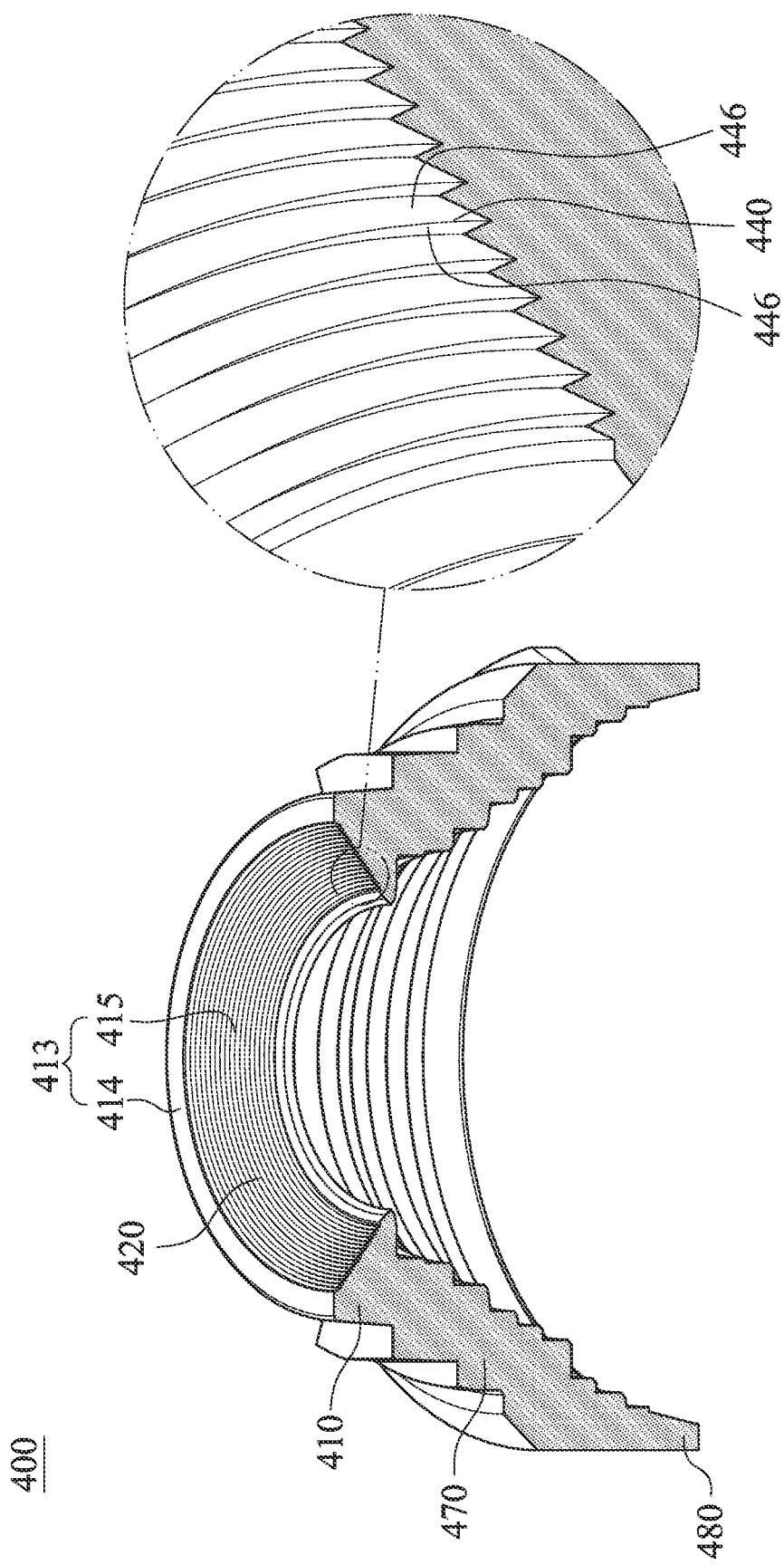
FIG. 4B is a three-dimensional view with a cross-section along line 4B-4B of FIG. 4A.
Figure 4C:
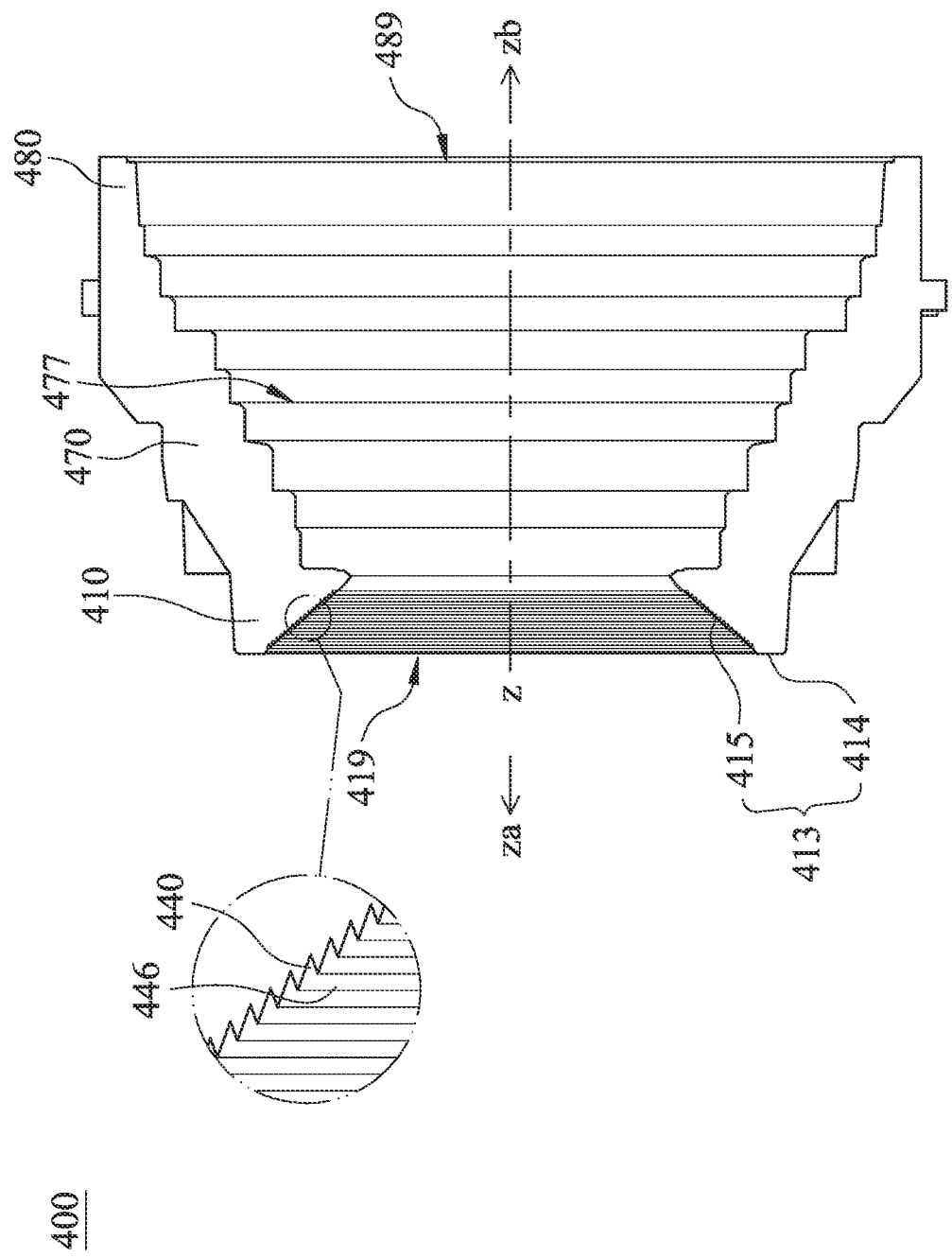
FIG. 4C is a schematic view of the plastic lens barrel according to the 4th embodiment.
Figure 4D:
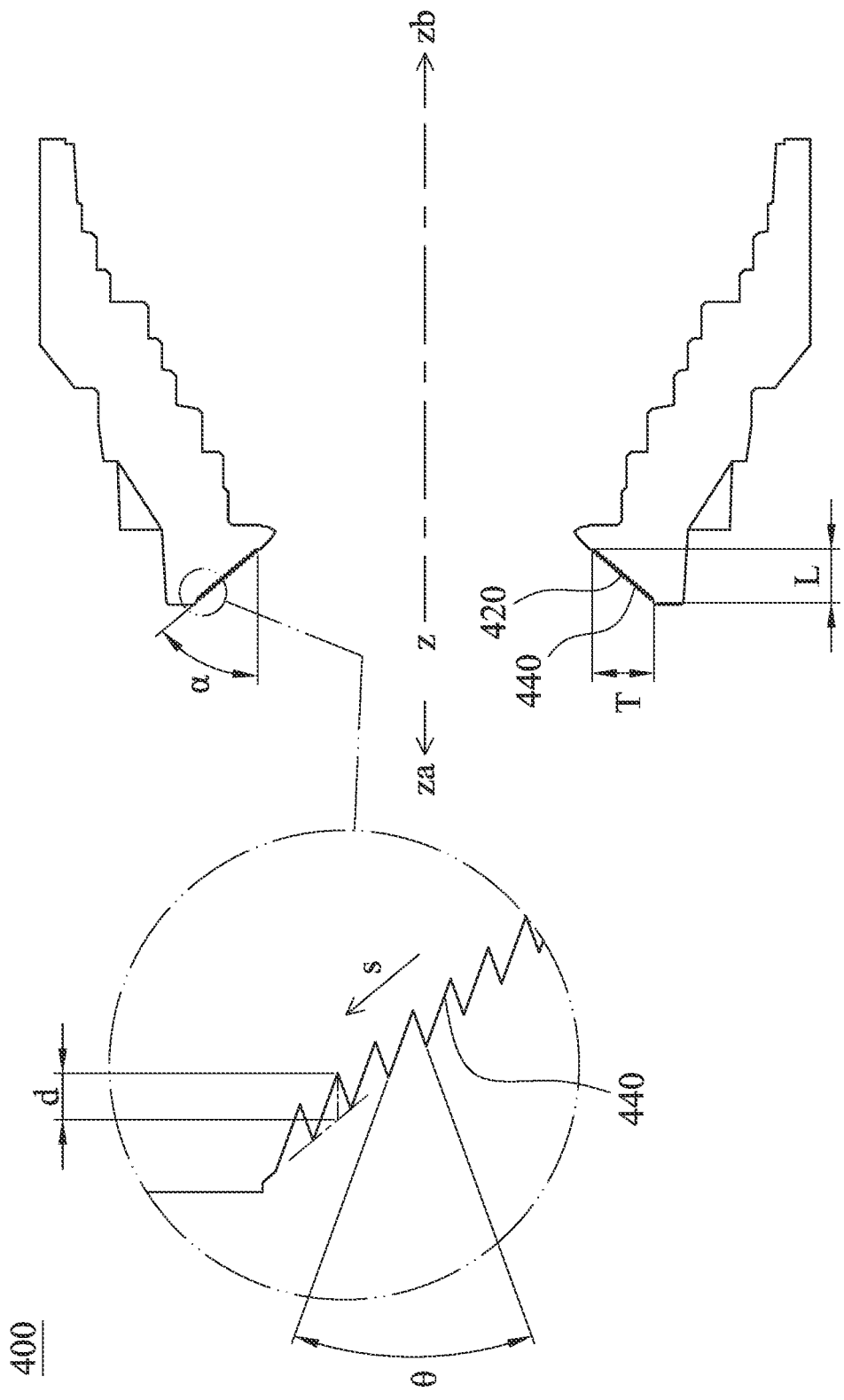
FIG. 4D is a schematic view showing parameters of the plastic lens barrel according to the 4th embodiment.

FIG. 4A is a three-dimensional view of a plastic lens barrel 400 according to the 4th embodiment of the present disclosure. FIG. 4B is a three-dimensional view with a cross-section along line 4B-4B of FIG. 4A and marked with dots on the cross-section to more clearly show the structure characteristics therein. FIG. 4C is a schematic view of the plastic lens barrel 400 according to the 4th embodiment and also a cross-sectional view along a plane, which has a normal direction vertical to an optical axis z, of the plastic lens barrel 400. FIG. 4D is a schematic view showing parameters of the plastic lens barrel 400 according to the 4th embodiment and also a cross-sectional view along another plane, which has a normal direction vertical to the optical axis z, of the plastic lens barrel 400. In FIG. 4A to FIG. 4D, the plastic lens barrel 400 has an inner space 477 for accommodating an imaging lens assembly (not shown in drawings), which has the optical axis z. The plastic lens barrel 400 includes an object-side portion 410, an image-side portion 480 and a tube-shaped portion 470.

In FIG. 4A to FIG. 4D, the plastic lens barrel 400 includes the object-side portion 410, the tube-shaped portion 470 and the image-side portion 480, in order from an object side za to an image side zb. The object-side portion 410 is located close to the object side za of the plastic lens barrel 400. The object-side portion 410 includes an object-side opening 419 and an object-side annular surface 413. The object-side annular surface 413 surrounds the object-side opening 419 and faces toward the object side za. The image-side portion 480 is located close to the image side zb of the plastic lens barrel 400 and includes an image-side opening 489. The tube-shaped portion 470 surrounds the optical axis z. The tube-shaped portion 470 is connected between the object-side portion 410 and the image-side portion 480, and configured to define the inner space 477.

Figure 4E:
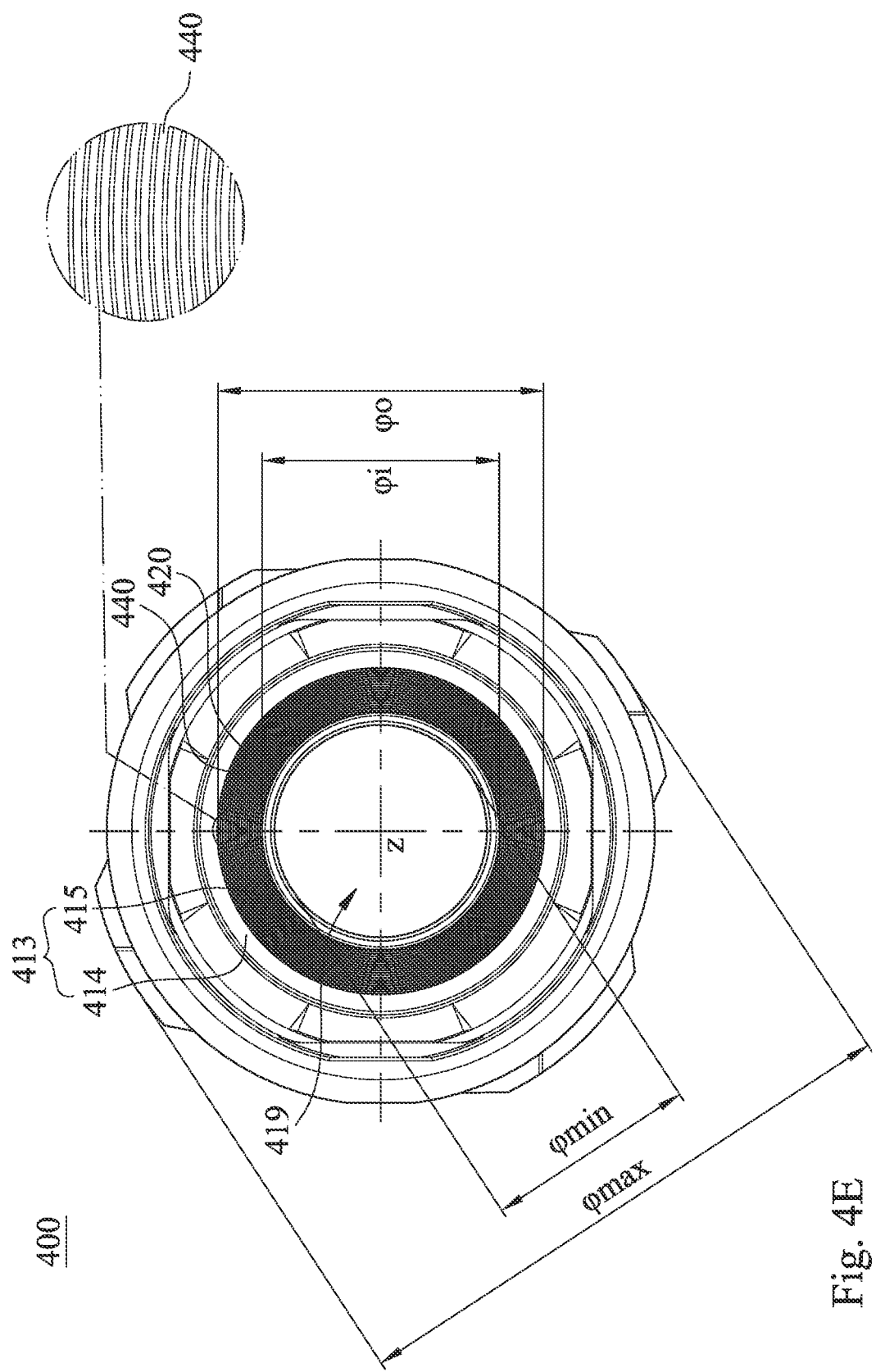
FIG. 4E is a side view from an object side of the plastic lens barrel according to the 4th embodiment.

FIG. 4E is a side view from the object side za of the plastic lens barrel 400 according to the 4th embodiment. In FIG. 4A to FIG. 4E, the object-side annular surface 413 includes a groove structure area 420. The groove structure area 420 includes a plurality of groove structures. The groove structures are specifically a plurality of annularly strip-shaped groove structures 440. The annularly strip-shaped groove structures 440 are disposed in an arranging manner along a sagittal directions away from the optical axis z, i.e., are arranged along the sagittal direction s away from the optical axis z.

In FIG. 4A to FIG. 4E, the object-side annular surface 413 further includes an object-side outer annular surface 414 and an object-side inner annular surface 415. The object-side inner annular surface 415 is located closer to the optical axis z than the object-side outer annular surface 414 to the optical axis z. An entirety of the groove structure area 420 (i.e., all the annularly strip-shaped groove structures 440) is disposed on the object-side inner annular surface 415. Each of the annularly strip-shaped groove structures 440 has a smooth surface.

Each of the annularly strip-shaped groove structures 440 is strip-shaped. Further, each of the annularly strip-shaped groove structures 440 is V-shapedly strip-shaped. Specifically, each of the annularly strip-shaped groove structures 440 is annularly strip-shaped being V-shaped in a transverse cross-section thereof. Each of the annularly strip-shaped groove structures 440 includes two inclined surfaces 446. Each of the two inclined surfaces 446 faces toward the object side za. The two inclined surfaces 446 of each of the annularly strip-shaped groove structures 440 extend toward the image side zb and are connected to each other. When an angle between the two inclined surfaces 446 of each of the annularly strip-shaped groove structures 440 is θ, the following condition is be satisfied: 15 degrees<θ<85 degrees.

In the 4th embodiment, each of the groove structures is one of the annularly strip-shaped groove structures 440, which extends to surround the optical axis z. The annularly strip-shaped groove structures 440 are regularly arranged along the sagittal direction s away from the optical axis z. That is, the annularly strip-shaped groove structures 440 have the same structures, substantially the same structures or similar structures, and every adjacent two of the annularly strip-shaped groove structures 440 have the same spacing. Therefore, it is favorable for simplifying the manufacturing process of the plastic lens barrel 400, and thereby increasing the production efficiency.

When a number of the annularly strip-shaped groove structures 440 is Nt, the following condition is satisfied: 5≤Nt≤25. Therefore, it is favorable for providing the structural denseness and manufacturability of the annularly strip-shaped groove structures 440.

In FIG. 4D, on the groove structure area 420, a depth (e.g., a parameter d shown in FIG. 4D) along a direction parallel to the optical axis z of a position away from the optical axis z of each of the annularly strip-shaped groove structures 440 is equal to a depth along the direction parallel to the optical axis z of a position close to the optical axis z thereof. When the depth along the direction parallel to the optical axis z of each of the annularly strip-shaped groove structures 440 is d, the following condition is satisfied: 0.04 mm<d<0.30 mm. In the 4th embodiment, values of the parameter d of all positions of each of the annularly strip-shaped groove structures 440 are the same.

The data of the parameters of the plastic lens barrel 400 according to the 4th embodiment of the present disclosure are listed in the following Table 4, and the parameters are also shown as FIG. 4D and FIG. 4E. The definitions of these parameters shown in Table 4 are stated in the paragraphs of the plastic lens barrel 400 according to the 4th embodiment or the same as those stated in the plastic lens barrel 100 according to the 1st embodiment.

TABLE 4

4th Embodiment

| | | | |
|---|---|---|---|
| L (mm) | 0.573 | φmin (mm) | 3.180 |
| T (mm) | 0.655 | φi (mm) | 3.547 |
| L/T | 0.87 | φmin/φi | 0.90 |
| α (deg.) | 50 | θ (deg.) | 40 |
| φo (mm) | 4.872 | Nt | 16 |
| φmax (mm) | 8.700 | d (mm) | 0.050 |
| φo/φmax | 0.56 | | |

5th Embodiment

Figure 5A:
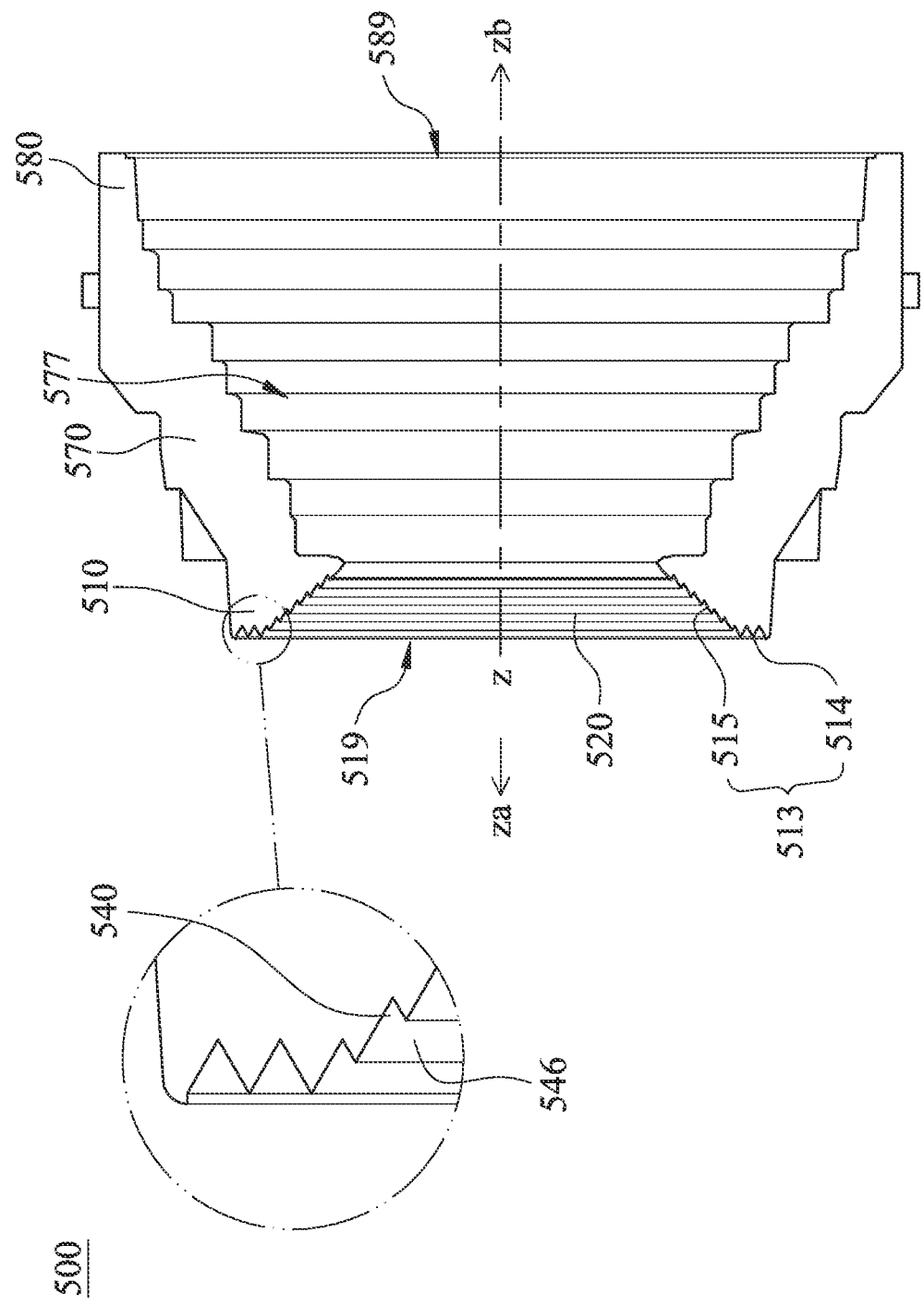
FIG. 5A is a schematic view of a plastic lens barrel according to the 5th embodiment of the present disclosure.
Figure 5B:
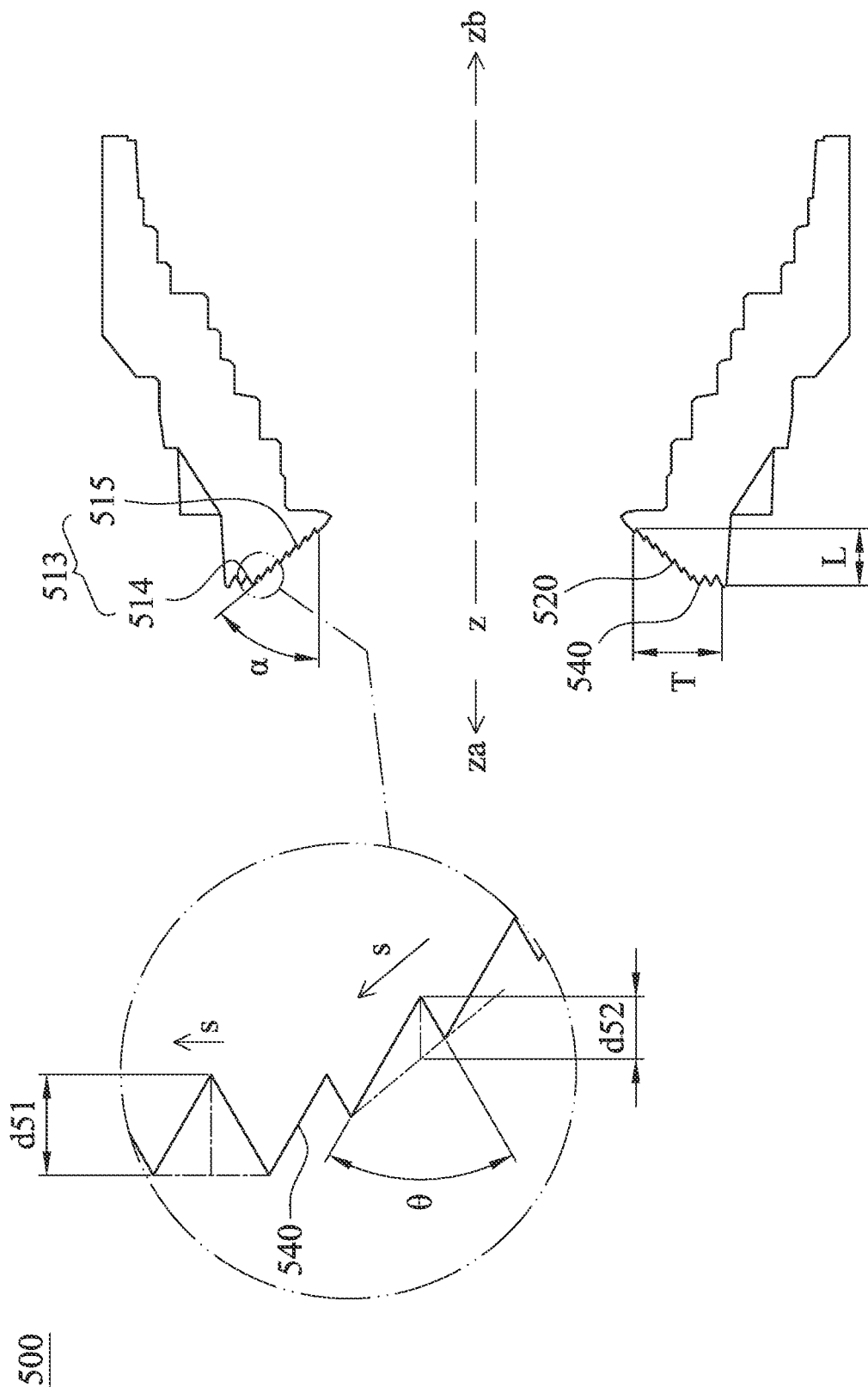
FIG. 5B is a schematic view showing parameters of the plastic lens barrel according to the 5th embodiment.

FIG. 5A is a schematic view of a plastic lens barrel 500 according to the 5th embodiment of the present disclosure and also a cross-sectional view along a plane, which has a normal direction vertical to an optical axis z, of the plastic lens barrel 500. FIG. 5B is a schematic view showing parameters of the plastic lens barrel 500 according to the 5th embodiment and also a cross-sectional view along another plane, which has a normal direction vertical to the optical axis z, of the plastic lens barrel 500. In FIG. 5A and FIG. 5B, the plastic lens barrel 500 has an inner space 577 for accommodating an imaging lens assembly (not shown in drawings), which has the optical axis z. The plastic lens barrel 500 includes an object-side portion 510, an image-side portion 580 and a tube-shaped portion 570.

In FIG. 5A and FIG. 5B, the plastic lens barrel 500 includes the object-side portion 510, the tube-shaped portion 570 and the image-side portion 580, in order from an object side za to an image side zb. The object-side portion 510 is located close to the object side za of the plastic lens barrel 500. The object-side portion 510 includes an object-side opening 519 and an object-side annular surface 513. The object-side annular surface 513 surrounds the object-side opening 519 and faces toward the object side za. The image-side portion 580 is located close to the image side zb of the plastic lens barrel 500 and includes an image-side opening 589. The tube-shaped portion 570 surrounds the optical axis z. The tube-shaped portion 570 is connected between the object-side portion 510 and the image-side portion 580, and configured to define the inner space 577.

Figure 5C:
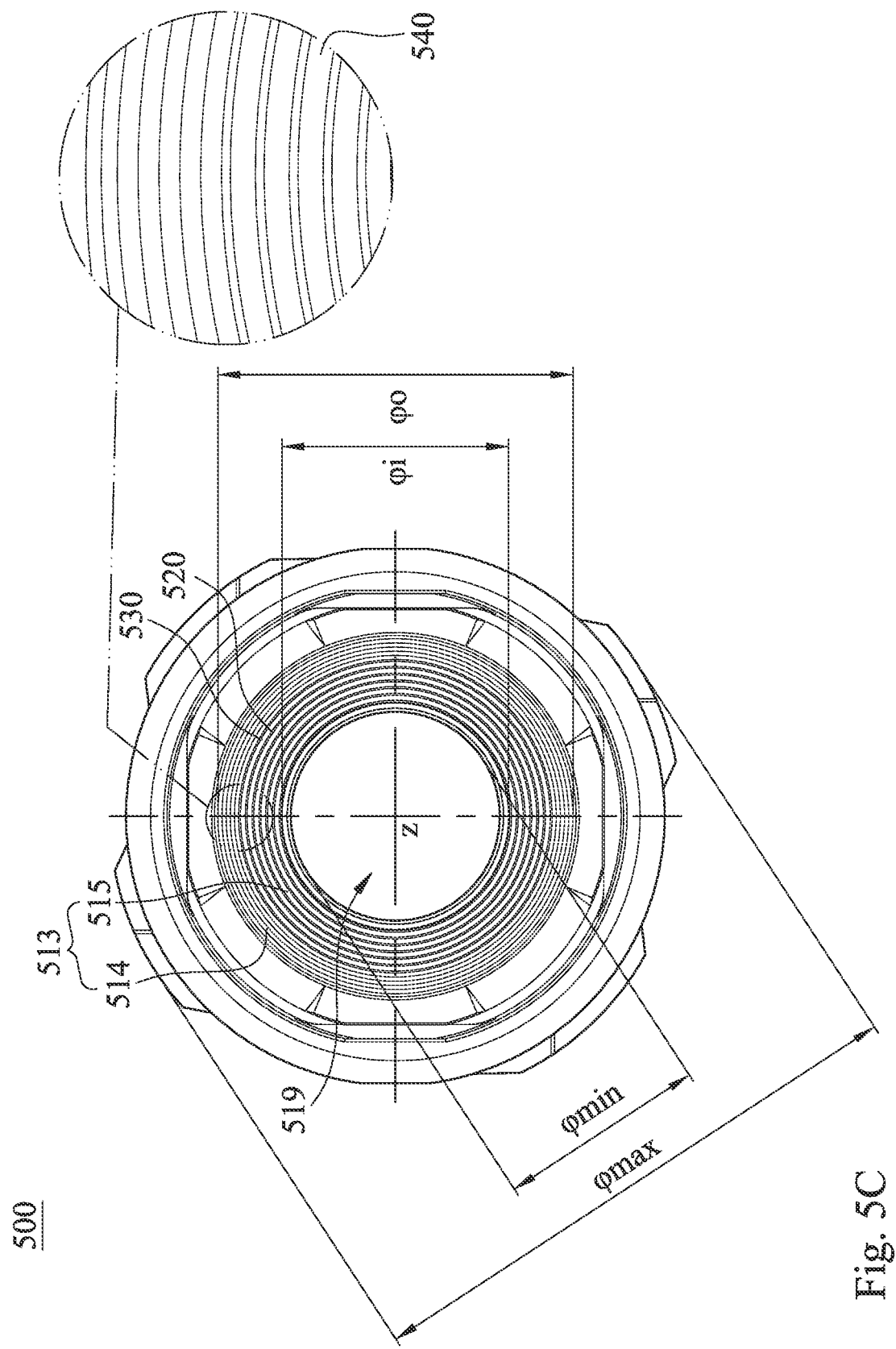
FIG. 5C is a side view from an object side of the plastic lens barrel according to the 5th embodiment.

FIG. 5C is a side view from the object side za of the plastic lens barrel 500 according to the 5th embodiment. In FIG. 5A to FIG. 5C, the object-side annular surface 513 includes a groove structure area 520. The groove structure area 520 includes a plurality of groove structures. The groove structures are specifically a plurality of annularly strip-shaped groove structures 540. The annularly strip-shaped groove structures 540 are disposed in an arranging manner along a sagittal directions away from the optical axis z, i.e., are arranged along the sagittal direction s away from the optical axis z.

In FIG. 5A to FIG. 5C, the object-side annular surface 513 further includes an object-side outer annular surface 514 and an object-side inner annular surface 515. The object-side inner annular surface 515 is located closer to the optical axis z than the object-side outer annular surface 514 to the optical axis z. One part of the groove structure area 520 (i.e., a partial number of the annularly strip-shaped groove structures 540) is disposed on the object-side inner annular surface 515. Specifically, the groove structure area 520 is disposed on the object-side inner annular surface 515 and the object-side outer annular surface 514. That is, the partial number of the annularly strip-shaped groove structures 540 are disposed on the object-side inner annular surface 515, and the other partial number of the annularly strip-shaped groove structures 540 are disposed on the object-side outer annular surface 514. Each of the annularly strip-shaped groove structures 540 has a smooth surface.

Each of the annularly strip-shaped groove structures 540 is strip-shaped. Further, each of the annularly strip-shaped groove structures 540 is V-shapedly strip-shaped. Each of the annularly strip-shaped groove structures 540 includes two inclined surfaces 546. Each of the two inclined surfaces 546 faces toward the object side za. The two inclined surfaces 546 of each of the annularly strip-shaped groove structures 540 extend toward the image side zb and are connected to each other.

In the 5th embodiment, each of the groove structures is one of the annularly strip-shaped groove structures 540, which extends to surround the optical axis z. The annularly strip-shaped groove structures 540 that are disposed on the object-side inner annular surface 515 are regularly arranged along the sagittal direction s away from the optical axis z, and the annularly strip-shaped groove structures 540 that are disposed on the object-side outer annular surface 514 are regularly arranged along the sagittal direction s away from the optical axis z.

In FIG. 5B, on the groove structure area 520, a depth (e.g., a parameter d51 of one of the annularly strip-shaped groove structures 540 that is disposed on the object-side outer annular surface 514 shown in FIG. 5B) along a direction parallel to the optical axis z of each of the annularly strip-shaped groove structures 540 that is away from the optical axis z is greater than a depth (e.g., a parameter d52 of one of the annularly strip-shaped groove structures 540 that is disposed on the object-side inner annular surface 515 shown in FIG. 5B) along the direction parallel to the optical axis z of each of the annularly strip-shaped groove structures 540 that is close to the optical axis z.

When the depth along the direction parallel to the optical axis z of each of the annularly strip-shaped groove structures 540 is d, the following condition is satisfied: 0.04 mm<d<0.30 mm. In the 5th embodiment, the parameter d varies in accordance with positions of the sagittal direction s, on which the annularly strip-shaped groove structures 540 are respectively located. For example, a value of the parameter d (e.g., a parameter d51 shown in FIG. 5B) of one of the annularly strip-shaped groove structures 540 that is away from the optical axis z is different from a value of the parameter d (e.g., a parameter d52 shown in FIG. 5B) of one of the annularly strip-shaped groove structures 540 that is close to the optical axis z. However, the values of the parameter d of all the annularly strip-shaped groove structures 540, which are located on respective positions of the sagittal direction s, satisfy the condition range of the parameter d described in this paragraph.

The data of the parameters of the plastic lens barrel 500 according to the 5th embodiment of the present disclosure are listed in the following Table 5, and the parameters are also shown as FIG. 5B and FIG. 5C. The definitions of these parameters shown in Table 5 are the same as those stated in the plastic lens barrel 100 according to the 1st embodiment and the plastic lens barrel 400 according to the 4th embodiment.

TABLE 5

5th Embodiment

| L (mm) | 0.626 | φmin (mm) | 3.180 |
|---|---|---|---|
| T (mm) | 0.979 | φi (mm) | 3.450 |
| L/T | 0.64 | φmin/φi | 0.92 |
| α (deg.) | 50 | θ (deg.) | 60 |
| φo (mm) | 5.408 | Nt | 9 |
| φmax (mm) | 8.700 | d51 (mm) | 0.110 |
| φo/φmax | 0.62 | d52 (mm) | 0.069 |

6th Embodiment

Figure 6A:
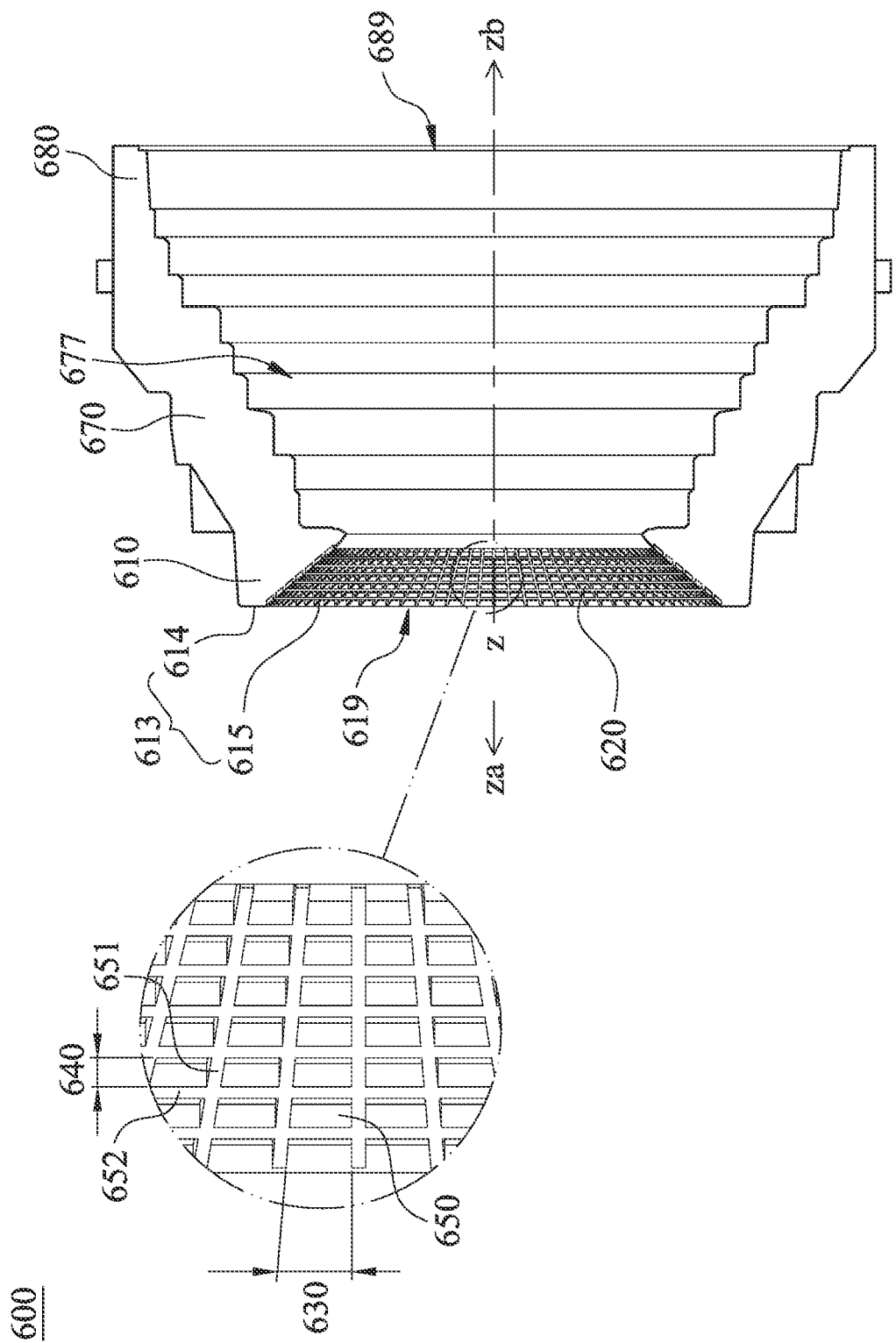
FIG. 6A is a schematic view of a plastic lens barrel according to the 6th embodiment of the present disclosure.
Figure 6B:
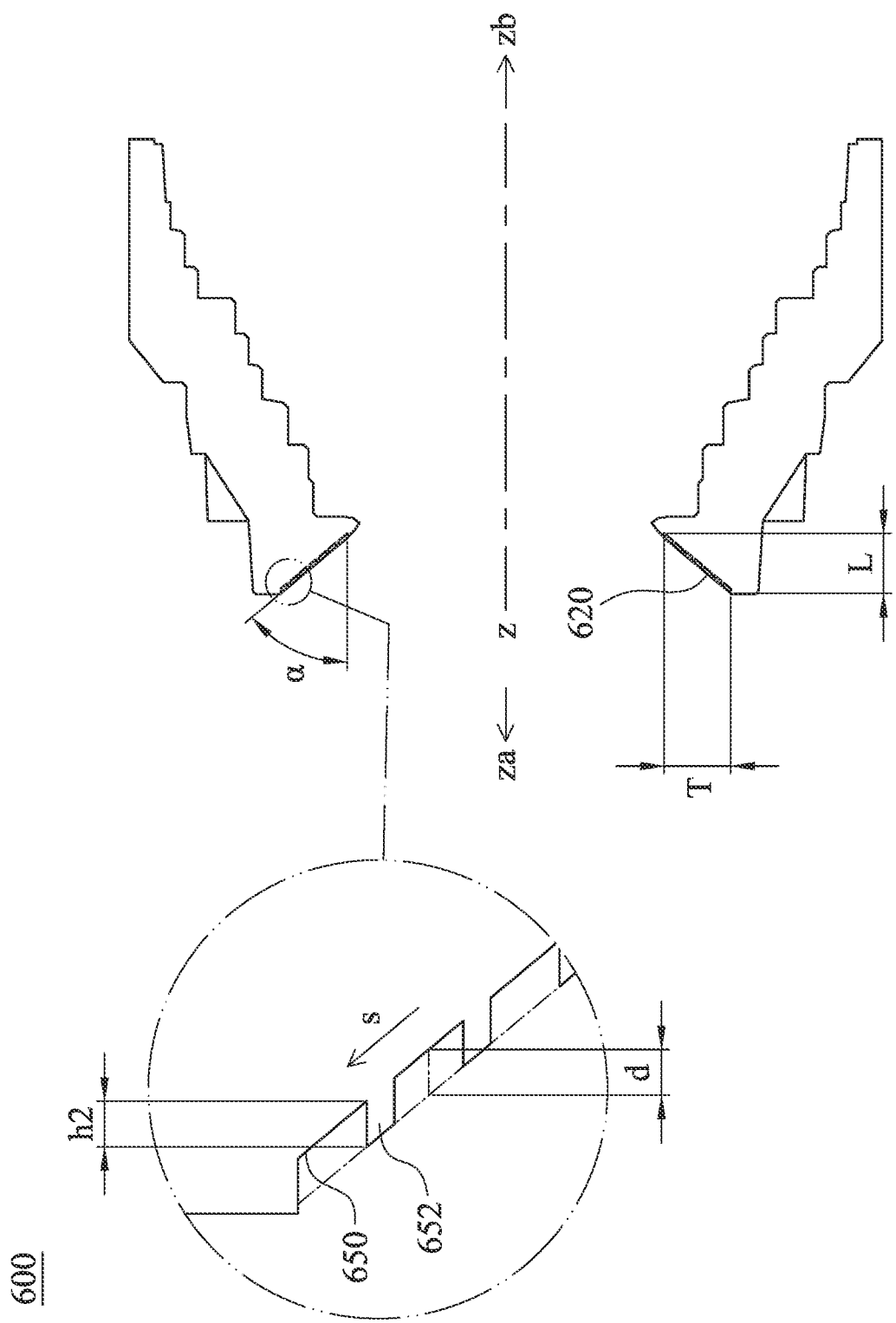
FIG. 6B is a schematic view showing parameters of the plastic lens barrel according to the 6th embodiment.

FIG. 6A is a schematic view of a plastic lens barrel 600 according to the 6th embodiment of the present disclosure and also a cross-sectional view along a plane, which has a normal direction vertical to an optical axis z, of the plastic lens barrel 600. FIG. 6B is a schematic view showing parameters of the plastic lens barrel 600 according to the 6th embodiment and also a cross-sectional view along another plane, which has a normal direction vertical to the optical axis z, of the plastic lens barrel 600. In FIG. 6A and FIG. 6B, the plastic lens barrel 600 has an inner space 677 for accommodating an imaging lens assembly (not shown in drawings), which has the optical axis z. The plastic lens barrel 600 includes an object-side portion 610, an image-side portion 680 and a tube-shaped portion 670.

In FIG. 6A and FIG. 6B, the plastic lens barrel 600 includes the object-side portion 610, the tube-shaped portion 670 and the image-side portion 680, in order from an object side za to an image side zb. The object-side portion 610 is located close to the object side za of the plastic lens barrel 600. The object-side portion 610 includes an object-side opening 619 and an object-side annular surface 613. The object-side annular surface 613 surrounds the object-side opening 619 and faces toward the object side za. The image-side portion 680 is located close to the image side zb of the plastic lens barrel 600 and includes an image-side opening 689. The tube-shaped portion 670 surrounds the optical axis z. The tube-shaped portion 670 is connected between the object-side portion 610 and the image-side portion 680, and configured to define the inner space 677.

Figure 6C:
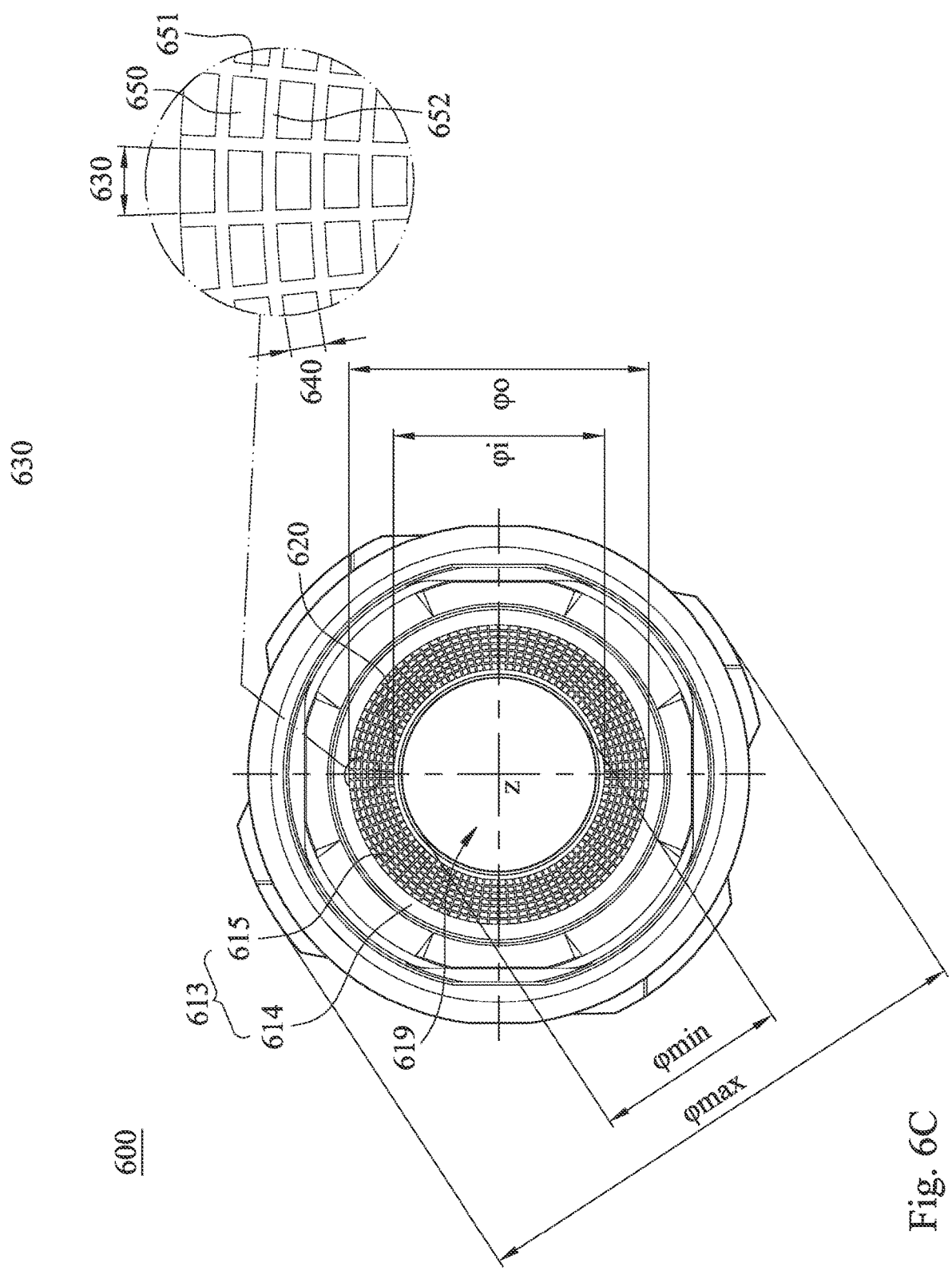
FIG. 6C is a side view from an object side of the plastic lens barrel according to the 6th embodiment.

FIG. 6C is a side view from the object side za of the plastic lens barrel 600 according to the 6th embodiment. In FIG. 6A to FIG. 6C, the object-side annular surface 613 includes a groove structure area 620. The groove structure area 620 includes a plurality of groove structures 650. The groove structures 650 are disposed in an arranging manner along a sagittal direction s away from the optical axis z, i.e., are arranged along the sagittal direction s away from the optical axis z.

In FIG. 6A to FIG. 6C, the object-side annular surface 613 further includes an object-side outer annular surface 614 and an object-side inner annular surface 615. The object-side inner annular surface 615 is located closer to the optical axis z than the object-side outer annular surface 614 to the optical axis z. An entirety of the groove structure area 620 (i.e., all the groove structures 650) is disposed on the object-side inner annular surface 615. Each of the groove structures 650 has a smooth surface.

In the 6th embodiment, the groove structures 650 are regularly arranged along a circumferential direction of the optical axis z and regularly arranged along the sagittal direction s away from the optical axis z. That is, the groove structures 650 are arranged in an array manner on the object-side inner annular surface 615. A separating wall (i.e., a first separating wall 651 or a second separating wall 652 specifically in the 6th embodiment) is disposed between each adjacent two of the groove structures 650, and the adjacent two of the groove structures 650 are separated from each other by the corresponding separating wall. Therefore, it is favorable for providing the complexity of the groove structures 650 and more easily performing the machining procedures of the mold of the plastic lens barrel 600. Specifically, each of the groove structures 650 is a recessed structure with a trapezoid-shaped opening as a whole. In one embodiment according to the present disclosure, a plurality of groove structures are regularly arranged along a circumferential direction of the optical axis and regularly arranged along a sagittal direction away from the optical axis. Each of the groove structures is a recessed structure with a polygon-shaped opening formed by linear edges or arc edges, but not limited thereto.

The separating walls include the at least one first separating wall 651 arranged along the circumferential direction of the optical axis z, and the at least one second separating wall 652 arranged along the sagittal direction s away from the optical axis z. In the 6th embodiment, a height along a direction parallel to the optical axis z of the first separating wall 651 is h1, and a height along the direction parallel to the optical axis z of the second separating wall 652 is h2 (as shown in FIG. 6B). The height h1 along the direction parallel to the optical axis z of the first separating wall 651 is the same as the height h2 along the direction parallel to the optical axis z of the second separating wall 652, and the height h1 is not shown in the drawings.

When a number of the groove structures 650 is Ni, the following condition is satisfied: 360≤Ni≥1200. Therefore, it is favorable for providing the structural denseness and maintaining the anti-reflective effects. Specifically, the number Ni of the groove structures 650 is 630.

In FIG. 6B, when a depth along the direction parallel to the optical axis z of each of the groove structures 650 is d, the following condition is satisfied: 0.04 mm<d<0.30 mm. In the 6th embodiment, values of the parameter d of all the groove structures 650 are the same.

In another point of view to observe the plurality of groove structures of the plastic lens barrel 600 in the 6th embodiment, in FIG. 6A to FIG. 6C, the object-side inner annular surface 615 of the object-side annular surface 613 includes the groove structure area 620. The groove structure area 620 includes a plurality of groove structures. The groove structures may be specifically a plurality of linearly strip-shaped groove structures 630 (labeled with brackets in FIG. 6A and FIG. 6C to be distinguished from the groove structures 650). Each of the linearly strip-shaped groove structures 630 is disposed in an extending manner along the sagittal direction s away from the optical axis z. That is, each of the linearly strip-shaped groove structures 630 is formed by a partial number of the groove structures 650 (specifically, seven of the groove structures 650) being disposed in the arranging manner along the sagittal direction s away from the optical axis z. Each of the linearly strip-shaped groove structures 630 has a smooth surface.

Each of the linearly strip-shaped groove structures 630 is strip-shaped. Each of the linearly strip-shaped groove structures 630 extends along the sagittal direction s away from the optical axis z, i.e., is disposed in the extending manner along the sagittal direction s away from the optical axis z. The linearly strip-shaped groove structures 630 are regularly arranged along the circumferential direction of the optical axis z. Specifically, a number Ns of the linearly strip-shaped groove structures 630 is 90.

In FIG. 6C, a width along the circumferential direction of a position away from the optical axis z of each of the linearly strip-shaped groove structures 630 is different from a width along the circumferential direction of a position close to the optical axis z thereof. Further, the width along the circumferential direction of the position away from the optical axis z of each of the linearly strip-shaped groove structures 630 is greater than the width along the circumferential direction of the position close to the optical axis z thereof.

In FIG. 6B, a depth (e.g., the parameter d shown in FIG. 6B) along the direction parallel to the optical axis z of the position away from the optical axis z of each of the linearly strip-shaped groove structures 630 is equal to a depth along the direction parallel to the optical axis z of the position close to the optical axis z thereof.

In further another point of view to observe the plurality of groove structures of the plastic lens barrel 600 in the 6th embodiment, in FIG. 6A to FIG. 6C, the object-side inner annular surface 615 of the object-side annular surface 613 includes the groove structure area 620. The groove structure area 620 includes a plurality of groove structures. The groove structures may be specifically a plurality of annularly strip-shaped groove structures 640 (labeled with line segments in FIG. 6A and FIG. 6C to be distinguished from the groove structures 650). The annularly strip-shaped groove structures 640 are disposed in the arranging manner along the sagittal direction s away from the optical axis z, i.e., are arranged along the sagittal direction s away from the optical axis z. Each of the annularly strip-shaped groove structures 640 is formed by a partial number of the groove structures 650 (specifically, ninety of the groove structures 650) being arranged along the circumferential direction of the optical axis z. Each of the annularly strip-shaped groove structures 640 has a smooth surface.

Each of the annularly strip-shaped groove structures 640 is strip-shaped. Each of the annularly strip-shaped groove structures 640 extends to surround the optical axis z. The annularly strip-shaped groove structures 640 are regularly arranged along the sagittal direction s away from the optical axis z. Specifically, a number Nt of the annularly strip-shaped groove structures 640 is 7.

The data of the parameters of the plastic lens barrel 600 according to the 6th embodiment of the present disclosure are listed in the following Table 6, and the parameters are also shown as FIG. 6B and FIG. 6C. The definitions of these parameters shown in Table 6 are stated in the paragraphs of the plastic lens barrel 600 according to the 6th embodiment, or the same as those stated in the plastic lens barrel 100 according to the 1st embodiment and the plastic lens barrel 400 according to the 4th embodiment.

TABLE 6

| 6th Embodiment | | | |
|---|---|---|---|
| L (mm) | 0.654 | φi (mm) | 3.450 |
| T (mm) | 0.725 | φmin/φi | 0.92 |
| L/T | 0.90 | Ni | 630 |
| α (deg.) | 50 | h1 (mm) | 0.050 |
| φo (mm) | 4.900 | h2 (mm) | 0.050 |
| φmax (mm) | 8.700 | Ns | 90 |
| φo/φmax | 0.56 | d (mm) | 0.050 |
| φmin (mm) | 3.180 | Nt | 7 |

7th Embodiment

Figure 7A:
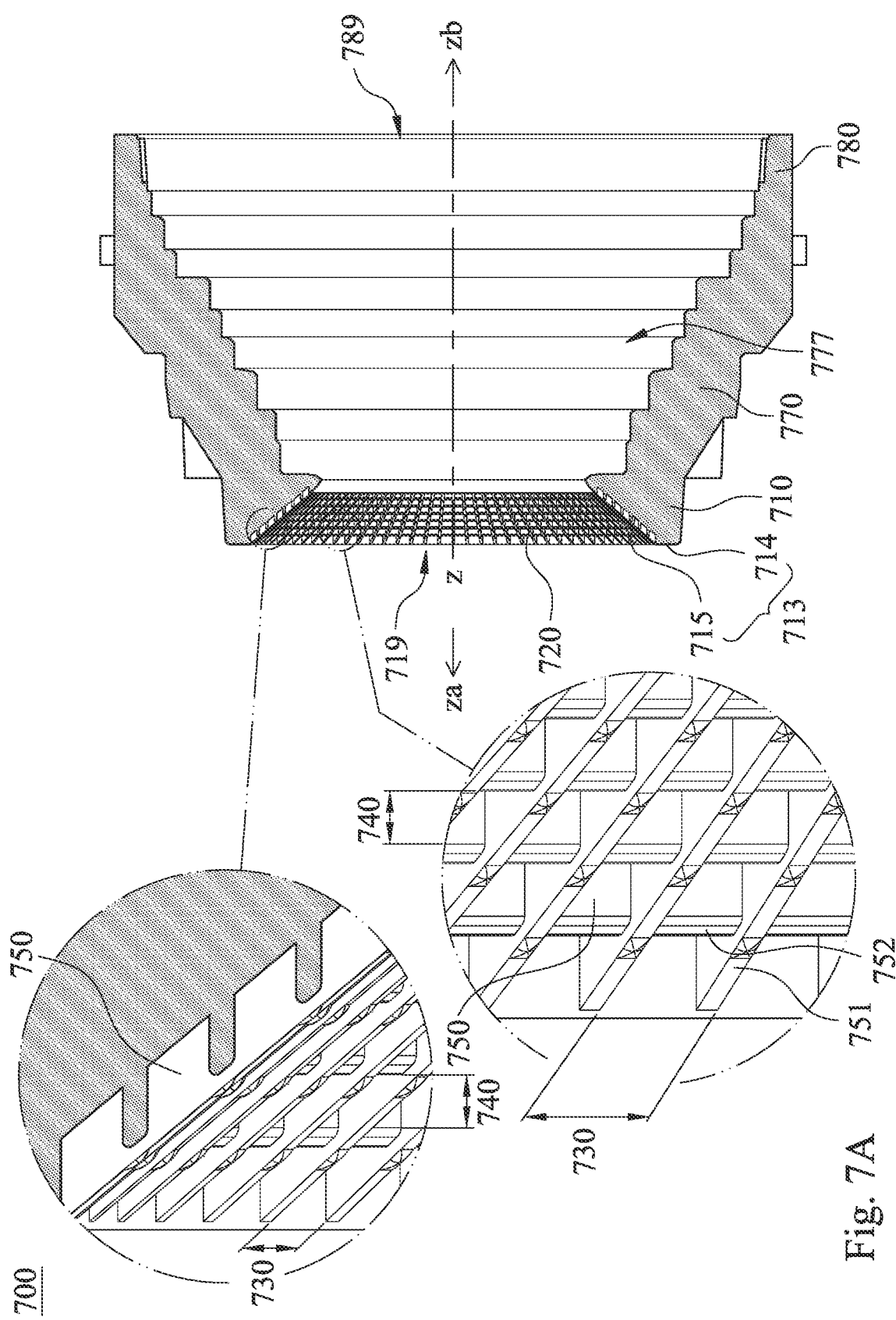
FIG. 7A is a schematic view of a plastic lens barrel according to the 7th embodiment of the present disclosure.
Figure 7B:
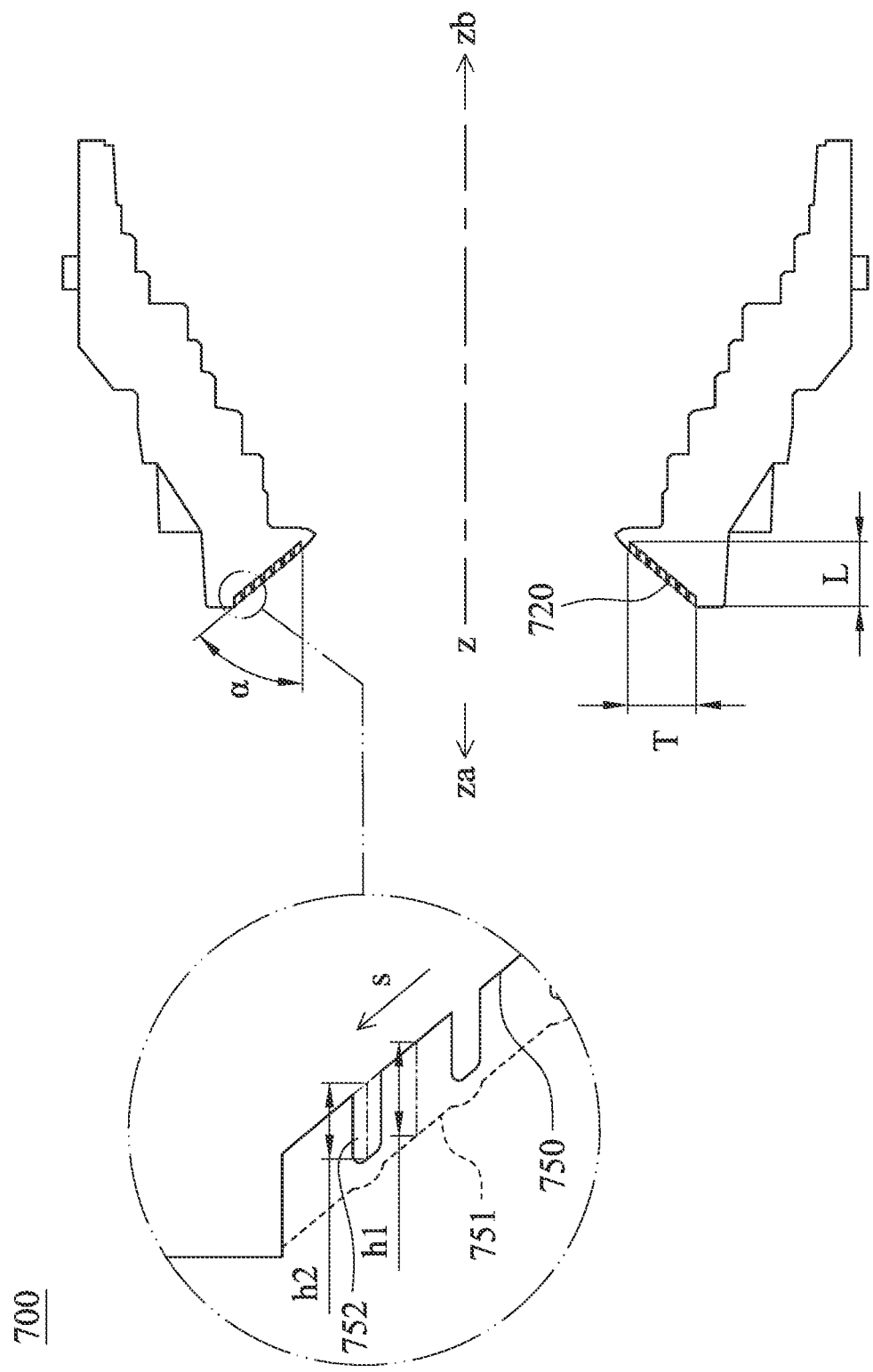
FIG. 7B is a schematic view showing parameters of the plastic lens barrel according to the 7th embodiment.

FIG. 7A is a schematic view of a plastic lens barrel 700 according to the 7th embodiment of the present disclosure and also a cross-sectional view along a plane, which has a normal direction vertical to an optical axis z, of the plastic lens barrel 700. FIG. 7A is marked with dots on a part to more clearly show the structure characteristics therein. FIG. 7B is a schematic view showing parameters of the plastic lens barrel 700 according to the 7th embodiment and also a cross-sectional view along another plane, which has a normal direction vertical to the optical axis z, of the plastic lens barrel 700. In FIG. 7A and FIG. 7B, the plastic lens barrel 700 has an inner space 777 for accommodating an imaging lens assembly (not shown in drawings), which has the optical axis z. The plastic lens barrel 700 includes an object-side portion 710, an image-side portion 780 and a tube-shaped portion 770.

In FIG. 7A and FIG. 7B, the plastic lens barrel 700 includes the object-side portion 710, the tube-shaped portion 770 and the image-side portion 780, in order from an object side za to an image side zb. The object-side portion 710 is located close to the object side za of the plastic lens barrel 700. The object-side portion 710 includes an object-side opening 719 and an object-side annular surface 713. The object-side annular surface 713 surrounds the object-side opening 719 and faces toward the object side za. The image-side portion 780 is located close to the image side zb of the plastic lens barrel 700 and includes an image-side opening 789. The tube-shaped portion 770 surrounds the optical axis z. The tube-shaped portion 770 is connected between the object-side portion 710 and the image-side portion 780, and configured to define the inner space 777.

Figure 7C:
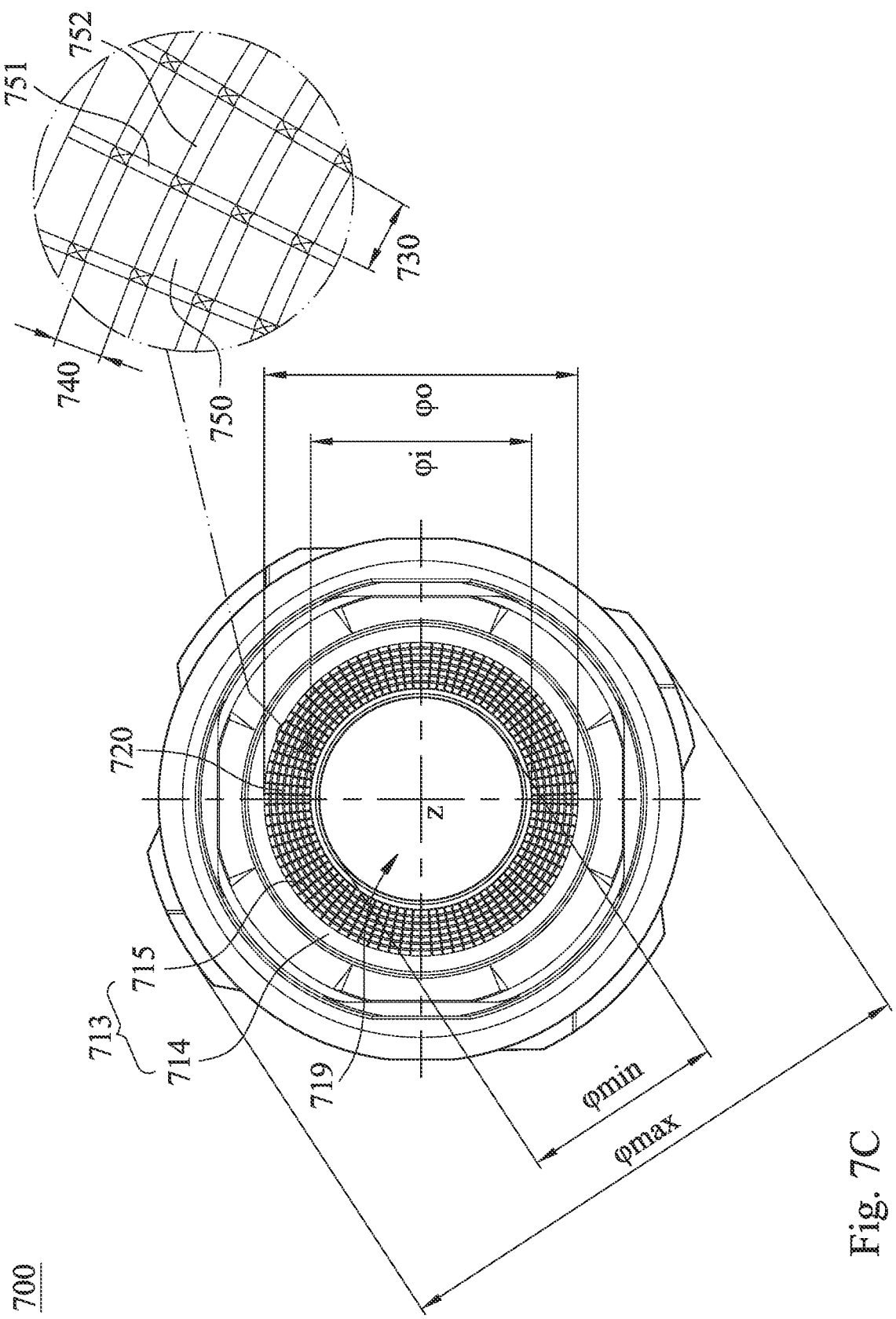
FIG. 7C is a side view from an object side of the plastic lens barrel according to the 7th embodiment.

FIG. 7C is a side view from the object side za of the plastic lens barrel 700 according to the 7th embodiment. In FIG. 7A to FIG. 7C, the object-side annular surface 713 includes a groove structure area 720. The groove structure area 720 includes a plurality of groove structures 750. The groove structures 750 are disposed in an arranging manner along a sagittal direction s away from the optical axis z, i.e., are arranged along the sagittal direction s away from the optical axis z.

In FIG. 7A to FIG. 7C, the object-side annular surface 713 further includes an object-side outer annular surface 714 and an object-side inner annular surface 715. The object-side inner annular surface 715 is located closer to the optical axis z than the object-side outer annular surface 714 to the optical axis z. An entirety of the groove structure area 720 (i.e., all the groove structures 750) is disposed on the object-side inner annular surface 715. Each of the groove structures 750 has a smooth surface.

In the 7th embodiment, the groove structures 750 are regularly arranged along a circumferential direction of the optical axis z and regularly arranged along the sagittal direction s away from the optical axis z. That is, the groove structures 750 are arranged in an array manner on the object-side inner annular surface 715. A separating wall (i.e., a first separating wall 751 or a second separating wall 752 specifically in the 7th embodiment) is disposed between each adjacent two of the groove structures 750, and the adjacent two of the groove structures 750 are separated from each other by the corresponding separating wall. Specifically, each of the groove structures 750 is a recessed structure with a trapezoid-shaped opening as a whole.

The separating walls include the at least one first separating wall 751 arranged along the circumferential direction of the optical axis z, and the at least one second separating wall 752 arranged along the sagittal direction s away from the optical axis z. A height h1 along a direction parallel to the optical axis z of the first separating wall 751 is different from a height h2 along the direction parallel to the optical axis z of the second separating wall 752. Therefore, it is favorable for effectively preventing from being twisted and maintaining the completeness of the groove structures 750 while the plastic lens barrel 700 being released from a mold. In FIG. 7A and FIG. 7B, the height h1 (as shown in FIG. 7B) along the direction parallel to the optical axis z of the first separating wall 751 is greater than the height h2 (as shown in FIG. 7B) along the direction parallel to the optical axis z of the second separating wall 752. Specifically, a number Ni of the groove structures 750 is 630.

In the 7th embodiment, a depth along the direction parallel to the optical axis z of each of the groove structures 750 is d, and values of the parameter d of all the groove structures 750 are the same. The value of the parameter d is the same as a value of the parameter h1 (as shown in FIG. 7B), and the parameter d is not shown in the drawings.

In another point of view to observe the plurality of groove structures of the plastic lens barrel 700 in the 7th embodiment, in FIG. 7A to FIG. 7C, the object-side inner annular surface 715 of the object-side annular surface 713 includes the groove structure area 720. The groove structure area 720 includes a plurality of groove structures. The groove structures may be specifically a plurality of linearly strip-shaped groove structures 730. Each of the linearly strip-shaped groove structures 730 is disposed in an extending manner along the sagittal direction s away from the optical axis z. That is, each of the linearly strip-shaped groove structures 730 is formed by a partial number of the groove structures 750 (specifically, seven of the groove structures 750) and a partial number of the second separating wall 752 being disposed in the alternately arranging manner along the sagittal direction s away from the optical axis z. Each of the linearly strip-shaped groove structures 730 has a smooth surface.

Each of the linearly strip-shaped groove structures 730 is strip-shaped. Each of the linearly strip-shaped groove structures 730 extends along the sagittal direction s away from the optical axis z, i.e., is disposed in the extending manner along the sagittal direction s away from the optical axis z. The linearly strip-shaped groove structures 730 are regularly arranged along the circumferential direction of the optical axis z. Specifically, a number Ns of the linearly strip-shaped groove structures 730 is 90.

In FIG. 7C, a width along the circumferential direction of a position away from the optical axis z of each of the linearly strip-shaped groove structures 730 is different from a width along the circumferential direction of a position close to the optical axis z thereof. Further, the width along the circumferential direction of the position away from the optical axis z of each of the linearly strip-shaped groove structures 730 is greater than the width along the circumferential direction of the position close to the optical axis z thereof.

In FIG. 7B, a depth (e.g., a value of the depth being the same as the value of the parameter h1 shown in FIG. 7B) along the direction parallel to the optical axis z of the position away from the optical axis z of each of the linearly strip-shaped groove structures 730 is equal to a depth along the direction parallel to the optical axis z of the position close to the optical axis z thereof.

In further another point of view to observe the plurality of groove structures of the plastic lens barrel 700 in the 7th embodiment, in FIG. 7A to FIG. 7C, the object-side inner annular surface 715 of the object-side annular surface 713 includes the groove structure area 720. The groove structure area 720 includes a plurality of groove structures. The groove structures may be specifically a plurality of annularly strip-shaped groove structures 740. The annularly strip-shaped groove structures 740 are disposed in the arranging manner along the sagittal direction s away from the optical axis z, i.e., are arranged along the sagittal direction s away from the optical axis z. Each of the annularly strip-shaped groove structures 740 is formed by a partial number of the groove structures 750 (specifically, ninety of the groove structures 750) being arranged along the circumferential direction of the optical axis z. Each of the annularly strip-shaped groove structures 740 has a smooth surface.

Each of the annularly strip-shaped groove structures 740 is strip-shaped. Each of the annularly strip-shaped groove structures 740 extends to surround the optical axis z. The annularly strip-shaped groove structures 740 are regularly arranged along the sagittal direction s away from the optical axis z. Specifically, a number Nt of the annularly strip-shaped groove structures 740 is 7.

The data of the parameters of the plastic lens barrel 700 according to the 7th embodiment of the present disclosure are listed in the following Table 7, and the parameters are also shown as FIG. 7B and FIG. 7C. The definitions of these parameters shown in Table 7 are the same as those stated in the plastic lens barrel 100 according to the 1st embodiment, the plastic lens barrel 400 according to the 4th embodiment and the plastic lens barrel 600 according to the 6th embodiment.

TABLE 7

| 7th Embodiment | | | |
| --- | --- | --- | --- |
| L (mm) | 0.688 | φi (mm) | 3.450 |
| T (mm) | 0.725 | φmin/φi | 0.92 |
| L/T | 0.95 | Ni | 630 |
| α (deg.) | 50 | h1 (mm) | 0.100 |
| φo (mm) | 4.900 | h2 (mm) | 0.081 |
| φmax (mm) | 8.700 | Ns | 90 |
| φo/φmax | 0.56 | d (mm) | 0.100 |
| φmin (mm) | 3.180 | Nt | 7 |

8th Embodiment

Figure 8A:
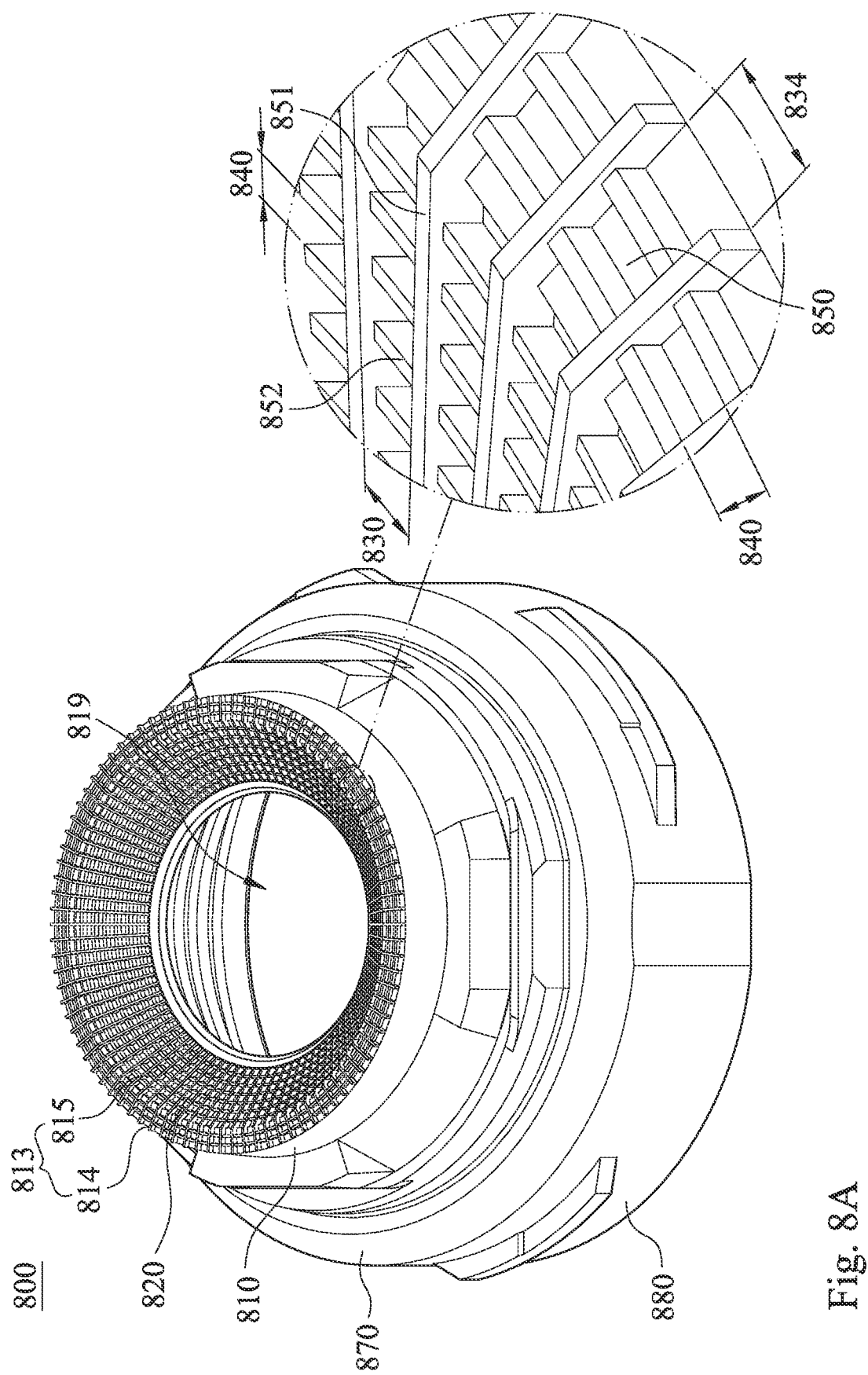
FIG. 8A is a three-dimensional view of a plastic lens barrel according to the 8th embodiment of the present disclosure.
Figure 8B:
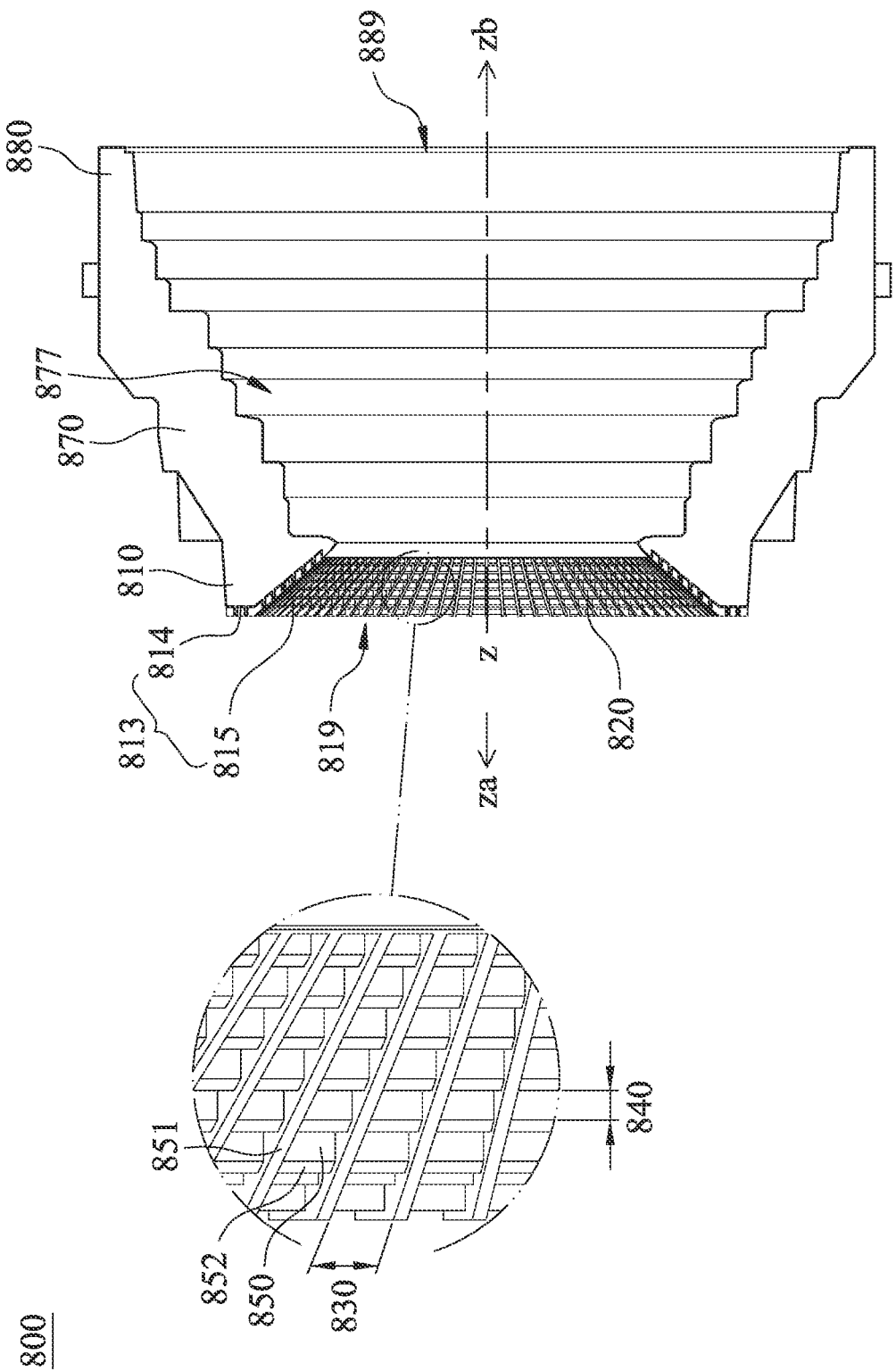
FIG. 8B is a schematic view of the plastic lens barrel according to the 8th embodiment.
Figure 8C:
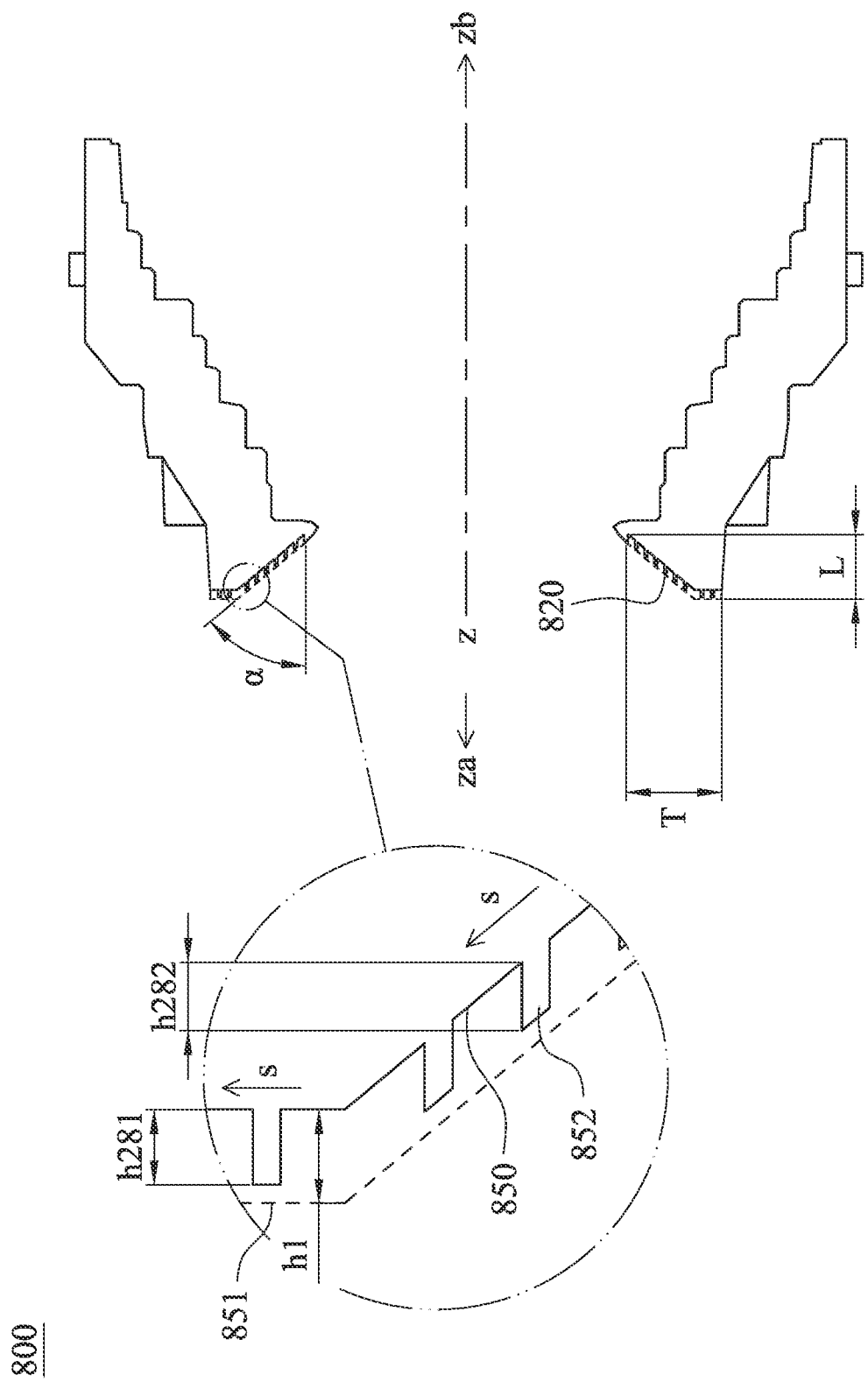
FIG. 8C is a schematic view showing parameters of the plastic lens barrel according to the 8th embodiment.

FIG. 8A is a three-dimensional view of a plastic lens barrel 800 according to the 8th embodiment of the present disclosure. FIG. 8B is a schematic view of the plastic lens barrel 800 according to the 8th embodiment and also a cross-sectional view along a plane, which has a normal direction vertical to an optical axis z, of the plastic lens barrel 800. FIG. 8C is a schematic view showing parameters of the plastic lens barrel 800 according to the 8th embodiment and also a cross-sectional view along another plane, which has a normal direction vertical to the optical axis z, of the plastic lens barrel 800. In FIG. 8A to FIG. 8C, the plastic lens barrel 800 has an inner space 877 for accommodating an imaging lens assembly (not shown in drawings), which has the optical axis z. The plastic lens barrel 800 includes an object-side portion 810, an image-side portion 880 and a tube-shaped portion 870.

In FIG. 8A to FIG. 8C, the plastic lens barrel 800 includes the object-side portion 810, the tube-shaped portion 870 and the image-side portion 880, in order from an object side za to an image side zb. The object-side portion 810 is located close to the object side za of the plastic lens barrel 800. The object-side portion 810 includes an object-side opening 819 and an object-side annular surface 813. The object-side annular surface 813 surrounds the object-side opening 819 and faces toward the object side za. The image-side portion 880 is located close to the image side zb of the plastic lens barrel 800 and includes an image-side opening 889. The tube-shaped portion 870 surrounds the optical axis z. The tube-shaped portion 870 is connected between the object-side portion 810 and the image-side portion 880, and configured to define the inner space 877.

Figure 8D:
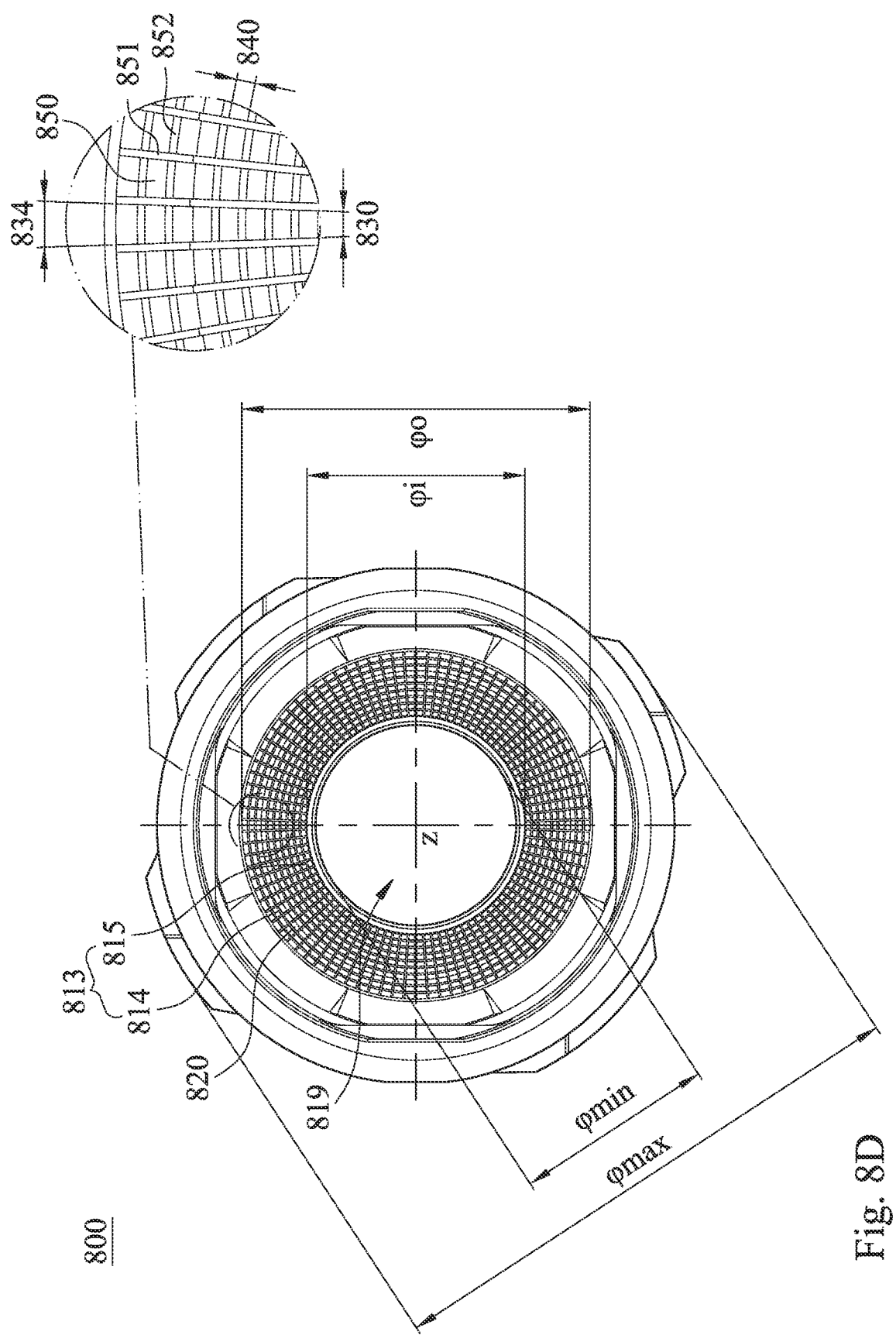
FIG. 8D is a side view from an object side of the plastic lens barrel according to the 8th embodiment.

FIG. 8D is a side view from the object side za of the plastic lens barrel 800 according to the 8th embodiment. In FIG. 8A to FIG. 8D, the object-side annular surface 813 includes a groove structure area 820. The groove structure area 820 includes a plurality of groove structures 850. The groove structures 850 are disposed in an arranging manner along a sagittal direction s away from the optical axis z, i.e., are arranged along the sagittal direction s away from the optical axis z.

In FIG. 8A to FIG. 8D, the object-side annular surface 813 further includes an object-side outer annular surface 814 and an object-side inner annular surface 815. The object-side inner annular surface 815 is located closer to the optical axis z than the object-side outer annular surface 814 to the optical axis z. One part of the groove structure area 820 (i.e., a partial number of the groove structures 850) is disposed on the object-side inner annular surface 815. Specifically, the groove structure area 520 is disposed on the object-side inner annular surface 815 and the object-side outer annular surface 814. That is, the partial number of the groove structures 850 are disposed on the object-side inner annular surface 815, and the other partial number of the groove structures 850 are disposed on the object-side outer annular surface 814. Each of the groove structures 850 has a smooth surface.

In the 8th embodiment, the groove structures 850 are regularly arranged along a circumferential direction of the optical axis z and regularly arranged along the sagittal direction s away from the optical axis z. That is, the groove structures 850 are arranged in an array manner on the object-side inner annular surface 815. A separating wall (i.e., a first separating wall 851 or a second separating wall 852 specifically in the 8th embodiment) is disposed between each adjacent two of the groove structures 850, and the adjacent two of the groove structures 850 are separated from each other by the corresponding separating wall. Specifically, each of the groove structures 850 is a recessed structure with a trapezoid-shaped opening as a whole.

The separating walls include the at least one first separating wall 851 arranged along the circumferential direction of the optical axis z, and the at least one second separating wall 852 arranged along the sagittal direction s away from the optical axis z. A height along a direction parallel to the optical axis z of the first separating wall 851 is different from a height along the direction parallel to the optical axis z of the second separating wall 852. In FIG. 8A to FIG. 8C, a height h1 (as shown in FIG. 8C) along the direction parallel to the optical axis z of the first separating wall 851 is greater than heights h281 and h282 along the direction parallel to the optical axis z of the second separating wall 852. The heights (or parameters) h281 and h282 shown in FIG. 8C are the heights along the direction parallel to the optical axis z of the second separating wall 852 being located on the object-side outer annular surface 814 and the object-side inner annular surface 815, respectively, and a value of the height h281 is greater than a value of the height h282. Specifically, a number Ni of the groove structures 850 is 810.

In the 8th embodiment, a depth along the direction parallel to the optical axis z of each of the groove structures 850 is d, and values of the parameter d of all the groove structures 850 are the same. The value of the parameter d is the same as a value of the parameter h1 (as shown in FIG. 8C), and the parameter d is not shown in the drawings.

In another point of view to observe the plurality of groove structures of the plastic lens barrel 800 in the 8th embodiment, in FIG. 8A to FIG. 8D, the object-side annular surface 813 includes the groove structure area 820. The groove structure area 820 includes a plurality of groove structures. The groove structures may be specifically a plurality of linearly strip-shaped groove structures 830 and a plurality of linearly strip-shaped groove structures 834. Each (i.e., each linearly strip-shaped groove structure) of the linearly strip-shaped groove structures 830, 834 is disposed in an extending manner along the sagittal direction s away from the optical axis z. That is, each of the linearly strip-shaped groove structures 830 located on the object-side inner annular surface 815 is formed by a partial number of the groove structures 850 (specifically, seven of the groove structures 850) and a partial number of the second separating wall 852 being disposed in the alternately arranging manner along the sagittal direction s away from the optical axis z, and each of the linearly strip-shaped groove structures 834 located on the object-side outer annular surface 814 is formed by a partial number of the groove structures 850 (specifically, two of the groove structures 850) and a partial number of the second separating wall 852 being disposed in the alternately arranging manner along the sagittal direction s away from the optical axis z. Each of the linearly strip-shaped groove structures 830 is disposed correspondingly and connected to one of the linearly strip-shaped groove structures 834. Each of the linearly strip-shaped groove structures 830, 834 has a smooth surface.

Each of the linearly strip-shaped groove structures 830, 834 is strip-shaped. Each of the linearly strip-shaped groove structures 830, 834 extends along the sagittal direction s away from the optical axis z, i.e., is disposed in the extending manner along the sagittal direction s away from the optical axis z. The linearly strip-shaped groove structures 830 are regularly arranged along the circumferential direction of the optical axis z, and the linearly strip-shaped groove structures 834 are regularly arranged along the circumferential direction of the optical axis z. Specifically, a number of the linearly strip-shaped groove structures 830 is 90, and a number of the linearly strip-shaped groove structures 834 is 90. Thus, a number (i.e., a sum) Ns of the linearly strip-shaped groove structures 830, 834 is 180.

In FIG. 8D, a width along the circumferential direction of a position away from the optical axis z of each of the linearly strip-shaped groove structures 830 is different from a width along the circumferential direction of a position close to the optical axis z thereof. A width along the circumferential direction of a position away from the optical axis z of each of the linearly strip-shaped groove structures 834 is different from a width along the circumferential direction of a position close to the optical axis z thereof. Further, the width along the circumferential direction of the position away from the optical axis z of each of the linearly strip-shaped groove structures 830 is greater than the width along the circumferential direction of the position close to the optical axis z thereof. The width along the circumferential direction of the position away from the optical axis z of each of the linearly strip-shaped groove structures 834 is greater than the width along the circumferential direction of the position close to the optical axis z thereof.

In FIG. 8C, a depth along the direction parallel to the optical axis z of the position away from the optical axis z of each of the linearly strip-shaped groove structures 830 is equal to a depth (e.g., a value of the depth being the same as the value of the parameter h1 shown in FIG. 8C) along the direction parallel to the optical axis z of the position close to the optical axis z thereof. A depth along the direction parallel to the optical axis z of the position away from the optical axis z of each of the linearly strip-shaped groove structures 834 is equal to a depth (e.g., a value of the depth being the same as the value of the parameter h1 shown in FIG. 8C) along the direction parallel to the optical axis z of the position close to the optical axis z thereof.

In further another point of view to observe the plurality of groove structures of the plastic lens barrel 800 in the 8th embodiment, in FIG. 8A to FIG. 8D, the object-side annular surface 813 includes the groove structure area 820. The groove structure area 820 includes a plurality of groove structures. The groove structures may be specifically a plurality of annularly strip-shaped groove structures 840. The annularly strip-shaped groove structures 840 are disposed in the arranging manner along the sagittal direction s away from the optical axis z, i.e., are arranged along the sagittal direction s away from the optical axis z. Each of the annularly strip-shaped groove structures 840 is formed by a partial number of the groove structures 850 (specifically, ninety of the groove structures 850) being arranged along the circumferential direction of the optical axis z. Each of the annularly strip-shaped groove structures 840 has a smooth surface.

Each of the annularly strip-shaped groove structures 840 is strip-shaped. Each of the annularly strip-shaped groove structures 840 extends to surround the optical axis z. The annularly strip-shaped groove structures 840 are regularly arranged along the sagittal direction s away from the optical axis z. Specifically, a number Nt of the annularly strip-shaped groove structures 840 is 9.

The data of the parameters of the plastic lens barrel 800 according to the 8th embodiment of the present disclosure are listed in the following Table 8, and the parameters are also shown as FIG. 8C and FIG. 8D. The definitions of these parameters shown in Table 8 are the same as those stated in the plastic lens barrel 100 according to the 1st embodiment, the plastic lens barrel 400 according to the 4th embodiment and the plastic lens barrel 600 according to the 6th embodiment.

TABLE 8

| 8th Embodiment | | | |
|---|---|---|---|
| L (mm) | 0.698 | φmin/φi | 0.92 |
| T (mm) | 1.031 | Ni | 810 |
| L/T | 0.68 | h1 (mm) | 0.100 |
| α (deg.) | 50 | h281 (mm) | 0.080 |
| φo (mm) | 5.509 | h282 (mm) | 0.075 |
| φmax (mm) | 8.700 | Ns | 180 |
| φo/φmax | 0.63 | d (mm) | 0.100 |
| φmin (mm) | 3.180 | Nt | 9 |
| φi (mm) | 3.450 | | |

9th Embodiment

Figure 9A:
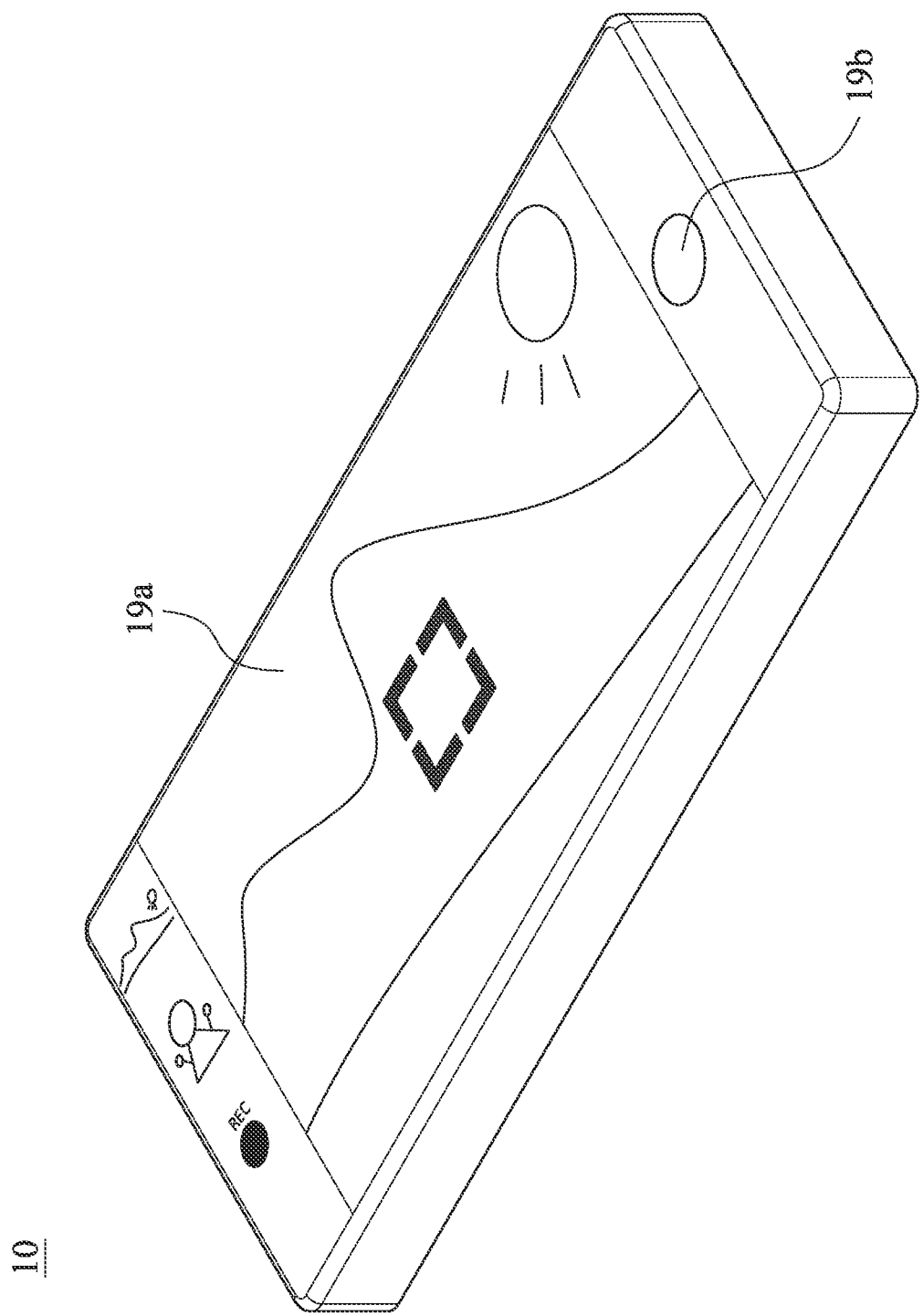
FIG. 9A shows a schematic view of an electronic device according to the 9th embodiment of the present disclosure.
Figure 9B:
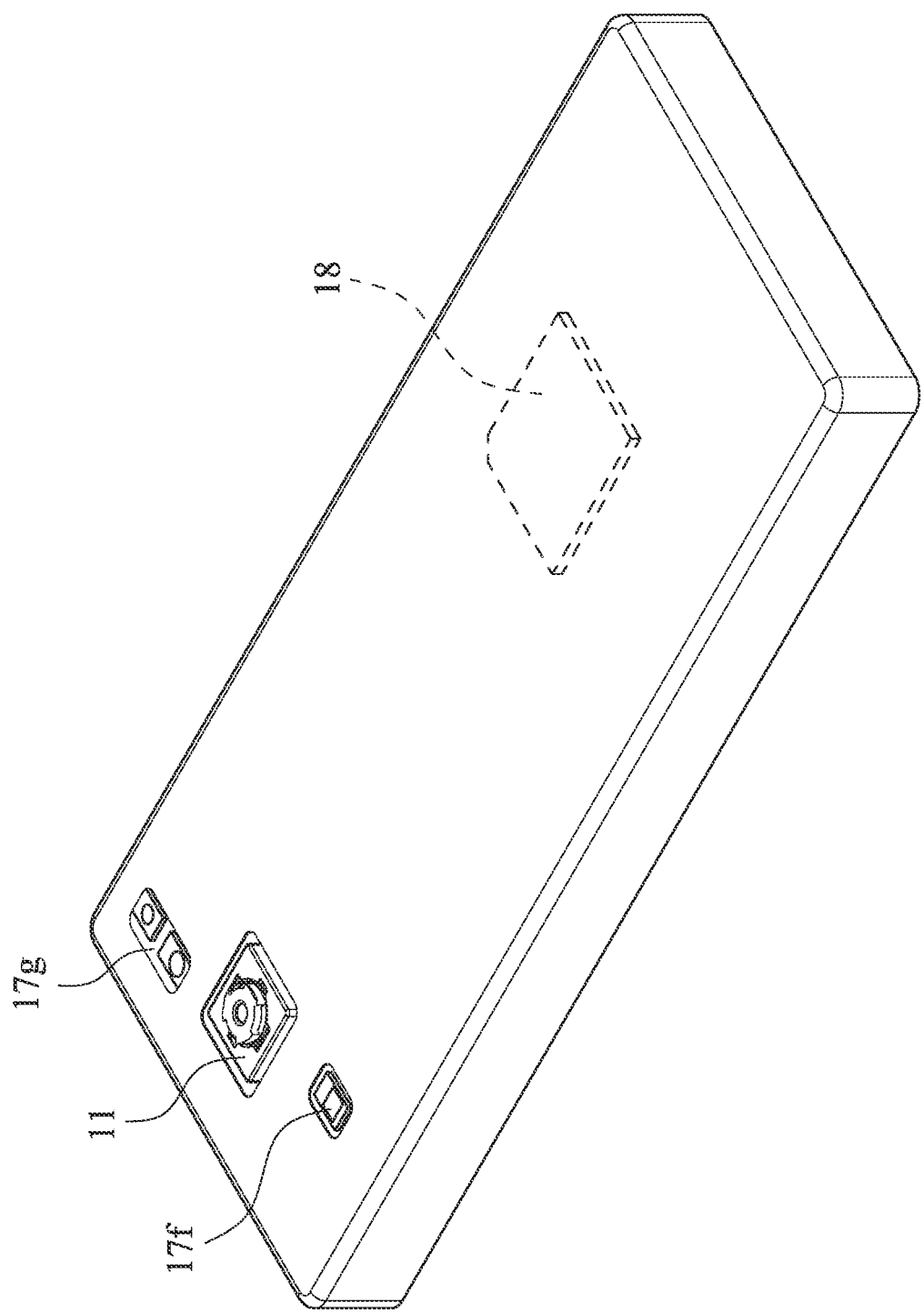
FIG. 9B shows another schematic view of the electronic device according to the 9th embodiment.
Figure 9C:
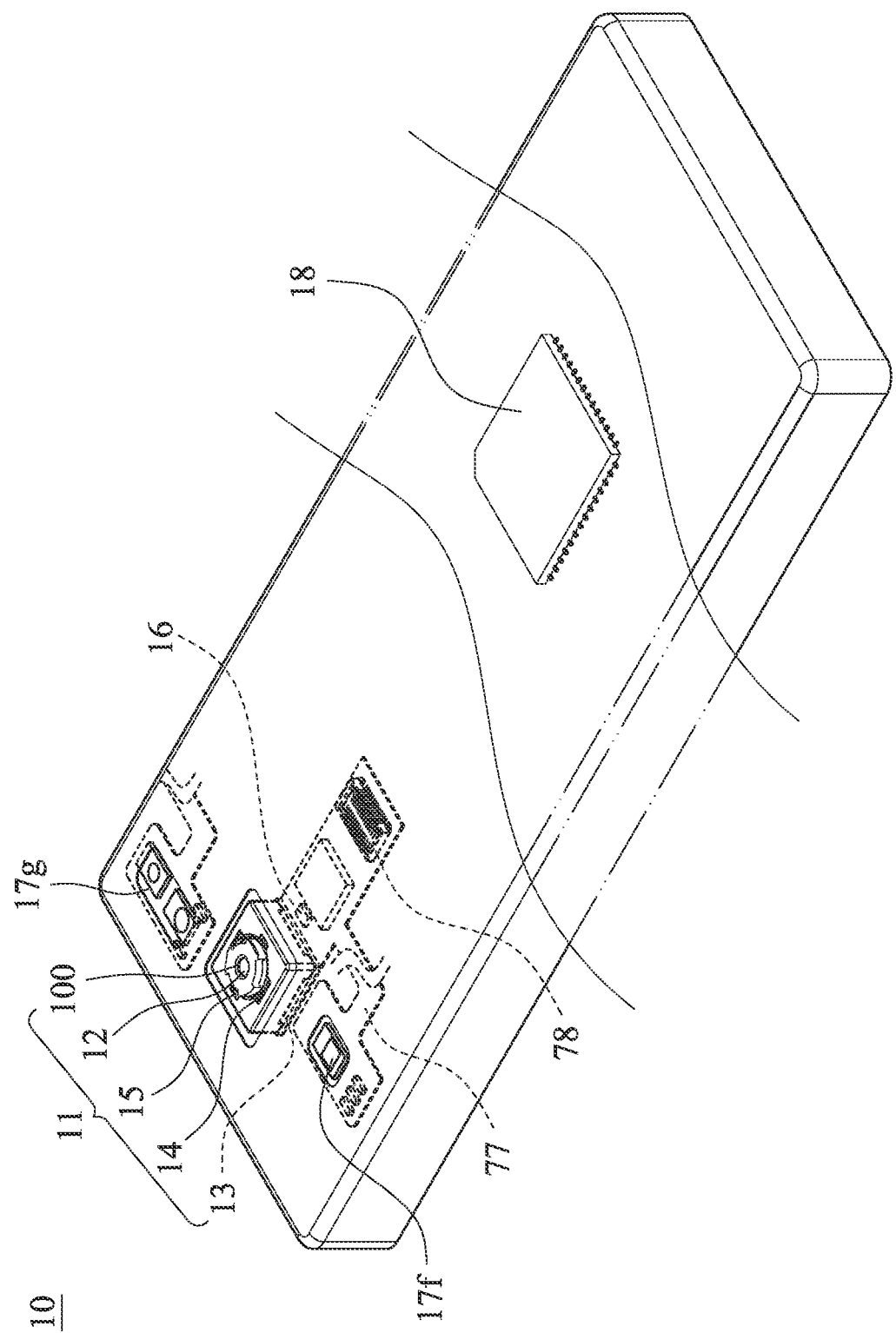
FIG. 9C shows further another schematic view of the electronic device according to the 9th embodiment.

FIG. 9A shows a schematic view of an electronic device 10 according to the 9th embodiment of the present disclosure, FIG. 9B shows another schematic view of the electronic device 10 according to the 9th embodiment, FIG. 9C shows further another schematic view of the electronic device 10 according to the 9th embodiment, and particularly, FIG. 9A to FIG. 9C are schematic views related to a camera of the electronic device 10. In FIG. 1A, FIG. 9A to FIG. 9C, the electronic device 10 of the 9th embodiment is a smart phone. The electronic device 10 includes a camera module 11, wherein the camera module 11 includes the plastic lens barrel 100 according to the present disclosure (or another plastic lens barrel according to the present disclosure), the imaging lens assembly 12 and an image sensor 13. The image sensor 13 is disposed on the image surface 12i of the imaging lens assembly 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 9th embodiment can be a touch screen 19a, a button 19b, etc. At this moment, the imaging light of the imaging lens assembly 12 is converged on the image sensor 13, and the electronic signal associated with image is output to an image signal processor (ISP) 18.

Figure 9D:
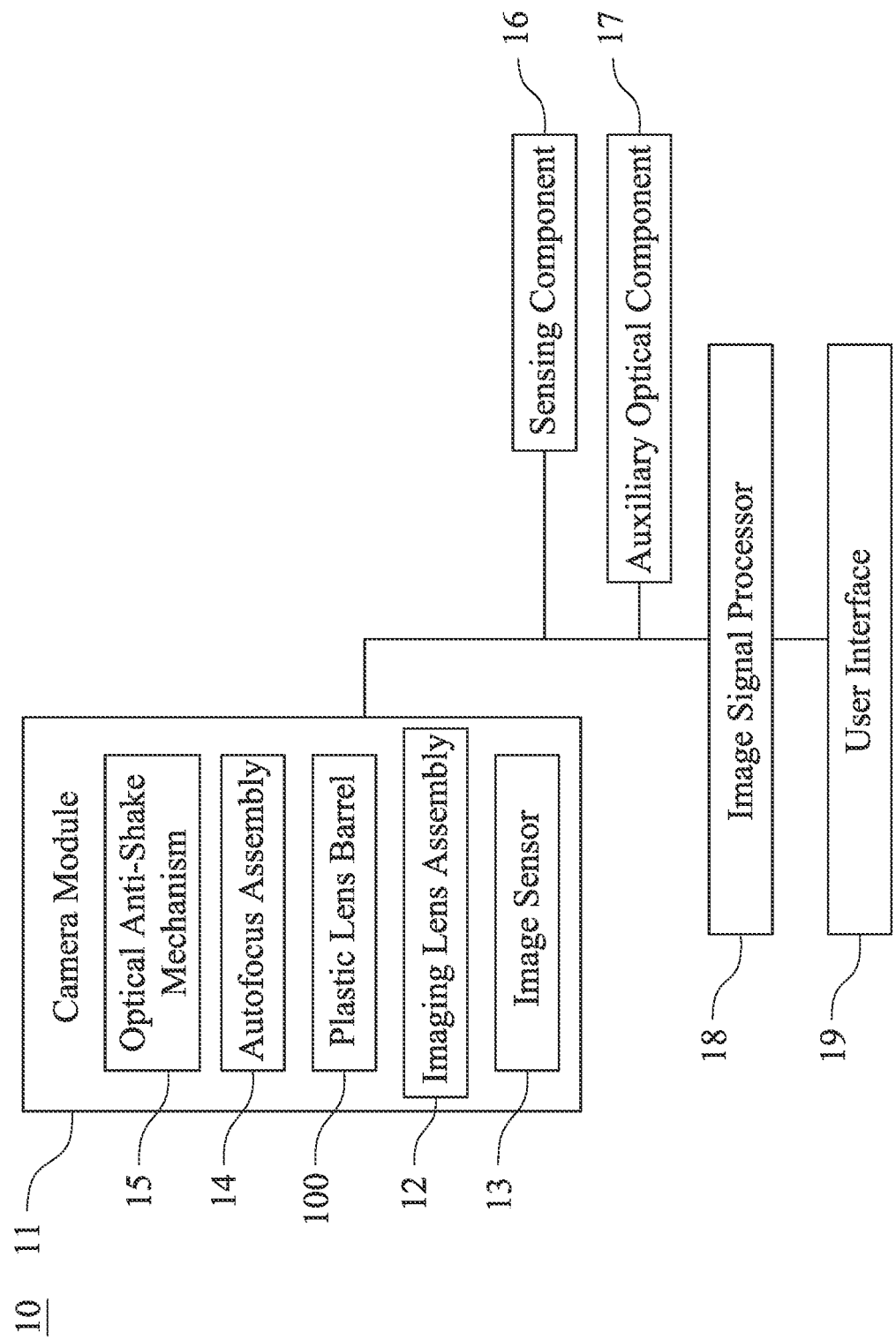
FIG. 9D shows a block diagram of the electronic device according to the 9th embodiment.

FIG. 9D shows a block diagram of the electronic device 10 according to the 9th embodiment, and in particular, the block diagram is related to the camera of the electronic device 10. In FIG. 9A to FIG. 9D, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module 17f for compensating for the color temperature, an infrared distance measurement component, a focus module 17g, etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 9C, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 9th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

10th Embodiment

Figure 10:
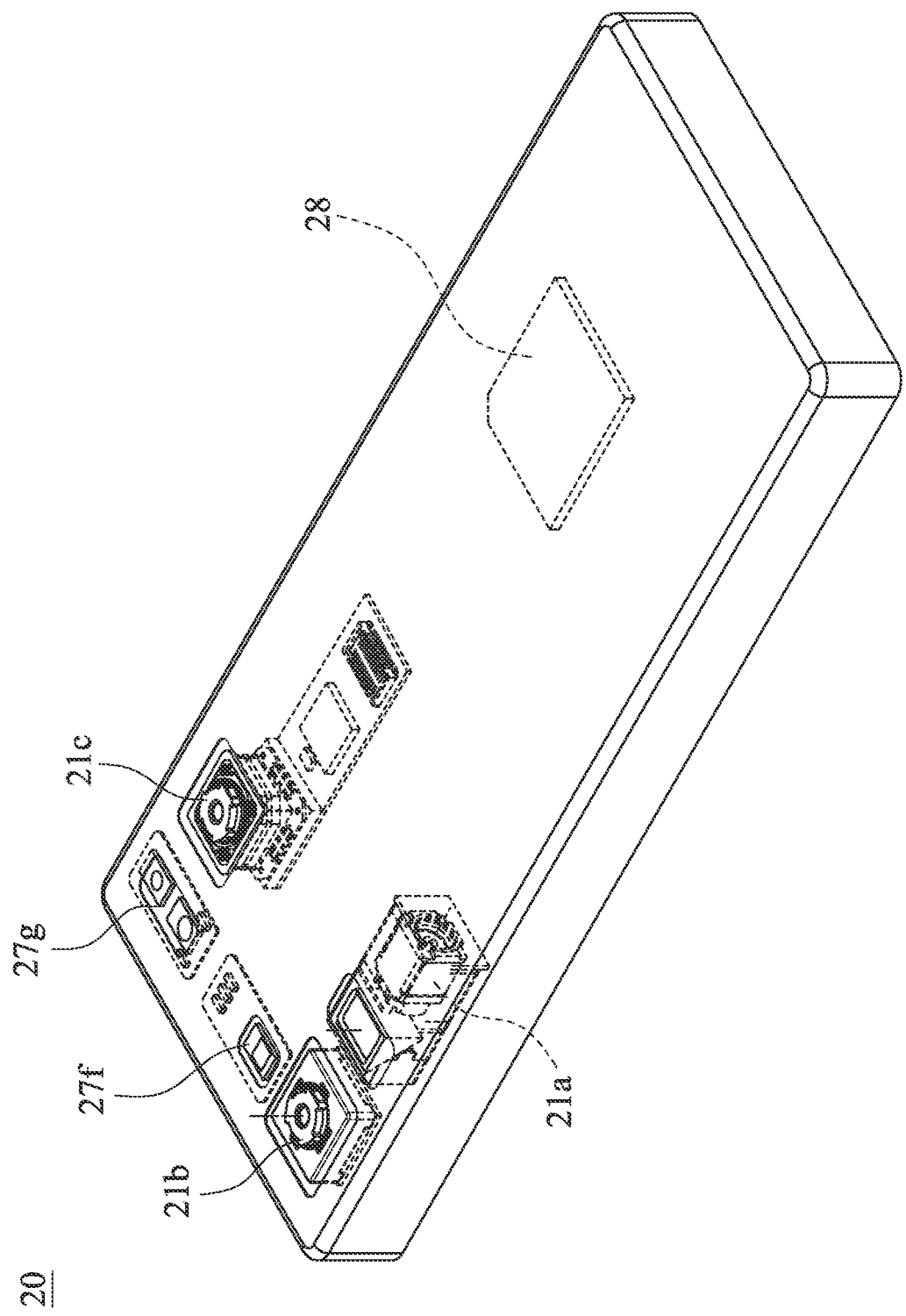
FIG. 10 shows an electronic device according to the 10th embodiment of the present disclosure.

FIG. 10 shows a schematic view of an electronic device 20 according to the 10th embodiment of the present disclosure. In FIG. 10, the electronic device 20 of the 10th embodiment is a smart phone. The electronic device 20 includes camera modules 21a, 21b and 21c, which are disposed on the same side of the electronic device 20 and may have different optical properties. At least one of the camera modules 21a, 21b and 21c includes a plastic barrel according to the present disclosure, an imaging lens assembly and an image sensor, and the image sensor is disposed on an image surface of the imaging lens assembly. In another embodiment according to the present disclosure (not shown in the drawings), the electronic device may be an electronic device with multiple camera modules, e.g., a smart phone with two camera modules, a smart phone with three camera modules, a smart phone with four camera modules, or a tablet personal computer with two camera modules.

In the photographing procedure of the electronic device 20, at least one image can be captured by the camera modules 21a, 21b and 21c with aids of a flash module 27f and a focus assist module 27g of auxiliary optical components, and then the required effects like zooming, delicate images would be achieved by the processors (such as an image signal processor 28 and so on) equipped in the electronic device 20. In addition, it should be realized that the configurations of the camera modules of the electronic device according to the present disclosure are not limited to the positions disclosed in FIG. 10.

11th Embodiment

Figure 11:
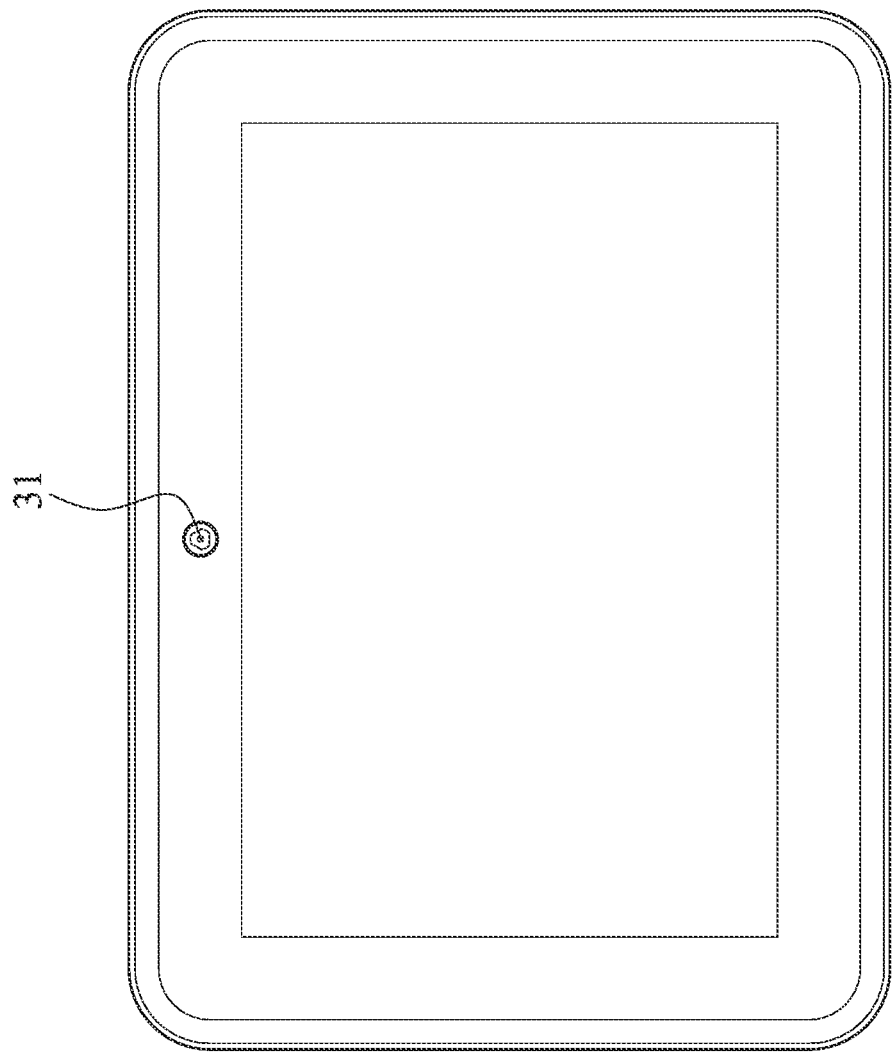
FIG. 11 shows an electronic device according to the 11th embodiment of the present disclosure.

FIG. 11 shows an electronic device 30 according to the 11th embodiment of the present disclosure. The electronic device 30 of the 11th embodiment is a tablet personal computer. The electronic device 30 includes a camera module 31. The camera module 31 includes a plastic lens barrel according to the present disclosure, an imaging lens assembly (not shown in drawings) and an image sensor (not shown in drawings), and the image sensor is disposed on an image surface of the imaging lens assembly.

12th Embodiment

Figure 12:
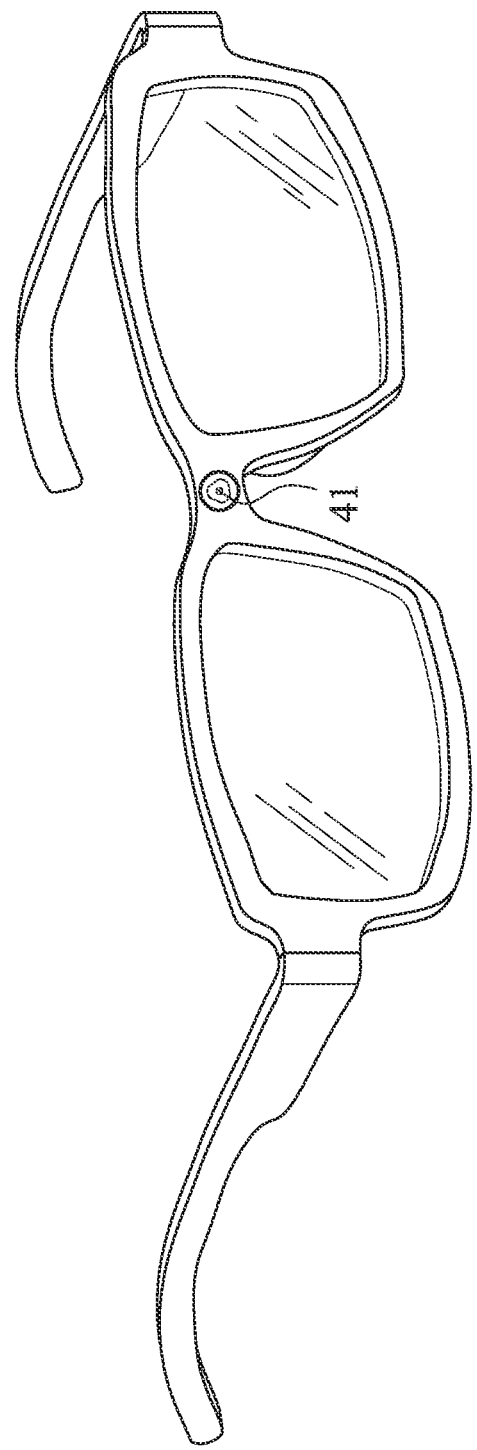
FIG. 12 shows an electronic device according to the 12th embodiment of the present disclosure.

FIG. 12 shows an electronic device 40 according to the 12th embodiment of the present disclosure. The electronic device 40 of the 12th embodiment is a wearable device. The electronic device 40 includes a camera module 41. The camera module 41 includes a plastic lens barrel according to the present disclosure, an imaging lens assembly (not shown in drawings) and an image sensor (not shown in drawings), and the image sensor is disposed on an image surface of the imaging lens assembly.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A plastic lens barrel, having an inner space for accommodating an imaging lens assembly, the imaging lens assembly having an optical axis, the plastic lens barrel comprising:
   an object-side portion located close to an object side of the plastic lens barrel, wherein the object-side portion comprises an object-side opening and an object-side annular surface, and the object-side annular surface surrounds the object-side opening and faces toward the object side;
   an image-side portion located close to an image side of the plastic lens barrel and comprising an image-side opening; and
   a tube-shaped portion surrounding the optical axis, wherein the tube-shaped portion is connected between the object-side portion and the image-side portion, and configured to define the inner space;
   wherein the object-side annular surface comprises a groove structure area, the groove structure area comprises a plurality of groove structures, and the groove structures are disposed in at least one of an arranging manner and an extending manner along a sagittal direction away from the optical axis;
   wherein a maximum outer diameter of the groove structure area is φo, a maximum outer diameter of the plastic lens barrel is φmax, a minimum inner diameter of the groove structure area is φi, a diameter of the object-side opening of the plastic lens barrel is φmin, and the following conditions are satisfied:

$0.2 < \varphi o/\varphi max < 0.9$; and $0.75 < \varphi min/\varphi i \leq 1.0$.

2. The plastic lens barrel of claim 1, wherein the object-side annular surface further comprises an object-side outer annular surface and an object-side inner annular surface, the object-side inner annular surface is located closer to the optical axis than the object-side outer annular surface to the optical axis, and at least one part of the groove structure area is disposed on the object-side inner annular surface.

3. The plastic lens barrel of claim 2, wherein the groove structure area is disposed on the object-side inner annular surface and the object-side outer annular surface.

4. The plastic lens barrel of claim 2, wherein an angle between the object-side inner annular surface and the direction parallel to the optical axis is a, and the following condition is satisfied:

$35 \text{ degrees} < \alpha < 70 \text{ degrees}$.

5. The plastic lens barrel of claim 1, wherein each of the groove structures has a smooth surface.

6. The plastic lens barrel of claim 1, wherein each of the groove structures is strip-shaped.

7. The plastic lens barrel of claim 6, wherein each of the groove structures is V-shapedly strip-shaped and comprises two inclined surfaces, each of the two inclined surfaces faces toward the object side, and the two inclined surfaces of each of the groove structures extend toward the image side and are connected to each other.

8. The plastic lens barrel of claim 7, wherein an angle between the two inclined surfaces of each of the groove structures is θ, and the following condition is satisfied:

$15 \text{ degrees} < \theta < 85 \text{ degrees}$.

9. The plastic lens barrel of claim 7, wherein each of the groove structures is a linearly strip-shaped groove structure and extends along the sagittal direction away from the optical axis, and the linearly strip-shaped groove structures are regularly arranged along a circumferential direction of the optical axis.

10. The plastic lens barrel of claim 9, wherein a width along the circumferential direction of a position away from the optical axis of each of the linearly strip-shaped groove structures is different from a width along the circumferential direction of a position close to the optical axis thereof.

11. The plastic lens barrel of claim 10, wherein the width along the circumferential direction of the position away from the optical axis of each of the linearly strip-shaped groove structures is greater than the width along the circumferential direction of the position close to the optical axis thereof.

12. The plastic lens barrel of claim 11, wherein a depth along the direction parallel to the optical axis of the position away from the optical axis of each of the linearly strip-shaped groove structures is greater than a depth along the direction parallel to the optical axis of the position close to the optical axis thereof.

13. The plastic lens barrel of claim 9, wherein a number of the linearly strip-shaped groove structures is Ns, and the following condition is satisfied:

$60 \leq Ns \leq 540$.

14. The plastic lens barrel of claim 7, wherein each of the groove structures is an annularly strip-shaped groove structure and extends to surround the optical axis, and the annularly strip-shaped groove structures are regularly arranged along the sagittal direction away from the optical axis.

15. The plastic lens barrel of claim 14, wherein a number of the annularly strip-shaped groove structures is Nt, and the following condition is satisfied:

$5 \leq Nt \leq 25$.

16. The plastic lens barrel of claim 1, wherein the groove structures are regularly arranged along a circumferential direction of the optical axis and regularly arranged along the sagittal direction away from the optical axis; and
   wherein a separating wall is disposed between each adjacent two of the groove structures, and the adjacent two of the groove structures are separated from each other by the separating wall.

17. The plastic lens barrel of claim 16, wherein a number of the groove structures is Ni, and the following condition is satisfied:

$360 \leq Ni \leq 1200$.

18. The plastic lens barrel of claim 16, wherein the separating walls comprise at least one first separating wall arranged along the circumferential direction of the optical axis, and at least one second separating wall arranged along the sagittal direction away from the optical axis; and
   wherein a height along the direction parallel to the optical axis of the first separating wall is different from a height along the direction parallel to the optical axis of the second separating wall.

19. The plastic lens barrel of claim 1, wherein a depth along the direction parallel to the optical axis of each of the groove structures is d, and the following condition is satisfied:

$$0.04 \text{ mm} < d < 0.30 \text{ mm}.$$

20. The plastic lens barrel of claim 1, wherein a length along a direction vertical to the optical axis of the groove structure area is T, a length along a direction parallel to the optical axis of the groove structure area is L, and the following condition is satisfied:

$$0.05 < L/T \le 2.0.$$

21. The plastic lens barrel of claim 20, wherein the length along the direction vertical to the optical axis of the groove structure area is T, the length along the direction parallel to the optical axis of the groove structure area is L, and the following condition is satisfied:

$$0.3 < L/T \le 1.5.$$

22. A camera module, comprising:
the plastic lens barrel of claim 1 and the imaging lens assembly; and
an image sensor disposed on an image surface of the imaging lens assembly.

23. An electronic device, comprising:
the camera module of claim 22.

* * * * *